(12) United States Patent
Crawley et al.

(10) Patent No.: US 7,025,810 B2
(45) Date of Patent: Apr. 11, 2006

(54) METHOD AND APPARATUS FOR SHUTTING DOWN A FUEL-FIRED BURNER OF AN EMISSION ABATEMENT ASSEMBLY

(75) Inventors: Wilbur H. Crawley, Columbus, IN (US); Randall J. Johnson, Seymour, IN (US)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 10/931,008

(22) Filed: Aug. 31, 2004

(65) Prior Publication Data

US 2005/0153252 A1 Jul. 14, 2005

Related U.S. Application Data

(60) Provisional application No. 60/536,327, filed on Jan. 13, 2004, provisional application No. 60/546,139, filed on Feb. 20, 2004.

(51) Int. Cl.
*B01D 46/00* (2006.01)

(52) U.S. Cl. ............... 95/278; 95/1; 95/18; 95/26; 95/273; 55/282.2; 55/282.3; 55/385.3; 55/523; 55/DIG. 10; 55/DIG. 30; 96/417; 96/424; 60/274; 60/311; 431/6; 431/75; 431/77

(58) Field of Classification Search .............. 55/282.2, 55/282.3, 385.3, 523, DIG. 10, DIG. 30; 96/417, 424; 95/1, 14, 18, 26, 273, 278; 60/274, 363, 311; 431/2, 3, 5, 6, 12, 13, 431/14, 18, 75, 77

See application file for complete search history.

(56) References Cited

U.S. PATENT DOCUMENTS

| | | | |
|---|---|---|---|
| 4,334,855 A | | 6/1982 | Nelson |
| 4,335,574 A | | 6/1982 | Sato et al. |
| 4,349,330 A | | 9/1982 | Obinata et al. |
| 4,362,500 A | | 12/1982 | Eriksson et al. |
| 4,404,795 A | | 9/1983 | Oishi et al. |
| 4,477,245 A | * | 10/1984 | Giachino et al. ............. 431/78 |
| 4,557,108 A | * | 12/1985 | Torimoto ............... 55/DIG. 30 |
| 4,574,589 A | | 3/1986 | Hasegawa et al. |
| 4,589,254 A | * | 5/1986 | Kume et al. .................. 60/311 |
| 4,603,550 A | | 8/1986 | Shinzawa |
| 4,622,811 A | * | 11/1986 | Distel et al. ........... 55/DIG. 30 |
| 4,651,524 A | * | 3/1987 | Brighton ................ 55/DIG. 30 |

(Continued)

FOREIGN PATENT DOCUMENTS

DE 24 19 126 A1 10/1975

(Continued)

OTHER PUBLICATIONS

PCT Search Report for PCT Application No. PCT/US05/00939, Dec. 2, 2005, 14 pgs.

*Primary Examiner*—Jason M. Greene
(74) *Attorney, Agent, or Firm*—Barnes & Thornburg LLP

(57) ABSTRACT

A method of operating a fuel-fired burner of an emission abatement assembly includes supplying a reduced amount of fuel to the fuel-fired burner in response to detection of a burner shutdown request. Such a reduced fuel supply continues for a predetermined time period after which fuel is no longer supplied to the burner. The supply of both combustion air and atomization air, along with spark generation, continues for a period of time after the fuel is shutoff. An emission abatement assembly is also disclosed.

19 Claims, 37 Drawing Sheets

U.S. PATENT DOCUMENTS

| | | | |
|---|---|---|---|
| 4,677,823 A * | 7/1987 | Hardy | 60/274 |
| 4,953,354 A | 9/1990 | Erber et al. | |
| 4,983,362 A | 1/1991 | Obermuller | |
| 4,987,738 A * | 1/1991 | Lopez-Crevillen et al. | 60/303 |
| 5,001,899 A | 3/1991 | Santiago et al. | |
| 5,003,778 A | 4/1991 | Erber et al. | |
| 5,044,158 A * | 9/1991 | Goerlich | 60/274 |
| 5,079,917 A | 1/1992 | Henkel | |
| 5,140,814 A | 8/1992 | Kreutmair et al. | |
| 5,189,392 A | 2/1993 | Kass et al. | |
| 5,211,009 A | 5/1993 | Houben et al. | |
| 5,417,059 A * | 5/1995 | Hartel et al. | 60/303 |
| 5,458,664 A | 10/1995 | Ishii et al. | |
| 5,522,326 A | 6/1996 | Vollhardt | |
| 5,807,098 A | 9/1998 | Deng | |
| 5,853,459 A | 12/1998 | Kuwamoto et al. | |
| 5,865,618 A | 2/1999 | Hiebert | |
| 5,919,035 A | 7/1999 | Iwama et al. | |
| 6,471,918 B1 | 10/2002 | Sherwood | |
| 6,783,882 B1 | 8/2004 | Schmidt | |
| 2003/0091950 A1 | 5/2003 | Pijper | |
| 2004/0173005 A1 | 9/2004 | Matone et al. | |

FOREIGN PATENT DOCUMENTS

| | | |
|---|---|---|
| DE | 25 35 002 A1 | 2/1977 |
| DE | 31 25 305 A1 | 1/1983 |
| DE | 35 32 779 A1 | 3/1987 |
| DE | 36 14 812 A1 | 11/1987 |
| DE | 36 36 787 A1 | 5/1988 |
| DE | 37 40 047 A1 | 6/1989 |
| DE | 38 44 554 A1 | 9/1989 |
| DE | 38 18 158 A1 | 12/1989 |
| DE | 38 30 687 A1 | 3/1990 |
| DE | 196 04 318 A1 | 8/1997 |
| EP | 0 027 549 A1 | 4/1981 |
| EP | 0 196 421 B1 | 10/1986 |
| EP | 0 212 230 A2 | 3/1987 |
| EP | 35 32 777 A1 | 3/1987 |
| EP | 0 218 047 B1 | 4/1987 |
| EP | 0 268 026 B1 | 5/1988 |
| EP | 0 407 361 A1 | 2/1992 |
| EP | 0 503 263 B1 | 9/1992 |
| EP | 0 505 696 A2 | 9/1992 |
| EP | 0 520 170 A1 | 12/1992 |
| WO | WO 91/04394 A1 | 4/1991 |

\* cited by examiner

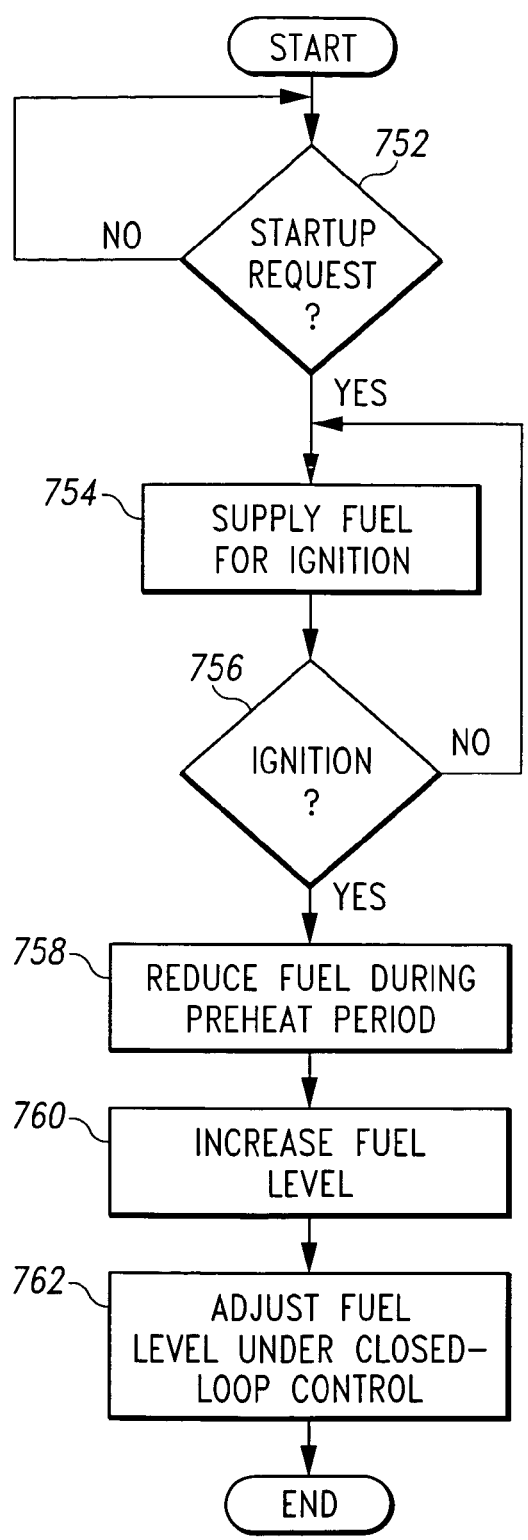
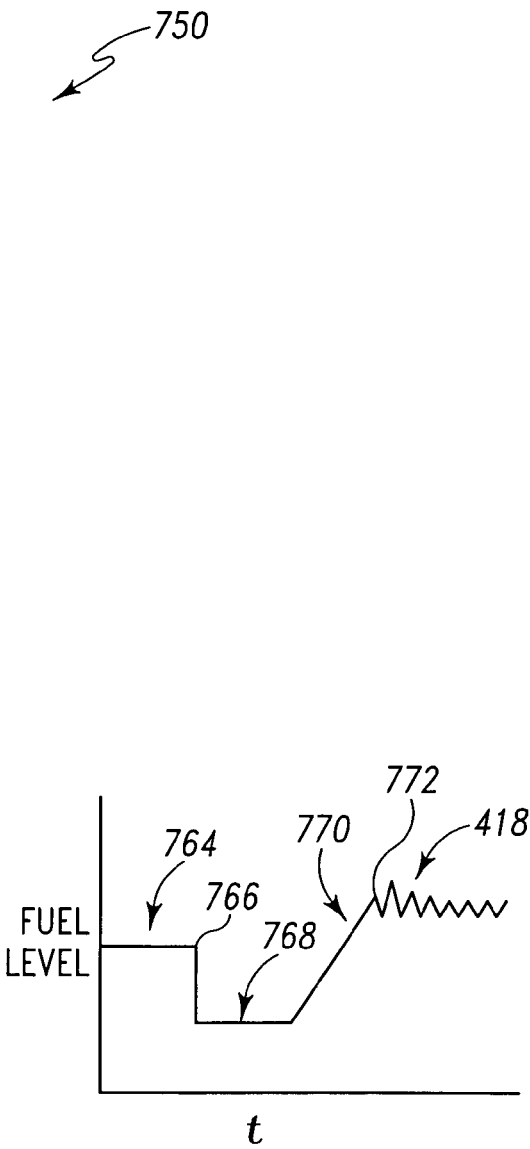
Fig. 31
Fig. 30

METHOD AND APPARATUS FOR SHUTTING DOWN A FUEL-FIRED BURNER OF AN EMISSION ABATEMENT ASSEMBLY

This application claims priority under 35 U.S.C. § 119(e) to U.S. Provisional Patent Application Ser. No. 60/536,327, filed on Jan. 13, 2004 and U.S. Provisional Patent Application Ser. No. 60/546,139 filed on Feb. 20, 2004, the entirety of both of which is hereby incorporated by reference.

CROSS REFERENCE

Cross reference is made to copending U.S. patent applications Ser. No. 10,931,028 entitled "Method and Apparatus for Cooling the Components of a Control Unit of an Emission Abatement Assembly" by Wilbur H. Crawley and Randall J. Johnson; Ser. No. 10/931,091 entitled "Method and Apparatus for Monitoring Engine Performance as a Function of Soot Accumulation in a Filter" by Randall J. Johnson and Wilbur H. Crawley; Ser. No. 10/931,090 entitled "Method and Apparatus for Controlling the Temperature of a Fuel-Fired Burner of an Emission Abatement Assembly" by Wilbur H. Crawley, Randall J. Johnson, and Samuel N. Crane, Jr.; Ser. No. 10/931,092 entitled "Emission Abatement Assembly and Method of Operating the Same" by Wilbur H. Crawley and Randall J. Johnson; Ser. No. 10,931,020 entitled "Method and Apparatus for Cleaning the Electrodes of a Fuel-Fired Burner of an Emission Abatement Assembly" by Wilbur H. Crawley, Randall J. Johnson, Stephen P. Goldschmidt, and Edward C. Kinnaird; Ser. No. 10/931,017 entitled "Method and Apparatus for Operating an Airless Fuel-Fired Burner of an Emission Abatement Assembly" by William Taylor, III, Yougen Kong, Mert E. Berkman, Jon J. Huckaby, and Samuel N. Crane, Jr.; Ser. No. 10/931,009 entitled "Method and Apparatus for Directing Exhaust Gas Through a Fuel-Fired Burner of an Emission Abatement Assembly" by Wilbur H. Crawley, Randall J. Johnson, Yougen Kong, John Abel, Shoja Farr, Nicholas Birkby, and David Pearson; Ser. No. 10/931,025 entitled "Method and Apparatus for Starting up a Fuel-Fired Burner of an Emission Abatement Assembly" by Wilbur H. Crawley and Randall J. Johnson; Ser. No. 10/931,027 entitled "Method and Apparatus for Controlling a Fuel-Fired Burner of an Emission Abatement Assembly" by William Taylor, III, Yougen Kong, Wilbur H. Crawley, and Randall J. Johnson; Ser. No. 10/931,026 entitled "Method and Apparatus for Determining Accumulation in a Particulate Filter of an Emission Abatement Assembly" by Wilbur H. Crawley and Randall J. Johnson; Ser. No. 10/931,010 entitled "Method and Apparatus for Monitoring Ash Accumulation in a Particulate Filter of an Emission Abatement Assembly" by Wilbur H. Crawley and Randall J. Johnson; and Ser. No. 10/931,088 entitled "Method and Apparatus for Monitoring the Components of a Control Unit of an Emission Abatement Assembly" by Wilbur H. Crawley, Randall J. Johnson, and Navin Khadiya; Ser. No. 10/931,088, each of which is assigned to the same assignee as the present application, each of which is filed concurrently herewith, and each of which is hereby incorporated by reference.

FIELD OF THE DISCLOSURE

The present disclosure relates generally to diesel emission abatement devices.

BACKGROUND

Untreated internal combustion engine emissions (e.g., diesel emissions) include various effluents such as $NO_x$, hydrocarbons, and carbon monoxide, for example. Moreover, the untreated emissions from certain types of internal combustion engines, such as diesel engines, also include particulate carbon-based matter or "soot". Federal regulations relating to soot emission standards are becoming more and more rigid thereby furthering the need for devices and/or methods which remove soot from engine emissions.

The amount of soot released by an engine system can be reduced by the use of an emission abatement device such as a filter or trap. Such a filter or trap is periodically regenerated in order to remove the soot therefrom. The filter or trap may be regenerated by use of a burner or electric heater to burn the soot trapped in the filter.

SUMMARY

According to one aspect of the disclosure, an emission abatement assembly includes a pair of fuel-fired burners. Both of the fuel-fired burners are under the control of a single control unit. The fuel-fired burners may be selectively operated by the control unit to regenerate particulate filters.

According to another aspect of the disclosure, a method of monitoring a fuel-fired burner during filter regeneration includes determining the temperature of the heat being produced by the burner and adjusting the amount of fuel supplied to the burner based thereon. A predetermined temperature range may be used with the amount of fuel supplied to the burner being adjusted if the temperature is outside of the predetermined temperature range. An electronic controller configured to control the fuel-fired burner in such a manner is also disclosed. Temperature measurements may be obtained by use of a temperature sensor.

According to another aspect of the disclosure, a control unit for controlling operation of a fuel-fired burner is disclosed. The control unit includes a housing having an air inlet which is open to an interior chamber of the housing. An air pump is positioned in the interior chamber of the housing and has an air inlet which is open to the interior chamber of the control unit's housing. The air pump generates reduced air pressure in the interior chamber which draws air into the housing and into the pump's inlet. This flow of air cools an electronic controller along with other components position in the housing. In one exemplary embodiment, the air pump draws air from the interior chamber of the housing and supplies the air to a combustion chamber of the fuel-fired burner to facilitate operation of the burner. An associated method of advancing air to a fuel-fired burner is also disclosed.

According to another aspect of the disclosure, a method of operating a fuel-fired burner of an emission abatement assembly is disclosed. The method includes supplying a reduced amount of fuel to the fuel-fired burner in response to detection of a burner shutdown request. Such a reduced fuel supply continues for a predetermined time period after which fuel is no longer supplied to the burner. In the exemplary embodiment described herein, the supply of both combustion air and atomization air, along with spark generation, continues for a period of time after the fuel is shutoff. After a period of time, combustion air is no longer supplied to the burner, but atomization air continues to be supplied and spark generation is maintained. After a period of time, the supply of atomization air is shutoff and spark generation ceases. In the exemplary embodiment described herein, a supply of cleaning air is substantially continuously supplied to the fuel-fired burner to reduce, or even prevent, clogging of the burner's fuel inlet nozzle. An electronic controller configured to control the components of the emission abatement assembly in such a manner is also disclosed.

According to another aspect of the disclosure, a method of monitoring engine performance as a function of soot accumulation in a particulate filter includes determining characteristics of soot accumulation in the filter, analyzing the characteristics, and generating an error signal if the characteristics are indicative of predetermined engine performance conditions. In one exemplary embodiment, the rate in which soot accumulates in the filter may be monitored. An increase in the rate in which soot accumulates in the filter (beyond predetermined limits) may be indicative of an engine condition such as excess oil usage or a stuck/leaking fuel injector. An electronic controller configured to monitor soot accumulation in such a manner is also herein disclosed.

According to another aspect of the disclosure, a smoke detector is used to detect the presence of fuel particles and/or smoke in the interior chamber of the control unit. If the presence of fuel particles and/or smoke is detected, the control unit may be shutdown thereby potentially avoiding damage to the control unit. A method of monitoring output from such a smoke detector is also disclosed.

According to another aspect of the disclosure, a temperature sensor is used to monitor the temperature within the interior chamber of the control unit. If the temperature exceeds a predetermined upper temperature limit, the control unit may be shutdown thereby potentially avoiding damage to the control unit. A method of monitoring output from such a temperature sensor is also disclosed.

According to another aspect of the present disclosure, a fuel pressure sensor is used to monitor fuel pressure in a fuel return line associated with the control unit's fuel pump. If fuel pressure in the return line exceeds a predetermined upper pressure limit, the control unit may be shutdown thereby potentially avoiding damage to the control unit. A method of monitoring output from such a fuel pressure sensor is also disclosed.

According to another aspect of the disclosure, a method of monitoring ash buildup in a particulate filter includes determining particulate accumulation in the filters subsequent to filter regeneration and generating an error signal if particulate accumulation exceeds a predetermined threshold. The particulate matter remaining in the filter subsequent to filter regeneration may be attributable to ash. As such, by monitoring the amount of particulate matter in the filter relatively soon, if not immediately, after filter regeneration, a determination may be made as to when the filter is in need of servicing to remove ash therefrom. An electronic controller configured to monitor ash buildup in such a manner is also disclosed.

According to another aspect of the disclosure, the electronic controller of the emission abatement assembly is electrically coupled to an engine control unit of an internal combustion engine. The electronic controller may be coupled to the engine control unit via a communications interface such as a Controller Area Network or "CAN" interface. In such a way, information may be shared between the electronic controller of the emission abatement assembly and the engine control unit.

According to another aspect of the present disclosure, a method of operating a fuel-fired burner includes monitoring the temperature at the outlet of a particulate filter during a filter regeneration cycle and adjusting operation of the fuel-fired burner if the filter outlet temperature exceeds a predetermined limit. In one embodiment, the fuel-fired burner is shutdown if the filter outlet temperature exceeds the predetermined limit. Prior to, or in lieu of, shutdown of the burner, the amount of fuel supplied to the fuel-fired burner may be reduced if the filter outlet temperature exceeds the predetermined limit.

According to another aspect of the present disclosure, a method of starting up a fuel-fired burner of an emission abatement assembly includes lowering the fuel rate being supplied to the burner once flame ignition is detected. The fuel rate is maintained at this lower level as the assembly preheats. Once preheated, the fuel level is ramped up to a predetermined operational fuel level.

According to another aspect of the disclosure, the electrodes of a fuel-fired burner are energized for a predetermined period of time prior to the introduction of fuel into the burner thereby removing any soot or other debris deposited on the electrodes.

According to another aspect of the disclosure, the operating conditions of the engine are monitored to facilitate airless filter regeneration. In one specific implementation, filter regeneration occurs when engine operating conditions are within a predetermined range.

According to another aspect of the disclosure, the exhaust gas flow entering through the gas inlet port of the fuel-fired burner is separated into a combustion flow which is advanced through the combustion chamber, and a bypass flow which bypasses the combustion chamber.

According to another aspect of the disclosure, soot loading in a particulate filter is monitored as a function of exhaust mass flow.

BRIEF DESCRIPTION OF THE DRAWINGS

FIG. 30 is a flowchart of a control routine for starting up the fuel-fired burners of the emission abatement assembly of FIG. 1;

FIG. 31 is an exemplary fuel level versus time graph which demonstrates aspects of the control routine of FIG. 30;

DETAILED DESCRIPTION OF THE DRAWINGS

Figure 1:
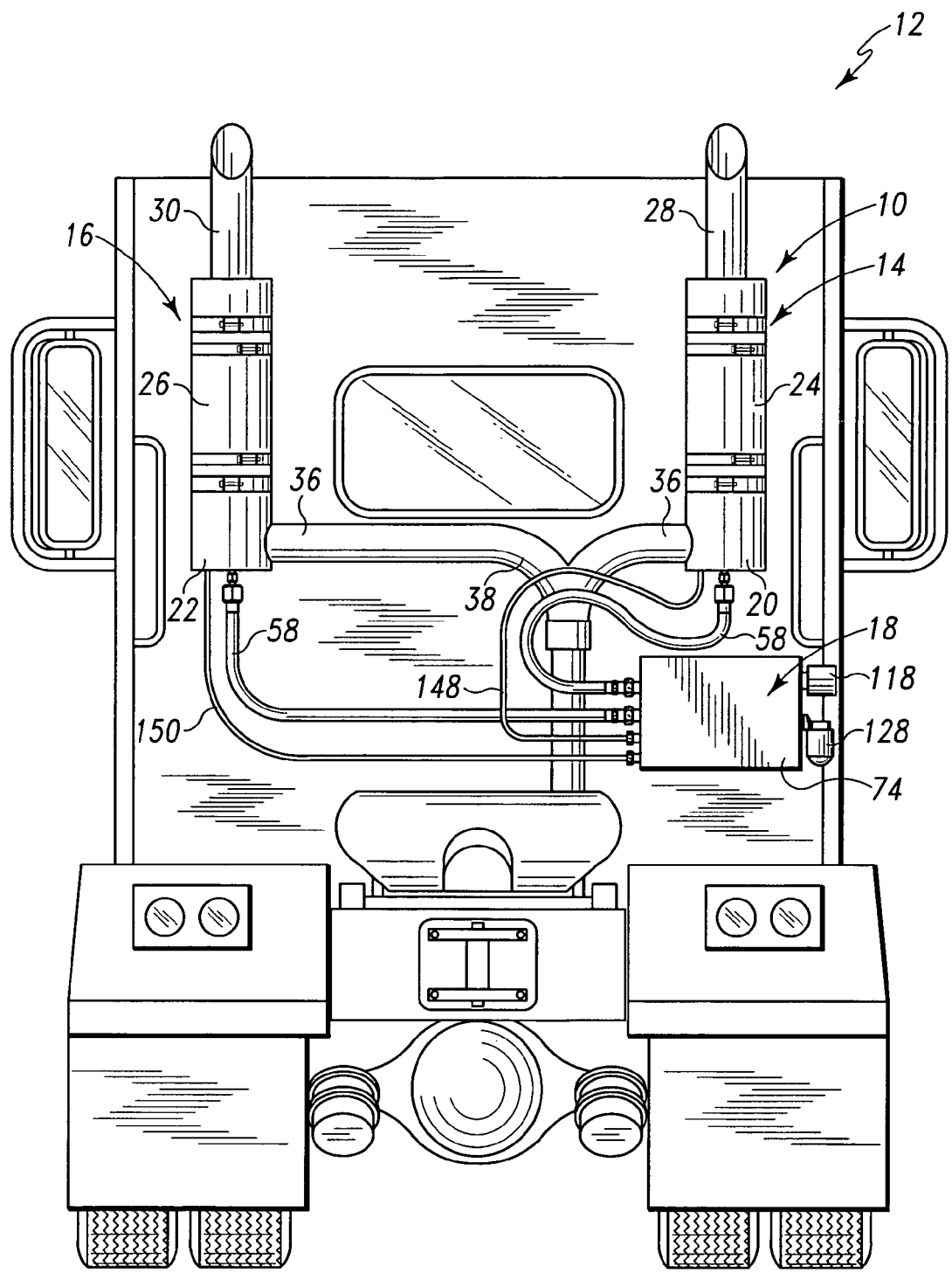
FIG. 1 is a rear elevational view of an on-highway truck with an emission abatement assembly installed thereon.

As will herein be described in more detail, an emission abatement assembly 10 for use with an internal combustion engine, such as the diesel engine of an on-highway truck 12, includes a pair of soot abatement assemblies 14, 16 under the control of a control unit 18. As shown in FIG. 1, each of the soot abatement assemblies 14, 16 has a fuel-fired burner 20, 22 and a particulate filter 24, 26, respectively. The fuel-fired burners 20, 22 are positioned upstream (relative to exhaust gas flow from the engine) from the respective particulate filters 24, 26. During operation of the engine, exhaust gas flows through the particulate filters 24, 26 thereby trapping soot in the filters. Treated exhaust gas is released into the atmosphere through exhaust pipes 28, 30. From time to time during operation of the engine, the control unit 18 selectively operates the fuel-fired burner 20 to regenerate the particulate filter 24 and the fuel-fired burner 22 to regenerate the particulate filter 26.

Referring now to FIGS. 2–5, the soot abatement assembly 14 is shown in greater detail. It should be appreciated that the soot abatement assembly 14 is substantially identical to the soot abatement assembly 16. As such, the discussion relating to the soot abatement assembly 14 of FIGS. 2–5 is relevant to the soot abatement assembly 16.

Figure 5:
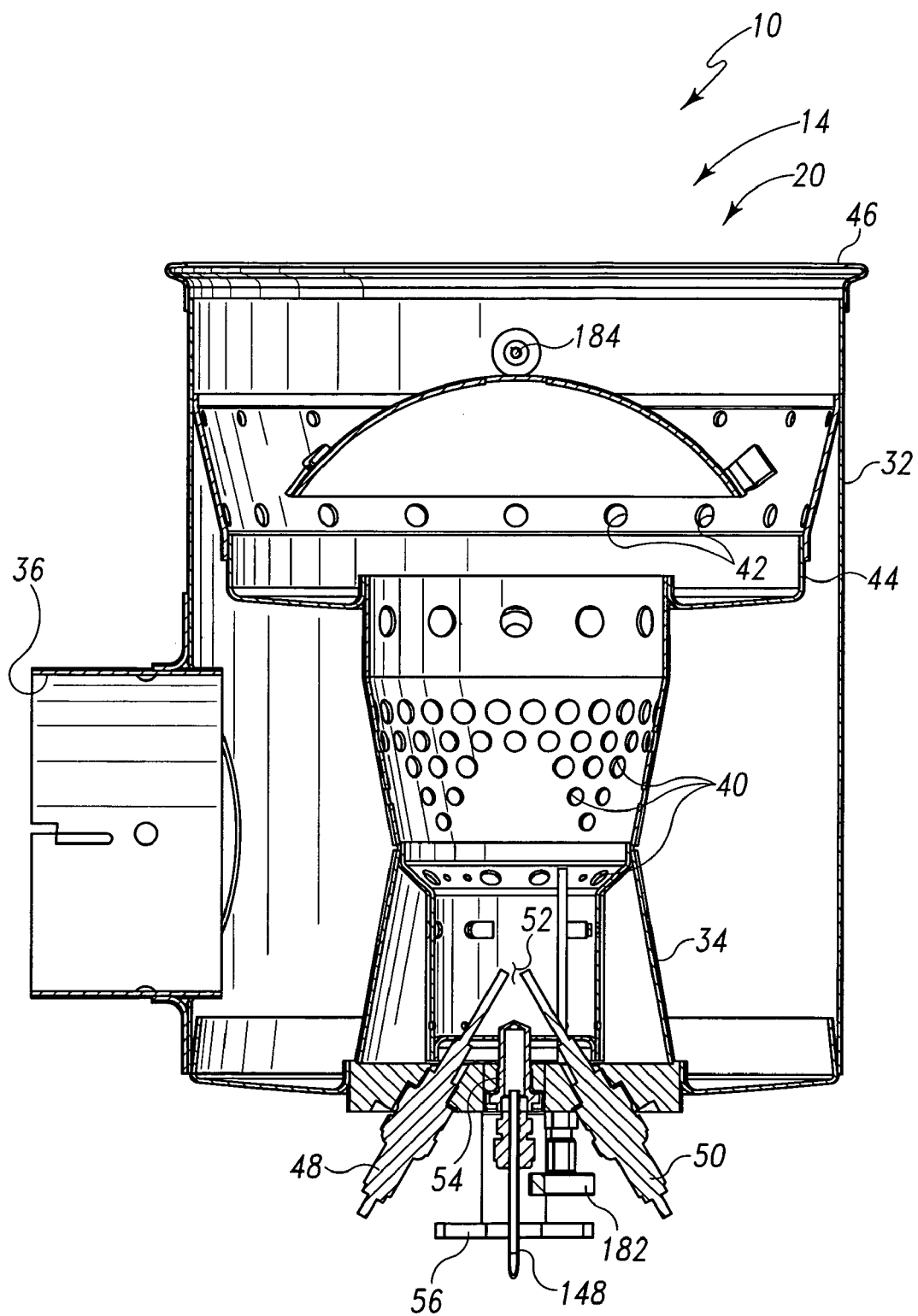
FIG. 5 is an enlarged cross sectional view of the fuel-fired burner of the soot abatement assembly of FIG. 4.

As shown in FIG. 5, the fuel-fired burner 20 of the soot abatement assembly 14 includes a housing 32 having a combustion chamber 34 positioned therein. The housing 32 includes an exhaust gas inlet port 36. As shown in FIG. 1, the exhaust gas inlet port 36 is secured to a T-shaped exhaust pipe 38 which conducts exhaust gas from the diesel engine of the truck 12 to both soot abatement assemblies 14, 16.

The combustion chamber 34 has a number of gas inlet openings 40 defined therein. Engine exhaust gas is permitted to flow into the combustion chamber 34 through the inlet openings 40. In such a way, an ignition flame present inside the combustion chamber 34 is protected from the full engine exhaust gas flow, while controlled amounts of engine exhaust gas are permitted to enter the combustion chamber 34 to provide oxygen to facilitate combustion of the fuel supplied to the burner 20. Exhaust gas not entering the combustion chamber 34 is directed through a number of openings 42 defined in a shroud 44 and out an outlet 46 of the housing 32.

The fuel-fired burner 20 includes an electrode assembly having a pair of electrodes 48, 50. As will be discussed in greater detail herein, the electrodes 48, 50 are electrically coupled to igniters of the control unit 18. When power is applied to the electrodes 48, 50, a spark is generated in the gap 52 between the electrodes 48, 50. Fuel enters the fuel-fired burner 20 through a fuel inlet nozzle 54 and is advanced through the gap 52 between the electrodes 48, 50 thereby causing the fuel to be ignited by the spark generated by the electrodes 48, 50. It should be appreciated that the fuel entering the nozzle 54 is generally in the form of a controlled air/fuel mixture.

The fuel-fired burner 20 also includes a combustion air inlet 56. As will be discussed in greater detail herein, an air pump associated with the control unit 18 generates a flow of pressurized air which is advanced to the combustion air inlet 56 via an air line 58 (see FIG. 1). During regeneration of the particulate filter 24, a flow of air is introduced into the fuel-fired burner 20 through the combustion air inlet 56 to provide oxygen (in addition to oxygen present in the exhaust gas) to sustain combustion of the fuel.

Figure 2:
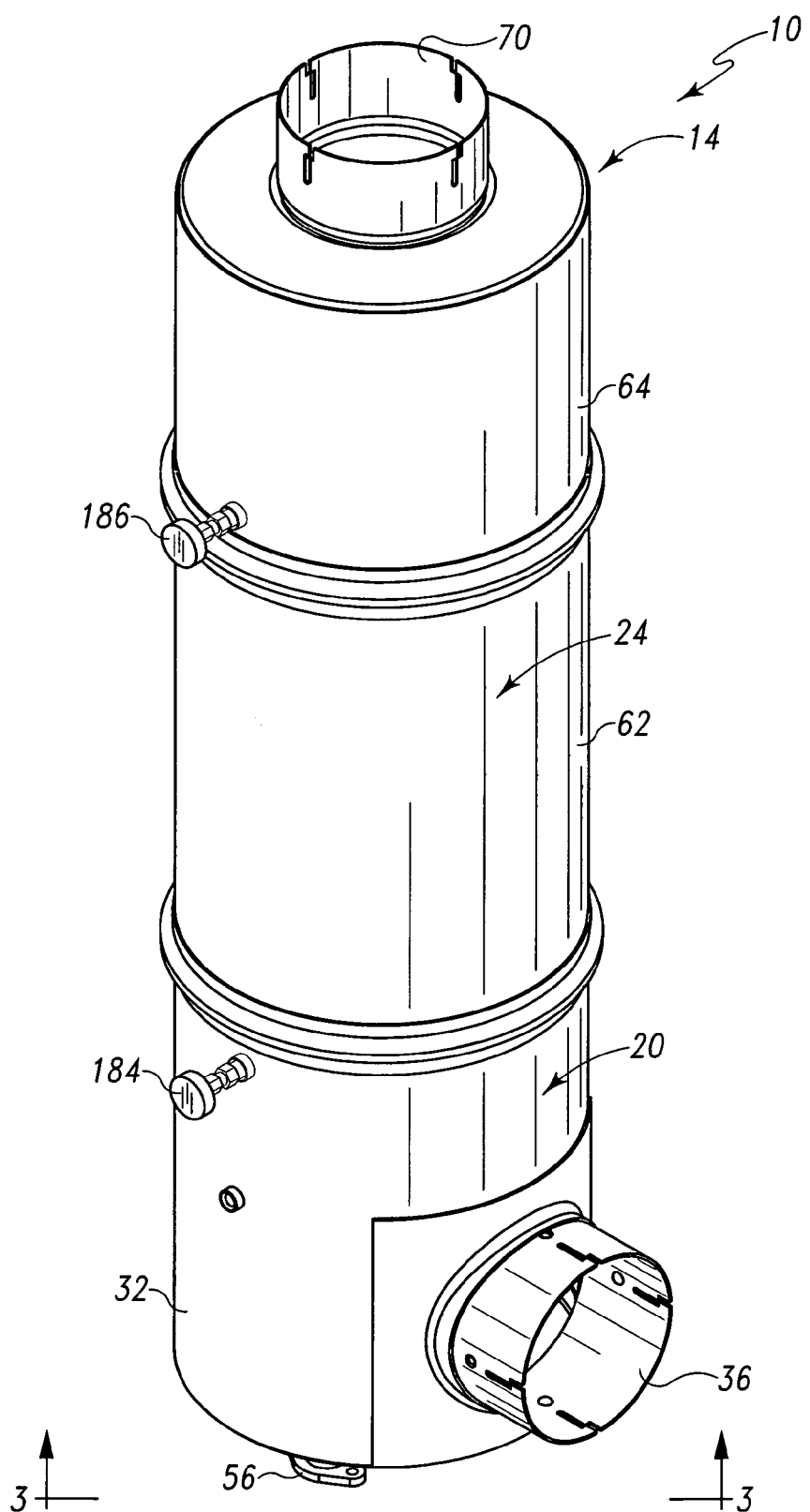
FIG. 2 is a perspective view of one of the soot abatement assemblies of the emission abatement assembly of FIG. 1.
Figure 3:
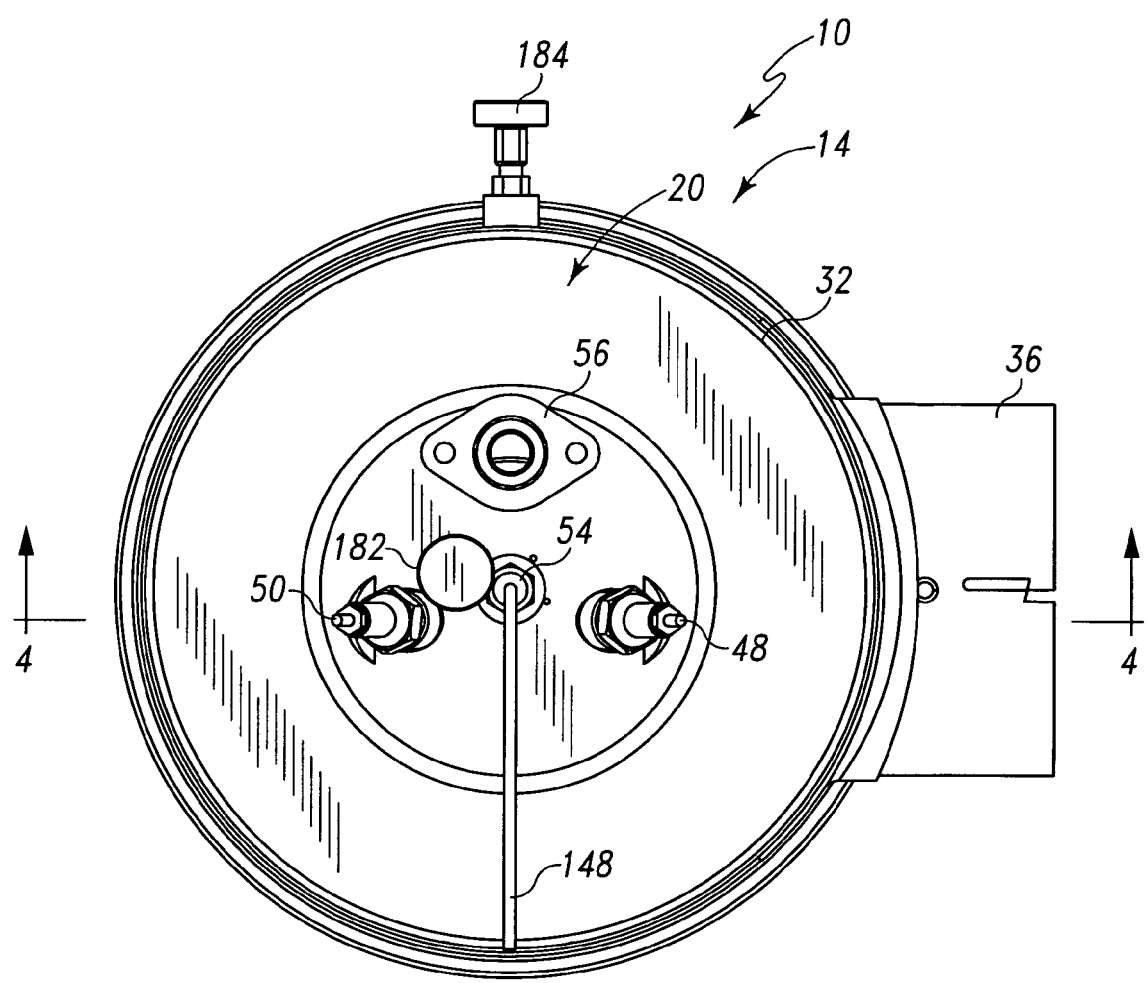
FIG. 3 is an elevational view of the end of the soot abatement assembly as viewed in the direction of the arrows of line 3—3 of FIG. 2.
Figure 4:
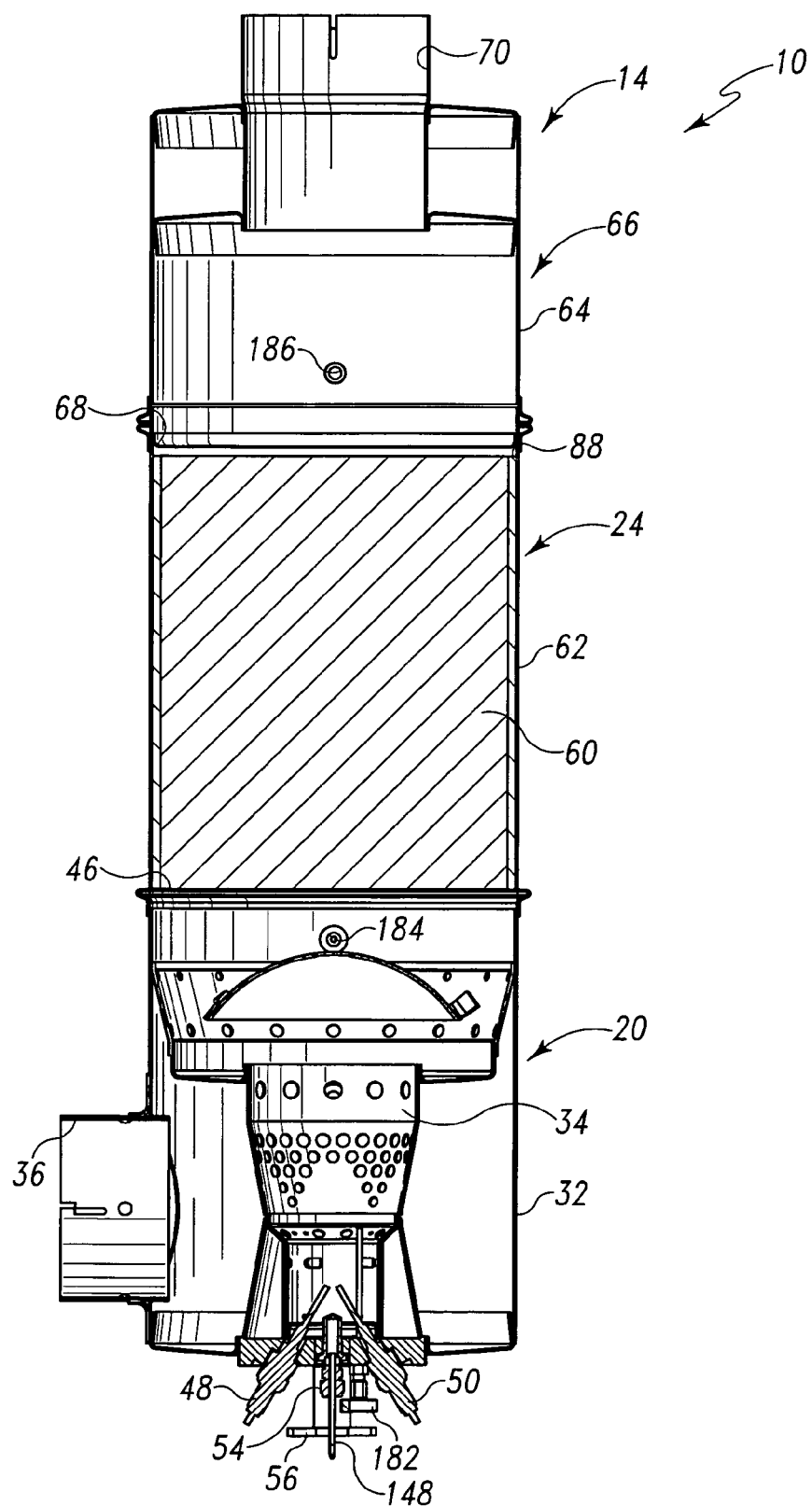
FIG. 4 is a cross sectional view of the soot abatement assembly of FIG. 2 taken along the line 4—4 of FIG. 3, as viewed in the direction of the arrows.

As shown in FIGS. 2 and 4, the particulate filter 24 is positioned downstream from the outlet 46 of the housing 32 of the fuel-fired burner 20 (relative to exhaust gas flow). The particulate filter 24 includes a filter substrate 60. As shown in FIG. 4, the substrate 60 is positioned in a housing 62. The filter housing 62 is secured to the burner housing 32. As such, gas exiting the burner housing 32 is directed into the filter housing 62 and through the substrate 60. The particulate filter 24 may be any type of commercially available particulate filter. For example, the particulate filter 24 may be embodied as any known exhaust particulate filter such as a "deep bed" or "wall flow" filter. Deep bed filters may be embodied as metallic mesh filters, metallic or ceramic foam filters, ceramic fiber mesh filters, and the like. Wall flow filters, on the other hand, may be embodied as a cordierite or silicon carbide ceramic filter with alternating channels plugged at the front and rear of the filter thereby forcing the gas advancing therethrough into one channel, through the walls, and out another channel. Moreover, the filter substrate 60 may be impregnated with a catalytic material such as, for example, a precious metal catalytic material. The catalytic material may be, for example, embodied as platinum, rhodium, palladium, including combinations thereof, along with any other similar catalytic materials. Use of a catalytic material lowers the temperature needed to ignite trapped soot particles.

The filter housing 62 is secured to a housing 64 of a collector 66. Specifically, an outlet 88 of the filter housing 62 is secured to an inlet 68 of the collector housing 64. As such, processed (i.e., filtered) exhaust gas exiting the filter substrate 60 (and hence the filter housing 62) is advanced into the collector 66. The processed exhaust gas is then advanced into the exhaust pipe 28 and hence released to the atmosphere through a gas outlet 70. It should be appreciated that the gas outlet 70 may be coupled to the inlet (or a pipe coupled to the inlet) of a subsequent emission abatement device (not shown) if the truck 12 is equipped with such a device.

Figure 6:
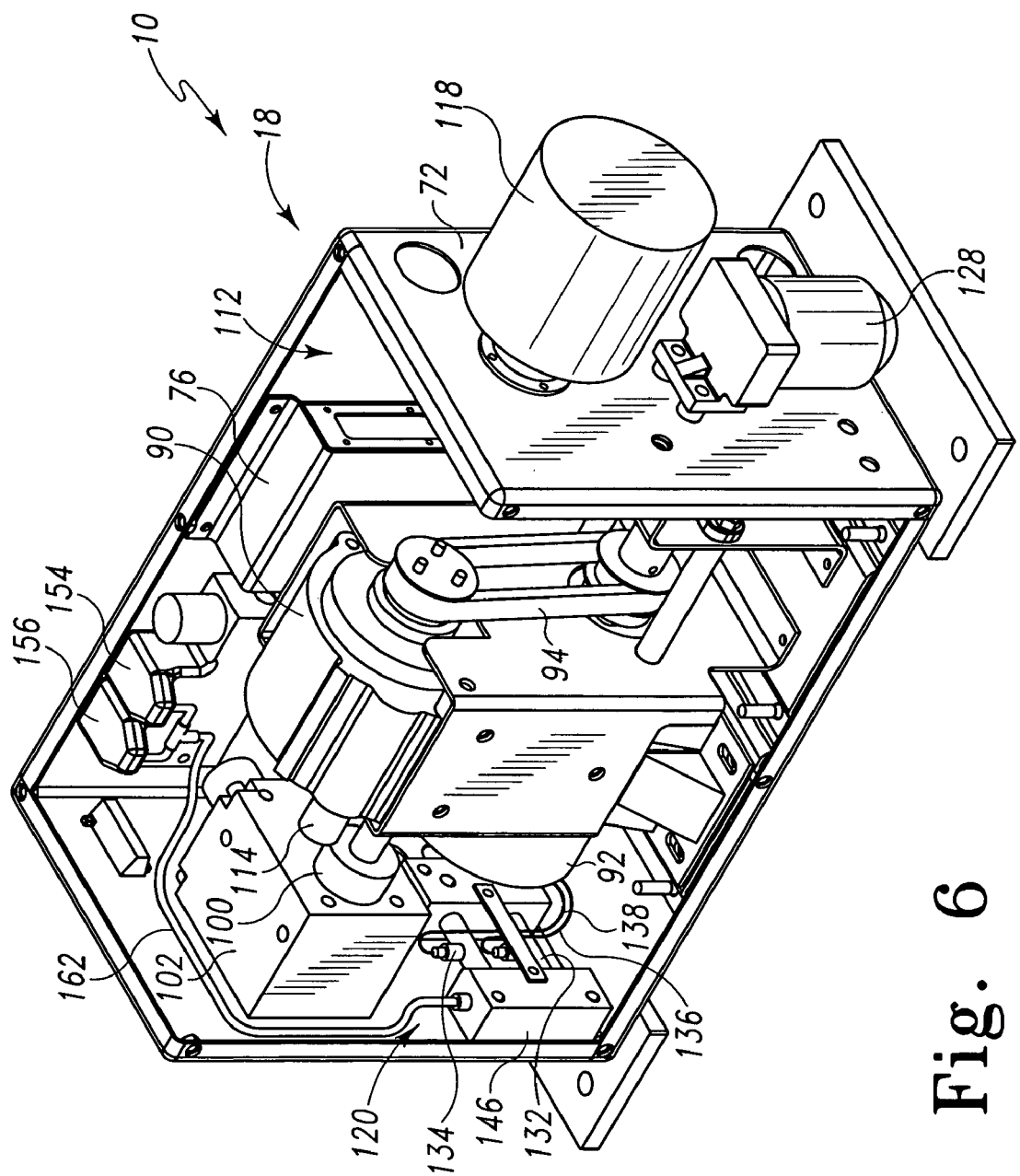
FIG. 6 is a perspective view of the control unit of the emission abatement assembly of FIG. 1, note that the cover has been removed for clarity of description.
Figure 7:
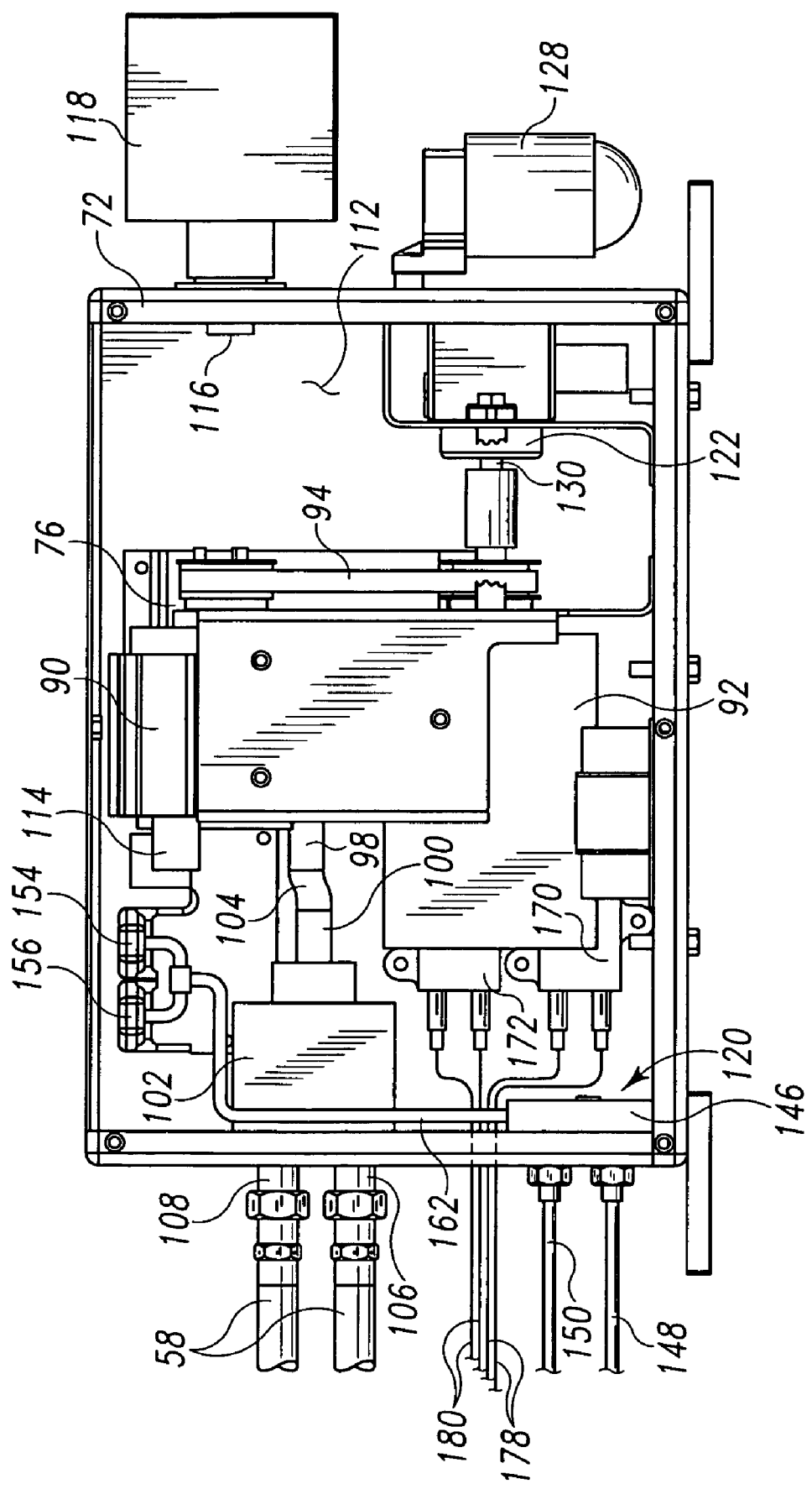
FIG. 7 is a side elevational view of the control unit of FIG. 6.
Figure 8:
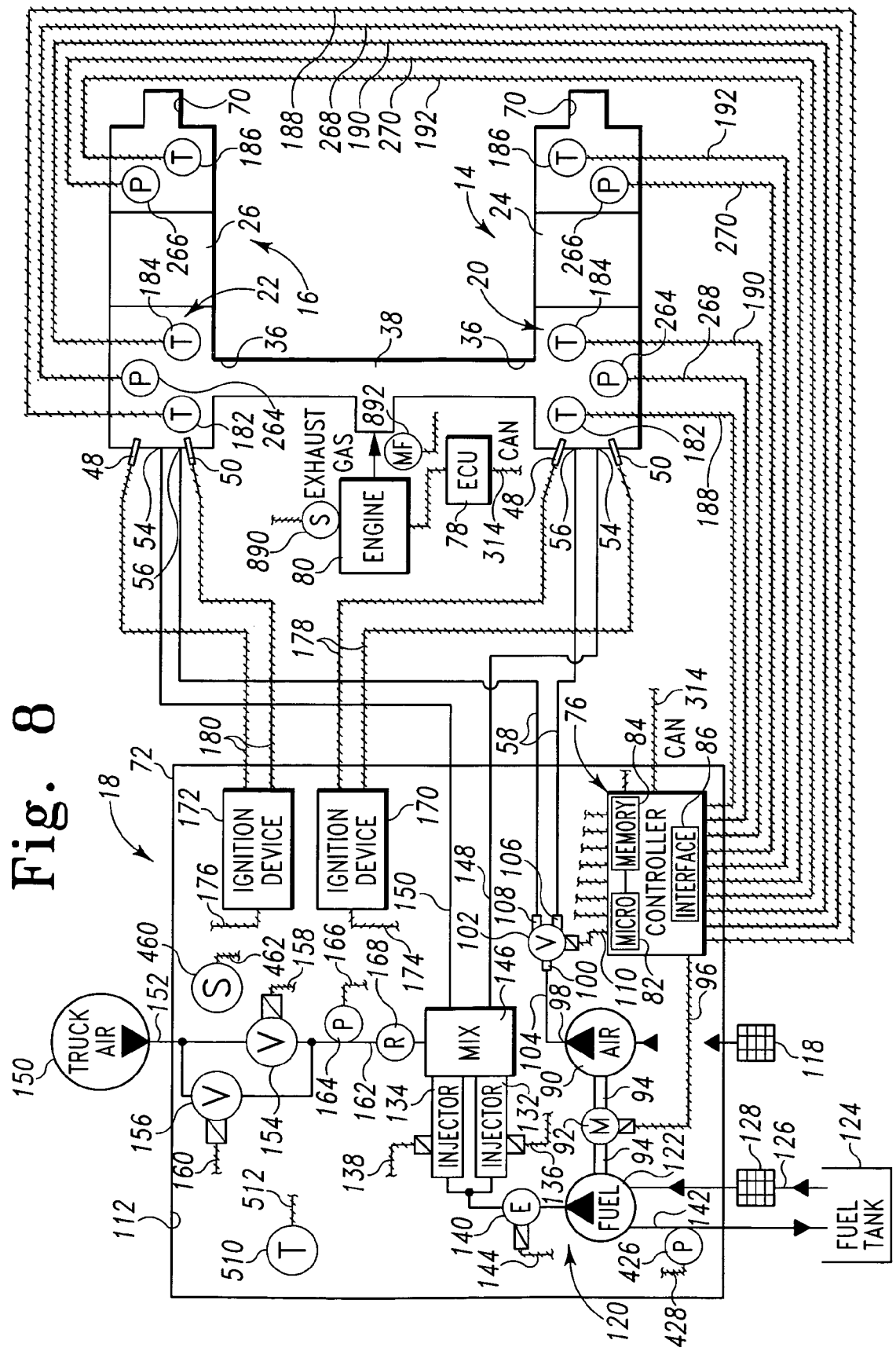
FIG. 8 is a diagrammatic view of the emission abatement assembly of FIG. 1.

Referring now to FIGS. 6–8, there is shown the control unit 18 in greater detail. The control unit 18 includes a housing 72 which defines an interior chamber 112. Numerous components associated with the control unit 18 are positioned in the interior chamber 112 of the housing 72. For ease of description, a sealed cover 74 (see FIG. 1) has been removed from the housing in FIGS. 6 and 7 to expose the components within the housing 72. The control unit 18 includes an electronic control unit (ECU) or "electronic controller" 76. The electronic controller 76 is positioned in the interior chamber 112 of the housing 72. The electronic controller 76 is, in essence, the master computer responsible for interpreting electrical signals sent by sensors associated with the emission abatement assembly 10 (and in some cases, the engine 80) and for activating electronically-controlled components associated with the emission abatement assembly 10. For example, the electronic controller 76 is operable to, amongst many other things, determine when one of the particulate filters 24, 26 of the soot abatement assemblies 14, 16 is in need of regeneration, calculate and control the amount and ratio of air and fuel to be introduced into the fuel-fired burners 20, 22, determine the temperature in various locations within the soot abatement assemblies 14, 16, operate numerous air and fuel valves, and communicate with an engine control unit 78 associated with the engine 80 of the truck 12.

To do so, the electronic controller 76 includes a number of electronic components commonly associated with electronic units utilized in the control of electromechanical systems. For example, the electronic controller 76 may include, amongst other components customarily included in such devices, a processor such as a microprocessor 82 and a memory device 84 such as a programmable read-only memory device ("PROM") including erasable PROM's (EPROM's or EEPROM's). The memory device 84 is provided to store, amongst other things, instructions in the form of, for example, a software routine (or routines) which, when executed by the processor 80, allows the electronic controller 76 to control operation of the emission abatement assembly 10.

The electronic controller 76 also includes an analog interface circuit 86. The analog interface circuit 86 converts the output signals from the various sensors (e.g., temperature sensors) into a signal which is suitable for presentation to an input of the microprocessor 82. In particular, the analog interface circuit 86, by use of an analog-to-digital (A/D) converter (not shown) or the like, converts the analog signals generated by the sensors into a digital signal for use by the microprocessor 82. It should be appreciated that the A/D converter may be embodied as a discrete device or number of devices, or may be integrated into the microprocessor 82. It should also be appreciated that if any one or more of the sensors associated with the emission abatement assembly 10 generate a digital output signal, the analog interface circuit 86 may be bypassed.

Similarly, the analog interface circuit 86 converts signals from the microprocessor 82 into an output signal which is suitable for presentation to the electrically-controlled components associated with the emission abatement assembly 10 (e.g., the fuel injectors, air valves, igniters, pump motor, etcetera). In particular, the analog interface circuit 86, by use of a digital-to-analog (D/A) converter (not shown) or the like, converts the digital signals generated by the microprocessor 82 into analog signals for use by the electronically-controlled components associated with the emission abatement assembly 10. It should be appreciated that, similar to the A/D converter described above, the D/A converter may be embodied as a discrete device or number of devices, or may be integrated into the microprocessor 82. It should also be appreciated that if any one or more of the electronically-controlled components associated with the emission abatement assembly 10 operate on a digital input signal, the analog interface circuit 86 may be bypassed.

Hence, the electronic controller 76 may be operated to control operation of the fuel-fired burners 20, 22. In particular, the electronic controller 76 executes a routine including, amongst other things, a closed-loop control scheme in which the electronic controller 76 monitors outputs of the sensors associated with the emission abatement assembly 10 to control the inputs to the electronically-controlled components associated therewith. To do so, the electronic controller 76 communicates with the sensors associated with the emission abatement assembly to determine, amongst numerous other things, the temperature at various locations within the soot abatement assemblies 14, 16 and the pressure drop across the filter substrate 60. Armed with this data, the electronic controller 76 performs numerous calculations each second, including looking up values in preprogrammed tables, in order to execute algorithms to perform such functions as determining when or how long the fuel injectors are operated, controlling the power level input to the electrodes 48, 50, controlling the air advanced through combustion air inlet 56, etcetera.

The control unit 18 also includes an air pump 90. The air pump 90 is driven by an electric motor 92 which is under the control of the electronic controller 76. The motor 92 drives a pulley 94 which in turn drives the air pump 90. A signal line 96 electrically couples the air pump 90 to the electronic controller 76. The outlet 98 of the air pump 90 is coupled to an inlet 100 of an electronically-controlled air valve 102 via an air line 104. A first outlet 106 of the air valve 102 is coupled to the combustion air inlet 56 of the fuel-fired burner 20 via one of the air lines 58, whereas a second outlet 108 of the air valve 102 is combustion air inlet 56 of the fuel-fired burner 22 via the other air line 58.

The air valve 102 is electrically coupled to the electronic controller 76 via a signal line 110. As such, the electronic controller 76 may control position of the valve 102. In particular, the electronic controller 76 may position the air valve 102 in either a first valve position in which combustion air from the air pump 90 is directed to the fuel-fired burner 20 or a second valve position in which combustion air from the air pump 90 is directed to the fuel-fired burner 22. As will herein be described in greater detail, the controller 76 operates the air valve 102 to direct combustion air to the fuel-fired burner 20, 22 associated with the particulate filter 24, 26 undergoing regeneration.

As shown in FIGS. 6 and 7, the inlet 114 of the air pump 90 is open to the interior chamber 112 of the control housing 72. As such, the air pump 90 draws air from the interior chamber 112 of the control housing 72. The control housing 72 has an air inlet 116. The air inlet 116 is open to the interior chamber 112. An air filter 118 is secured to the housing 72 and is positioned to filter air being drawn into the interior chamber 112 through the air inlet 116. When operated, the air pump 90 generates reduced air pressure in the interior chamber 112 thereby drawing air from the atmosphere through the filter 118, the air inlet 116, and into the interior chamber 112. Air in the interior chamber 112 is then drawn into the pump inlet 114 and pumped to the air valve 102. When the cover 74 is secured in place (see FIG. 1), the housing 72 is substantially sealed such that substantially all of the air drawn into the interior chamber 112 by the air pump 90 is drawn through the filter 118 (and hence the air inlet 116).

Since both the pump inlet 114 and the housing inlet 116 are open to the interior chamber 112 (as opposed to being coupled to one another, for example, by an air hose or other type of conduit), a flow of air is generated in the interior chamber 112 as air advances from the housing inlet 116 to the pump inlet 114. Such an arrangement facilitates cooling of the electronic controller 76 since the controller 76 is exposed to at least a portion of the air flow in the interior chamber 112. In particular, the electronic controller 76 generates heat during operation thereof. Heat from the electronic controller 76 is transferred to the air advancing through the interior chamber 112 thereby cooling the electronic controller 76. Such an arrangement facilitates the placement of the controller 76 in the housing 72 (as opposed to positioning the controller outside the housing 72 to be exposed to atmospheric temperatures). Moreover, in certain embodiments, cooling the electronic controller 76 in such a manner eliminates the need for heatsinks or other heat dissipating devices.

The control unit 18 also includes a fuel delivery assembly 120 configured to supply a desired mixture of air and fuel ("air/fuel mixture") to the fuel-fired burners 20, 22. In particular, the fuel-fired burners 20, 22 combust or otherwise process fuel in the form of a mixture of air and fuel. As is defined in this specification, the term "air/fuel mixture" is defined to mean a mixture of any amount of air and any amount of fuel including a "mixture" of only fuel. Moreover, the term "air-to-fuel ratio" is intended to mean the relationship between the air component and the fuel component of such air/fuel mixtures.

One illustrative embodiment of the fuel delivery assembly 120 will herein be described in greater detail. However, it should be appreciated that such a description is exemplary in nature and that the fuel delivery assembly 120 may be embodied in numerous different configurations.

In the illustrative embodiment described herein, the fuel delivery assembly 120 includes a fuel pump 122 which draws diesel fuel from a fuel tank 124 of the truck 12 via a fuel line 126. A fuel filter 128 filters the fuel drawn from the tank 124. As shown in FIGS. 6 and 7, the motor-driven pulley 94 drives an input shaft 130 of the fuel pump 122. As such, the motor 92 drives both the air pump 90 and the fuel pump 122.

The fuel pump 122 supplies a pressurized flow of fuel to a pair of electronically-controlled fuel injectors 132, 134. As shown in FIG. 8, a signal line 136 electrically couples the fuel injector 132 to the electronic controller 76 thereby allowing the controller 76 to control operation of the injector 132. Similarly, a signal line 138 electrically couples the fuel injector 134 to the electronic controller 76 thereby allowing the controller 76 to control operation of the injector 134.

An electronically-controlled fuel enable valve 140 selectively allows fuel to be supplied to the fuel injectors 132, 134 from the fuel pump 122. Specifically, when positioned in an open valve position, the fuel enable valve 140 allows fuel to be advanced to the fuel injectors 132, 134. However, when the fuel enable valve 140 is positioned in a closed valve position, fuel is not supplied to the fuel injectors 132, 134. Fuel pumped by the pump 122, but not supplied to the injectors 132, 134, is returned to the truck's fuel tank 124 via a fuel return line 142. The fuel enable valve 140 is electrically coupled to the electronic controller 76 via a signal line 144. The electronic controller 76 generates output signals on the signal line 144 to control operation (e.g., position) of the fuel enable valve 140.

The fuel injectors 132, 134 are selectively operated by the electronic controller 76 to inject quantities of fuel into a mixing chamber 146 where the fuel is mixed with air to produce an air/fuel mixture having a desired air-to-fuel ratio which is then delivered to the fuel inlet nozzle 54 of the fuel-fired burners 20, 22 by a pair of fuel lines 148, 150. Specifically, the electronic controller 76 generates output signals on the signal line 136 which cause the fuel injector 132 to inject a specific desired quantity of fuel into the mixing chamber 146 where the fuel mixes with air and is delivered to the fuel inlet nozzle 54 of the fuel-fired burner 20 via the fuel line 148. Similarly, the electronic controller 76 generates output signals on the signal line 138 which cause the fuel injector 134 to inject a specific desired quantity of fuel into the mixing chamber 146 where the fuel mixes with air and is delivered to the fuel inlet nozzle 54 of the fuel-fired burner 22 via the fuel line 150.

In the exemplary embodiment described herein, the air delivered to the mixing chamber 146 is supplied from a pressurized air source 150 associated with the truck 12. For example, the pressurized air source 150 may be the truck's pneumatic brake pump(s). Pressurized air from the air source 150 is supplied to the control unit 18 via an air line 152. A pair of electronically-controlled air valves 154, 156 control the amount of air supplied to the mixing chamber 146.

The air valve 154 supplies a flow of cleaning air which, as described herein in greater detail, is generally constantly supplied to the mixing chamber 146 during operation of the engine 80 of the truck 12. Such a flow of air prevents the accumulation of debris (e.g., soot) in the fuel inlet nozzles 54 of the fuel-fired burners 20, 22. Such a flow of cleaning air may be pulsed at relatively high pressure for short interval of time to reduce clogging of the nozzles 54 with soot or other debris. For example, under software control, the cleaning air flow may be pulsed such that the air is supplied at, for example, 60 psi for 15 seconds, and then shutoff (or reduced in pressure) for 45 seconds, and then pulsed again, and so on. It has been found that such rapid increases in air pressure create a force or "shock" which facilitates soot removal.

As shown in FIG. 8, the air valve 156 is positioned in a parallel flow arrangement with the cleaning air valve 154. The air valve 156 supplies a flow of air which is summed with the air flow from the cleaning air valve 154. This combined flow of air is used for fuel atomization during operation of the fuel-fired burners 20, 22. As such, during regeneration of one of the particulate filters 24, 26, both the atomization air valve 156 and the cleaning air valve 154 are positioned in their respective open valve positions to supply air to the mixing chamber 146 to atomize the fuel injected into the mixing chamber 146 by the fuel injectors 132, 134.

The cleaning air valve 154 is electrically coupled to the electronic controller 76 via a signal line 158. The electronic controller 76 generates output signals on the signal line 158 to control operation (e.g., position) of the cleaning air valve 154. Similarly, the atomization air valve 156 is electrically coupled to the electronic controller 76 via a signal line 160. The electronic controller 76 generates output signals on the signal line 160 to control operation (e.g., position) of the atomization air valve 156.

As shown in FIG. 8, air exiting the air valves 154, 156 is supplied to the mixing chamber 146 via an air line 162. A pressure transducer 164 senses the air pressure in the air line 162. The output from the transducer 164 is communicated to the electronic controller 76 via a signal line 166. The output from the transducer 164 may be used by the electronic controller 76 to verify that a desired air flow is being supplied to the mixing chamber 146. For example, in the exemplary embodiment described herein, the air-to-fuel ratio of the air/fuel mixture being supplied to the fuel-fired burners 20, 22 is varied by varying the amount of fuel injected into the mixing chamber 146 with the amount of air supplied to the mixing chamber 146 remaining substantially constant. As such, the output from the pressure transducer 164 may be monitored by the electronic controller 76 to confirm that the desired, substantially constant flow of air is being supplied to the mixing chamber 146.

As described above, fueling of the fuel-fired burners 20, 22 is adjusted by altering the amount of fuel added to a substantially constant flow of atomization air. For example, to increase the amount of fuel being supplied to the fuel-fired burner 20 (i.e., to decrease the air-to-fuel ratio of the air/fuel mixture being supplied to the burner 20), the electronic controller 76 operates the fuel injector 132 to increase the amount of fuel being injected into the mixing chamber 146 with the amount of air being introduced into the mixing chamber 146 remaining substantially constant. Similarly, to increase the amount of fuel being supplied to the fuel-fired burner 22 (i.e., to decrease the air-to-fuel ratio of the air/fuel mixture being supplied to the burner 20), the electronic controller 76 operates the fuel injector 134 to increase the amount of fuel being injected into the mixing chamber 146 with the amount of air being introduced into the mixing chamber 146 remaining substantially constant.

Conversely, to decrease the amount of fuel being supplied to the fuel-fired burner 20 (i.e., to increase the air-to-fuel ratio of the air/fuel mixture being supplied to the burner 20), the electronic controller 76 operates the fuel injector 132 to decrease the amount of fuel being injected into the mixing chamber 146 with the amount of air being introduced into the mixing chamber 146 remaining substantially constant. To decrease the amount of fuel being supplied to the fuel-fired burner 22 (i.e., to increase the air-to-fuel ratio of the air/fuel mixture being supplied to the burner 20), the electronic controller 76 operates the fuel injector 134 to decrease the amount of fuel being injected into the mixing chamber 146 with the amount of air being introduced into the mixing chamber 146 remaining substantially constant.

As shown in FIG. 8, a pressure regulator 168 regulates the fluid pressure in the mixing chamber 146. Specifically, the pressure regulator 168 ensures that a predetermined pressure is not exceeded in the mixing chamber 146. For example, in many commercial systems, air from the truck's pressurized air source 150 is present at 90 psi. The pressure regulator 168 reduces the pressure of the air delivered to the mixing chamber 146 to a lower level such as, for example, 40 psi.

The control unit 18 also includes a pair of ignition devices or igniters 170, 172. The igniters 170, 172 are electrically coupled to the electronic controller 76 via signal lines 174, 176, respectively. As such, the controller 76 may selectively generate control signals on the signal lines 174, 176 to control operation of the igniters 170, 172. The igniter 170 is electrically coupled to the electrodes 48, 50 of the fuel-fired burner 20 via a high voltage cable 178, whereas igniter 172 is electrically coupled to the electrodes 48, 50 of the fuel-fired burner 22 via a high voltage cable 180. Actuation of the igniter 170 causes a spark to be generated in the gap 52 between the electrodes 48, 50 of the fuel-fired burner 20 thereby igniting the air/fuel mixture entering the burner 20 through the fuel inlet nozzle 54. Similarly, actuation of the igniter 172 causes a spark to be generated in the gap 52 between the electrodes 48, 50 of the fuel-fired burner 22 thereby igniting the air/fuel mixture entering the burner 22 through the fuel inlet nozzle 54.

The igniters 170, 172 may be embodied as any type of device suitable to generate the spark across the electrode gap 52 of the electrodes 48, 50. For example, the igniters 170, 172 may be embodied as one or more of the devices disclosed in U.S. patent application Ser. No. 10/737,333 entitled "Power Supply and Transformer" which was filed on Dec. 16, 2003 by Stephen P. Goldschmidt and Wilbur H. Crawley. The entirety of this patent application is hereby incorporated by reference.

As alluded to above, the electronic controller 76 monitors the output of a number of sensors associated with the soot abatement assemblies 14, 16. For example, each of the soot abatement assemblies 14, 16 includes a flame temperature sensor 182, a control temperature sensor 184, and a outlet temperature sensor 186. The temperature sensors 182, 184, 186 are electrically coupled to the electronic controller 76 via signal lines 188, 190, 192, respectively. As shown in FIGS. 2–5, the temperature sensors 182, 184, 186 may be embodied as thermocouples which extend through the housings of the soot abatement assemblies 14, 16, although other types of sensors may also be used.

The electronic controller 76 monitors output from the flame temperature sensor 182 to detect or otherwise determine presence of an ignition flame in the combustion chamber 34 of the fuel-fired burner 20, 22. Specifically, when the electronic controller 76 initiates ignition of the fuel-fired burner 20, 22, the controller 76 may monitor output from the flame temperature sensor 182 to ensure that the air/fuel mixture entering the burner 20, 22 is being ignited by the spark from the electrodes 48, 50. An error signal is generated if the output of the flame temperature sensor does not meet a predetermined criteria.

The electronic controller 76 monitors output from the control temperature sensor to adjust the fueling of the fuel-fired burner 20, 22 to maintain the temperature of the heat exerted the particulate filter 24, 26 within a predetermined temperature range. For example, a temperature control range may be designed that allows for sufficient heat to adequately regenerate the particulate filter 24, 26, while also preventing the filter 24, 26 from being exposed to excessive temperatures that may damage the filter 24, 26. It should be appreciated that a temperature control range may be designed to meet many other objectives.

Figure 9:
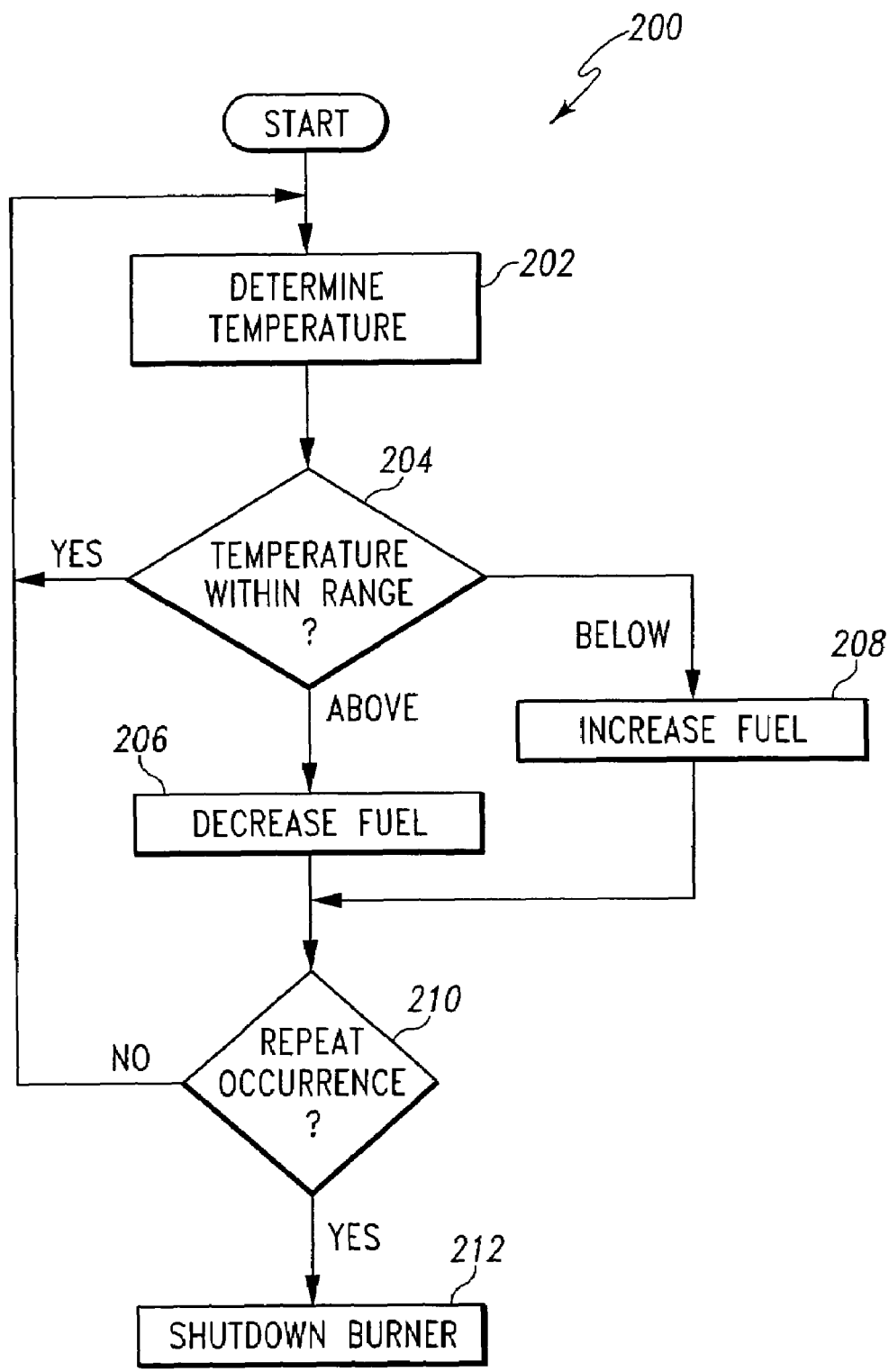
FIG. 9 is a flowchart of a control routine for monitoring operation of the fuel-fired burners of the emission abatement assembly during a filter regeneration cycle.
Figure 10:
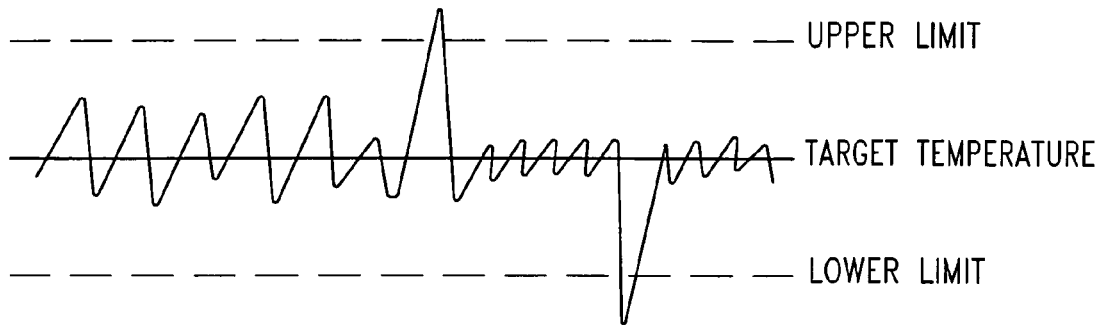
FIG. 10 is an exemplary temperature graph which demonstrates aspects of the control routine of FIG. 9.

An exemplary temperature control routine 200 for controlling the fuel-fired burners 20, 22 during filter regeneration is shown in FIGS. 9 and 10. The control routine 200 begins with step 202 in which the electronic controller 76 determines the temperature of the heat generated by the burner. In particular, the electronic controller 76 scans or otherwise reads the signal line 190 to monitor output from the control temperature sensor 184. Once the electronic controller 76 has determined the temperature of the heat being generated by the fuel-fired burner 20, 22, the routine 200 advances to step 204.

In step 204, the electronic controller 76 determines if the sensed temperature of the heat generated by the fuel-fired burner 20, 22 is within a predetermined temperature control range. In particular, as described herein, a predetermined temperature control range may be established. In the exemplary embodiment described herein, a target temperature (e.g., 650° C. if the particulate filter 24, 26 is non-catalyzed or 350° C. if the filter 24, 26 is catalyzed) may be utilized in conjunction with a predetermined upper and lower control limit (see FIG. 10). As such, in step 204, the electronic controller 76 determines if the sensed temperature of heat generated by the fuel-fired burner 20, 22 is within the predetermined temperature control range (i.e., less than the upper limit and greater than the lower limit). If the temperature of the heat generated by the fuel-fired burner 20, 22 is within the predetermined temperature control range, the control routine 200 loops back to step 202 to continue monitoring the output from the control temperature sensor 184. However, if the temperature of the heat generated by the fuel-fired burner 20, 22 is not within the predetermined temperature control range, a control signal is generated and the control routine 200 advances to step 206 if the temperature of the heat generated by the fuel-fired burner 20, 22 is above the upper control limit or step 208 if the temperature of the heat generated by the fuel-fired burner 20, 22 is below the lower control limit.

In step 206, the electronic controller 76 decreases the fuel being supplied to the fuel-fired burner 20, 22. To do so, the electronic controller 76 increases the air-to-fuel ratio of the air/fuel mixture being supplied to the burner 20, 22 by reducing the amount of fuel being injected into the mixing chamber 146 by the fuel injectors 132, 134. For example, to decrease the fuel being supplied to the fuel-fired burner 20, the electronic controller 76 generates a control signal on the signal line 136 that reduces the amount of fuel being injected by the fuel injector 132 into the mixing chamber 146 thereby increasing the air-to-fuel ratio of the air/fuel mixture being supplied to the fuel-fired burner 20 via the fuel line 148. Similarly, to decrease the fuel being supplied to the fuel-fired burner 22, the electronic controller 76 generates a control signal on the signal line 138 that reduces the amount of fuel being injected by the fuel injector 134 into the mixing chamber 146 thereby increasing the air-to-fuel ratio of the air/fuel mixture being supplied to the fuel-fired burner 22 via the fuel line 150. Once the fuel being supplied to the fuel-fired burner 20, 22 has been decreased, the control routine advances to step 210.

In step 210, the electronic controller 76 determines if the out-of-range condition in step 206 is a repeat occurrence. More specifically, the controller 76 determines if a predetermined number of temperature readings have been outside of the temperature control range. In particular, the electronic controller 76 monitors the results of previous fuel adjustments to determine if the fuel-fired burner 20, 22 has returned to operation within the predetermined temperature control range. If the controller 76 determines that a predetermined number of temperature readings have been outside of the temperature control range, the electronic controller 76 concludes that the fuel-fired burner 20, 22 cannot be brought back into control, an error signal is generated, and the control routine 200 advances to step 212. Otherwise, the control routine 200 loops back to step 202 to continue monitoring operation of the fuel-fired burner 20, 22 during filter regeneration.

In step 212, the electronic controller 76 shuts down the fuel-fired burner 20, 22. In particular, since the electronic controller 76 concluded in step 210 that the fuel-fired burner 20, 22 cannot be brought back into control, the controller 76 ceases to supply fuel to the affected burner 20, 22, ceases to generate a spark between the electrodes 48, 50, or otherwise ceases operation of the affected burner 20, 22.

Referring back to step 204, if the temperature of the heat generated by the fuel-fired burner 20, 22 is below the lower control limit, the control routine advances to step 208. In step 208, the electronic controller 76 increases the fuel being supplied to the fuel-fired burner 20, 22. To do so, the electronic controller 76 decreases the air-to-fuel ratio of the air/fuel mixture being supplied to the burner 20, 22 by increasing the amount of fuel being injected into the mixing chamber 146 by the fuel injectors 132, 134. For example, to increase the fuel being supplied to the fuel-fired burner 20, the electronic controller 76 generates a control signal on the signal line 136 that increases the amount of fuel being injected by the fuel injector 132 into the mixing chamber 146 thereby decreasing the air-to-fuel ratio of the air/fuel mixture being supplied to the fuel-fired burner 20 via the fuel line 148. Similarly, to increase the fuel being supplied to the fuel-fired burner 22, the electronic controller 76 generates a control signal on the signal line 138 that increases the amount of fuel being injected by the fuel injector 134 into the mixing chamber 146 thereby decreasing the air-to-fuel ratio of the air/fuel mixture being supplied to the fuel-fired burner 22 via the fuel line 150. Once the fuel being supplied to the fuel-fired burner 20, 22 has been increased, the control routine advances to step 210 to determine if control of the fuel-fired burner has been regained in the manner previously discussed.

Figure 11:
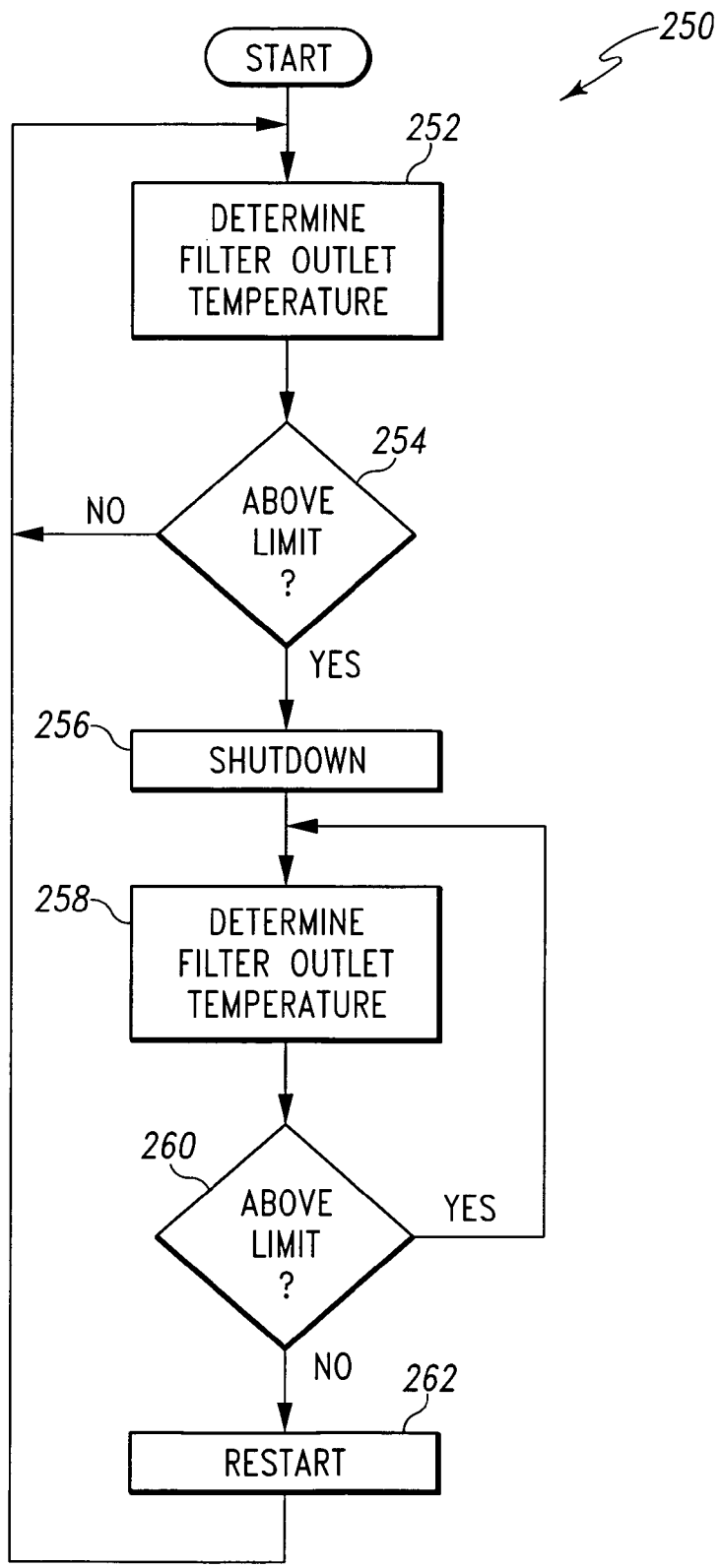
FIG. 11 is a flowchart of a control routine for monitoring the filter outlet temperature during a filter regeneration cycle.

Output from the outlet temperature sensor 186 may also be utilized by the electronic controller 76 to control operation of the fuel-fired burner 20, 22 during regeneration of the particulate filter 24, 26. In particular, as shown in FIG. 11, a control routine 250 may be executed by the electronic controller 76 during filter regeneration. The control routine 250 begins with step 252 in which the electronic controller 76 determines the temperature at the outlet of the particulate filter 24, 26. In particular, the electronic controller 76 scans or otherwise reads the signal line 192 to monitor output from the outlet temperature sensor 186. Once the electronic controller 76 has determined the temperature at the outlet of the particulate filter 24, 26, the routine 250 advances to step 254.

In step 254, the electronic controller 76 determines if the sensed filter outlet temperature is above a predetermined upper temperature limit. If the filter outlet temperature is below the upper temperature limit, the control routine 250 loops back to step 252 to continue monitoring output from the outlet temperature sensor 186. However, if the filter outlet temperature is above the upper control limit, the control routine 250 advances to step 256.

In step 256, the electronic controller 76 shuts down the fuel-fired burner 20, 22. In particular, since the electronic controller 76 concluded in step 254 that the filter outlet temperature was above the upper control limit, the controller 76 ceases to supply fuel to the affected burner 20, 22, ceases to generate a spark between the electrodes 48, 50, or otherwise ceases operation of the affected burner 20, 22. The control routine 250 then advances to step 258.

In steps 258 and 260, the electronic controller 76 determines if the filter outlet temperature has cooled to a temperature below the upper control limit. In particular, in step 258 the electronic controller 76 scans or otherwise reads the signal line 192 to monitor output from the outlet temperature sensor 186 to determine the temperature at the outlet of the particulate filter 24, 26. Once the electronic controller 76 has determined the temperature at the outlet of the particulate filter 24, 26, the routine 250 advances to step 260.

In step 260, the electronic controller 76 determines if the sensed filter outlet temperature is still above the predetermined upper temperature limit. If the filter outlet temperature is still above the upper control limit, the control routine 250 loops back to step 258 to continue monitoring output from the outlet temperature sensor 186. However, if the filter outlet temperature is now below the upper temperature limit, the control routine 250 advances to step 262.

In step 262, the electronic controller 76 restarts the fuel-fired burner 20, 22. In particular, since the electronic controller 76 concluded in step 260 that the filter outlet temperature is now below the upper control limit, the controller 76 commences to supply fuel to the affected burner 20, 22, generates the spark between the electrodes 48, 50, and otherwise re-commences operation of the affected burner 20, 22. The control routine 250 then loops back to step 252 to monitor operation of the burner 20, 22.

The electronic controller 76 also monitors the output of a number of pressure sensors associated with the soot abatement assemblies 14, 16. For example, each of the soot abatement assemblies 14, 16 includes a filter inlet pressure sensor 264 and a filter outlet pressure sensor 266 (see FIG. 8). The pressure sensors 264 and 266 are electrically coupled to the electronic controller 76 via signal lines 268 and 270, respectively. The pressure sensors 264, 266 may be embodied as any type of pressure sensing device such as, for example, commercially available pressure transducers.

Regeneration of the particulate filters 24, 26 may be commenced as a function of output from the pressure sensors 264, 266. For example, the pressure sensors 264, 266 may be utilized to sense the pressure difference across the particulate filter 24, 26 (i.e., the "pressure drop" across the filter) to determine when the filter 24, 26 requires regeneration. Specifically, when the pressure drop across one of the particulate filters 24, 26 increases to a predetermined value, the filter regeneration process may be commenced for that particular filter 24, 26. It should be appreciated that the pressure sensors 264, 266 may be embodied as a single sensor. In particular, a single sensor which measures a differential pressure may be used. Such sensors have two input ports, one of which measures pressure upstream of the filter, the other of which measures pressure downstream of the filter. In operation, such a sensor measures the pressure difference between its ports and generates an output relating to the same. Moreover, it should also be appreciated that in certain embodiments, a single pressure sensor on either side of particulate filter 24, 26 may be utilized. In such a configuration, output from the single pressure sensor is monitored to determine when pressure exceeds a predetermined upper threshold or is below a predetermined lower threshold (as opposed to monitoring the pressure drop across the filter).

It should be appreciated that the control scheme utilized to initiate filter regeneration may be designed in a number of different manners. For example, a timing-based control scheme may be utilized in which the regeneration of the particulate filters 24, 26 is commenced as a function of time. For instance, regeneration of particulate filters 24, 26 may be performed at predetermined timed intervals.

The output from the pressure sensors 264, 266 may also be used in conjunction with other information to trigger regeneration of the particulate filters 24, 26. For example, the pressure drop across the filter 24, 26, as a function of the exhaust mass flow from the engine 80, may be used to trigger filter regeneration. To do so, a data table (e.g., a map) of the particulate filter 24, 26 is first experimentally generated. To generate such a map, the pressure drop across the filter 24, 26 as a function of exhaust mass flow at various particulate (soot) loadings is mapped. Specifically, the filter 24, 26 is first impregnated with a given amount of soot. Such an amount of soot may be indicative of a desired loading that would necessitate regeneration. For instance, if it is desirable to regenerate a particular type of particulate filter 24, 26 when it is loaded with, for example, 5.0 grams/liter, the filter being utilized to experimentally generate the map is first pre-loaded with such an amount of soot (i.e., 5.0 grams/liter). Once pre-loaded, the pressure drop across the filter is experimentally measured at a plurality different exhaust mass flows. A lookup table (e.g., a map) can then be generated which includes a plurality of the experimentally derived pressure drop values each of which corresponds to one of the plurality of different exhaust mass flow values. Such a map may be programmed into the controller 76.

The map of such experimentally derived pressure drop values may then be used to determine when to trigger regeneration. In particular, during operation of the engine 80, the controller 76 may determine the current pressure drop across the filter 24, 26 and exhaust mass flow from the engine 80. As described herein, the pressure drop may be determined by monitoring output from the pressure sensors 264, 266. As described in greater detail below, the controller 76 may determine exhaust mass flow by monitoring the output from a mass flow sensor 892 (see FIG. 8), such as a hot wire mass flow sensor. It should be appreciated that the controller 76 may communicate with the mass flow sensor 892 directly, or may obtain the output from the sensor 892 from the engine control unit 78 via a CAN interface 314 (the CAN interface 314 is described in greater detail below). Alternatively, exhaust mass flow may be calculated by the controller 76 in a conventional manner by use of engine operation parameters such as engine RPM, turbo boost pressure, and intake manifold temperature (along with other known parameters such as engine displacement). It should be appreciated that the controller 76 may itself calculate the mass flow, or may obtain the calculated mass flow from the engine control unit 78 via the CAN interface 314.

Once the controller 76 has determined both the pressure drop across the particulate filter 24, 26 and the exhaust mass flow from the engine 80, the controller 76 queries the lookup table (i.e., the map) to retrieve the experimentally created limit value which corresponds to the sensed (or calculated) exhaust mass flow of the engine 80. The controller 76 then compares the sensed pressure drop across the particulate filter 24, 26 to the retrieved limit value. If the sensed pressure drop across the filter 24, 26 exceeds the retrieved limit value, the controller 76 determines that the filter 24, 26 is in need of regeneration and commences a regeneration cycle.

Figure 34:
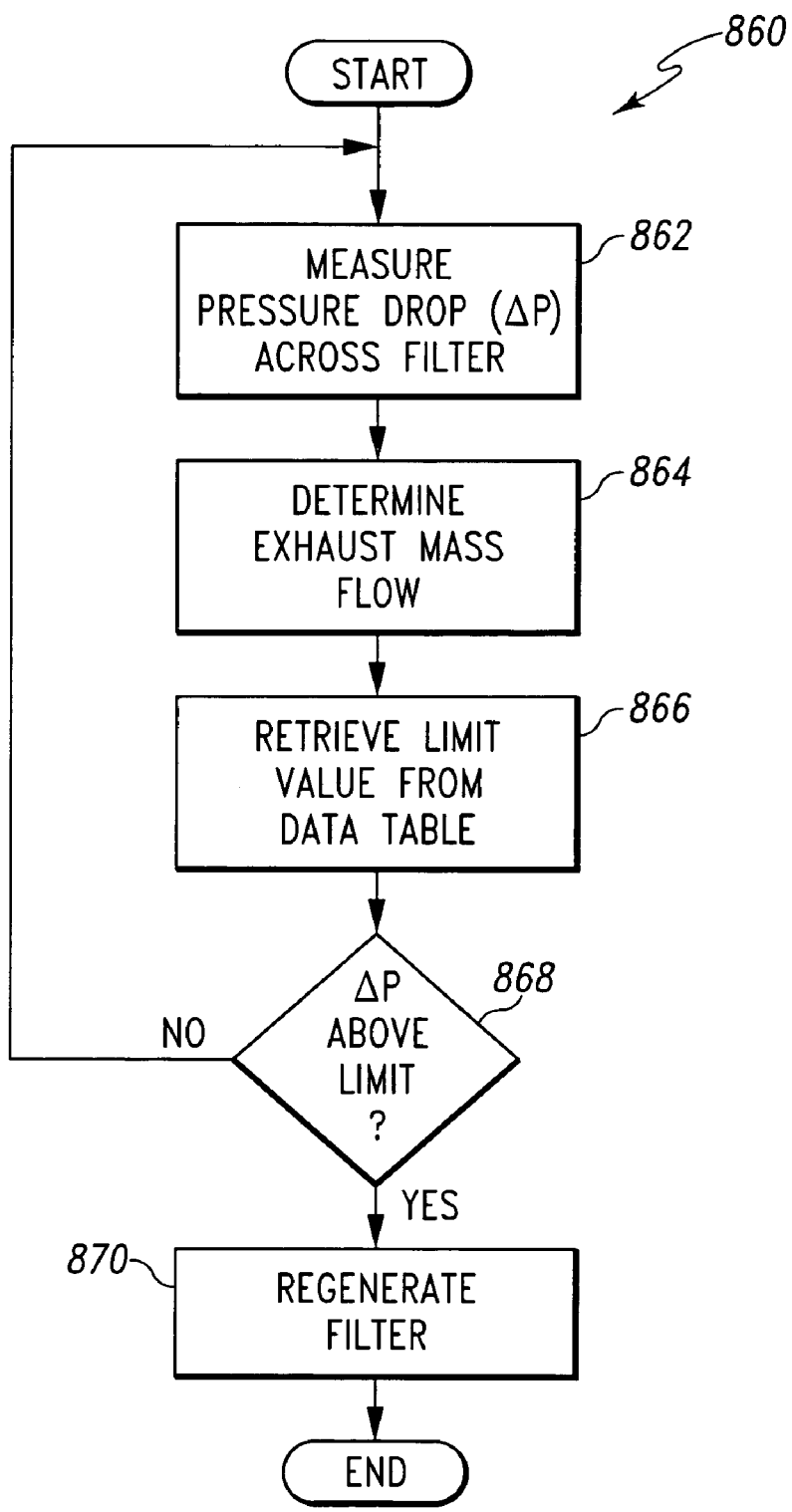
FIG. 34 is a flowchart of a control routine for triggering filter regeneration.

An exemplary control routine 860 for triggering filter regeneration based on the pressure drop across the filter as a function of exhaust mass flow is shown in FIG. 34. The routine 860 commences with step 862 in which the electronic controller 76 determines the pressure drop ($\Delta P$) across the particulate filter 24, 26. Specifically, the controller 76 monitors the output from the pressure sensors 264, 266 and thereafter calculates the pressure drop ($\Delta P$) across the filter. The control routine 860 then advances to step 864.

In step 864, the controller 76 determines the exhaust mass flow from the engine 80. As described above, the controller 76 may determine the exhaust mass flow by monitoring the output from the mass flow sensor 892, or by calculating it with the use of engine operation parameters such as engine RPM, turbo boost pressure, and intake manifold temperature (along with other known parameters such as engine displacement). In either case, once the controller determines the exhaust mass flow, the control routine advances to step 866.

In step 866, the controller 76 queries the lookup table (i.e., the filter map) to retrieve the experimentally created limit value which corresponds to the sensed (or calculated) exhaust mass flow (as determined in step 864). Once the controller 76 has retrieved the limit value from the lookup table, the control routine 860 advances to step 868.

In step 868, the controller 76 compares the sensed pressure drop across the particulate filter 24, 26 (as determined in step 862) to the retrieved limit value. If the sensed pressure drop across the filter 24, 26 exceeds the retrieved limit value, the controller 76 concludes that the filter 24, 26 is in need of regeneration, and the control routine 860 advances to step 870. If the sensed pressure drop across the filter 24, 26 does not exceed the retrieved limit value, the control routine 860 loops back to step 860 to continue monitoring accumulation in the filter 24, 26.

In step 870, the controller 76 commences filter regeneration. Specifically, the electronic controller 76 operates the fuel-fired burner 20, 22 to regenerate the particulate filter 24, 26 in any of the numerous manners described herein. Once filter regeneration is complete, the control routine 870 ends.

The output from the pressure sensors 264, 266 may also be utilized to monitor performance of the engine 80. In particular, characteristics of soot accumulation within the particulate filters 24, 26 may be indicative of certain engine performance characteristics. For example, excessive or otherwise irregular soot accumulation in the particulate filters 24, 26 may be indicative of excessive oil usage by the engine 80. Excessive or otherwise irregular soot accumulation in the particulate filters 24, 26 may also be indicative of a stuck or leaky engine fuel injector. The electronic controller 76 may be configured to monitor and analyze the output from the pressure sensors 264, 266 to determine if any such engine conditions exist.

It should be appreciated that if a given design utilizes methods or devices other than pressure sensors to determine soot accumulation within the particulate filters 24, 26, the output from such methods or devices may be monitored and analyzed to determine if any such engine conditions exist. As such, although an exemplary embodiment of a control scheme for monitoring engine performance as a function of soot accumulation in the filters 24, 26 based on output from the pressure sensors 264, 266 will now be described in greater detail, it should be appreciated that such a description is not intended to be limited to only pressure sensor-based systems.

Figure 12:
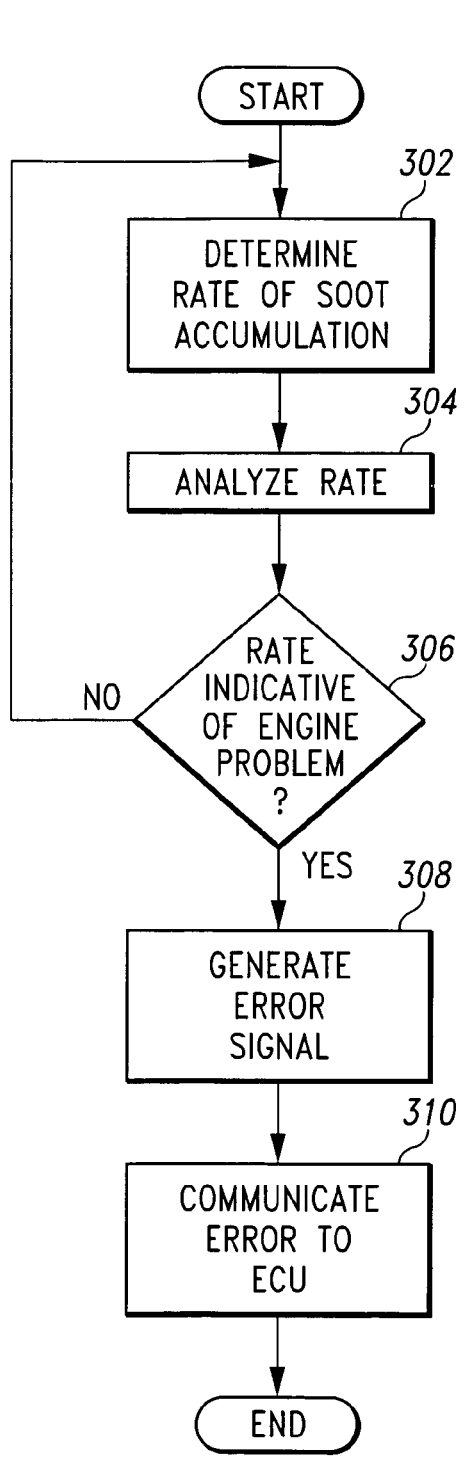
FIG. 12 is a flowchart of a control routine for monitoring engine performance as a function of soot accumulation in the particulate filters of the emission abatement assembly of FIG. 1.
Figure 13:
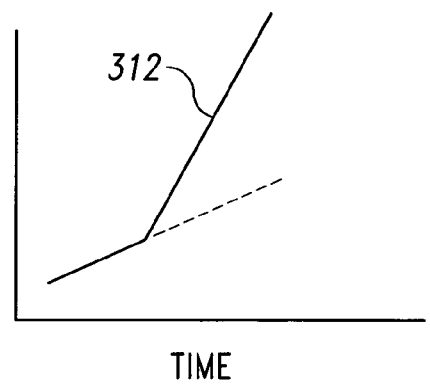
FIG. 13 is an exemplary delta pressure versus time graph which demonstrates aspects of the control routine of FIG. 12.

Referring now to FIG. 12, there is shown an exemplary embodiment of a control routine 300 for monitoring engine performance as a function of soot accumulation within the particulate filters 24, 26. The routine commences with step 302 in which the electronic controller 76 determines the rate of soot accumulation within the particulate filters 24, 26. In particular, during operation of the engine 80, the pressure drop across the particulate filters 24, 26 ($\Delta P$) is continuously monitored by the controller 76. Specifically, at a predetermined frequency, the output from pressure sensors 264, 266 is read so that the pressure drop ($\Delta P$) may be calculated and thereafter stored in a table in a memory device (e.g., RAM or other memory device associated with the electronic controller 82). Over time, the pressure drop ($\Delta P$) may be tracked. For example, a graphical representation which tracks the pressure drop ($\Delta P$) across one of the filters 24, 26 as a function of time is shown in FIG. 13. In the exemplary embodiment described herein, the rate of soot accumulation may be determined by tracking the pressure drop ($\Delta P$) over time as indicated with the line 312 in the graphical representation of FIG. 13. Once the electronic controller 76 has determined the rate of soot accumulation within the soot particulate filter 24, 26, the routine 300 advances to step 304.

In step 304, the electronic controller 76 analyzes the rate of soot accumulation within the particulate filter 24, 26. In the exemplary embodiment described herein, the controller 76 analyzes the rate of soot accumulation within the particulate filter 24, 26 by analyzing the slope of the line 312 generated by tracking the pressure drop ($\Delta P$) over time. For example, if the slope of the line 312 remains relatively constant (i.e., within predetermined limits deemed to be indicative of a constant slope), such as indicated with a dashed line in FIG. 13, the electronic controller 76 concludes that there is no change in the rate in which soot is accumulating within particulate filter 24, 26. However, if the slope of the line 312 increases beyond predetermined limits (as shown in the solid line in FIG. 13), the electronic controller 76 concludes that there is a change in the rate in which soot is accumulating within the particulate filter 24, 26. It should be appreciated that other methods may be utilized to analyze the rate of soot accumulation within the filter 24, 26 with the method described herein being merely exemplary in nature. Once the electronic controller 76 has analyzed the soot accumulation within the particulate filter 24, 26, the control routine 300 advances to step 306.

In step 306, the electronic controller 76 determines if the rate of soot accumulation within particulate filter 24, 26 is indicative of a predetermined engine condition. Specifically, a lookup table stored in the in the memory device 84 (or other memory device associated with the electronic controller 82) may be queried to determine if the rate of soot accumulation, as analyzed in step 304, matches predetermined criteria. For example, the contents of the lookup table are used to determine if the analysis of step 304 is indicative of no change in the rate of soot accumulation or change that is within predetermined acceptable limits. If so, the controller 76 concludes that the rate of soot accumulation is not indicative of an engine condition, and the control routine loops back to step 302 to continue monitoring soot accumulation within the filters 24, 26. The contents of the lookup table may also be used to determine if the analysis performed in step 304 is indicative of change in the rate of soot accumulation that is outside of predetermined limits. If so, the controller 76 concludes that the rate of soot accumulation may be indicative of an engine condition, and the control routine 300 advances to step 308.

In step 308, the electronic controller 76 generates an error signal. For example, the electronic controller 76 may generate an output signal which causes a visual, audible, or other type of alarm to be generated for presentation to the operator (e.g., the driver of the truck 12). The error signal may simply cause an electronic log or the like to be updated with information associated with the filter analysis of steps 302–306.

As indicated in step 310, the error signal may be communicated to the engine control unit (ECU) 78 associated with the engine 80. The details of doing so will now be described in greater detail. However, it should be appreciated that such a description is not limited to communication of the error signal generated in step 308 of the control routine 300, but rather any error signal herein described (along with any other error signal generated by the controller 76) may be communicated to the engine control unit 78. Moreover, as will be discussed herein in greater detail, the engine control unit 78 may communicate information, such as engine operation information, to the controller 76.

In a conventional manner, engine systems, such as the engine 80 of the truck 12, include an engine control unit which is, in essence, the master computer responsible for interpreting electrical signals sent by engine sensors and for activating electronically-controlled engine components to control the engine. For example, an engine control unit is operable to, amongst many other things, determine the beginning and end of each injection cycle of each engine cylinder, or determine both fuel metering and injection timing in response to sensed parameters such as engine crankshaft position and RPM, engine coolant and intake air temperature, and absolute intake air boost pressure.

Error signals generated by the controller 76 (or subsequent signals generated in response the error signal) may be communicated to the engine control unit 78. Specifically, the electronic controller 76 of the emission abatement assembly 10 may be configured to communicate with the engine control unit 78 via an interface 314. The interface 314 may be any type of communication interface which enables electronic communication between the electronic controller 76 and the engine control unit 78. One type of interface which is suitable for use as the interface 314 is a Controller Area Network or "CAN" interface. A CAN interface is a serial bus network of microcontrollers that connects devices, sensors and actuators in a system or sub-system for real-time control applications. Details of a CAN interface, which was first developed by Robert Bosch GmbH in 1986, are documented in ISO 11898 (for applications up to 1 Mbps) and ISO 11519 (for applications up to 125 Kbps), both of which are hereby incorporated by reference.

By use of the CAN interface 314, information such as engine RPM and turbo boost pressure may be obtained from the engine control unit 78 for use by the electronic controller 76. Such information may be used by the controller 76 in the execution of certain control routines. By using information from the engine control unit 78, a redundant sensor array to determine such information solely for use by the electronic controller is eliminated.

Moreover, the CAN interface 314 allows for the transfer of error signals (e.g., error flags) or the like to the engine control unit 78 for use by the engine control unit 78 during its operation. For example, an error signal indicative of an engine problem (as described in regard to the control routine 300) may be communicated to the engine control unit 78. Armed with this information, the engine control unit 78 may be programmed to perform additional engine analysis, generate an error signal to the truck operator (e.g., an indicator light on the truck's instrument cluster), or store the error message in an error log which can be accessed by a service technician. The CAN interface 314 also allows an engine manufacturer to assume some degree of control over the operation of the emission abatement assembly 10, if desired.

As such, it should be appreciated that the controller 76 of the control unit 18 monitors operation of the fuel-fired burners 20, 22 (and other components of the emission abatement assembly 10) to determine if any of the predetermined conditions described herein (or other conditions) are met. The controller 76 may then generate a signal, such as an error signal, indicative of such conditions and communicate such a signal to the engine control unit 78 via the CAN interface 314. Moreover, the CAN interface 314 may be used by the engine control unit 78 to communicate information, such as information relating to engine operation, to the controller 76. For example, information relating to engine RPM or turbo boost pressure may be communicated to the controller 76 via the CAN interface 314. In addition to engine operation information, if so configured, the engine control unit 78 may also generate and communicate control signals for controlling operation of the fuel-fired burners 20, 22 to the controller 76. For example, the engine control unit 78 may be programmed to initiate regeneration cycles of the particulate filters 24, 26. In such a case, the engine control unit 78 may generate and communicate a control signal to the controller 76 which causes the controller 76 to commence regeneration of one of the particulate filters 24, 26.

Figure 29:
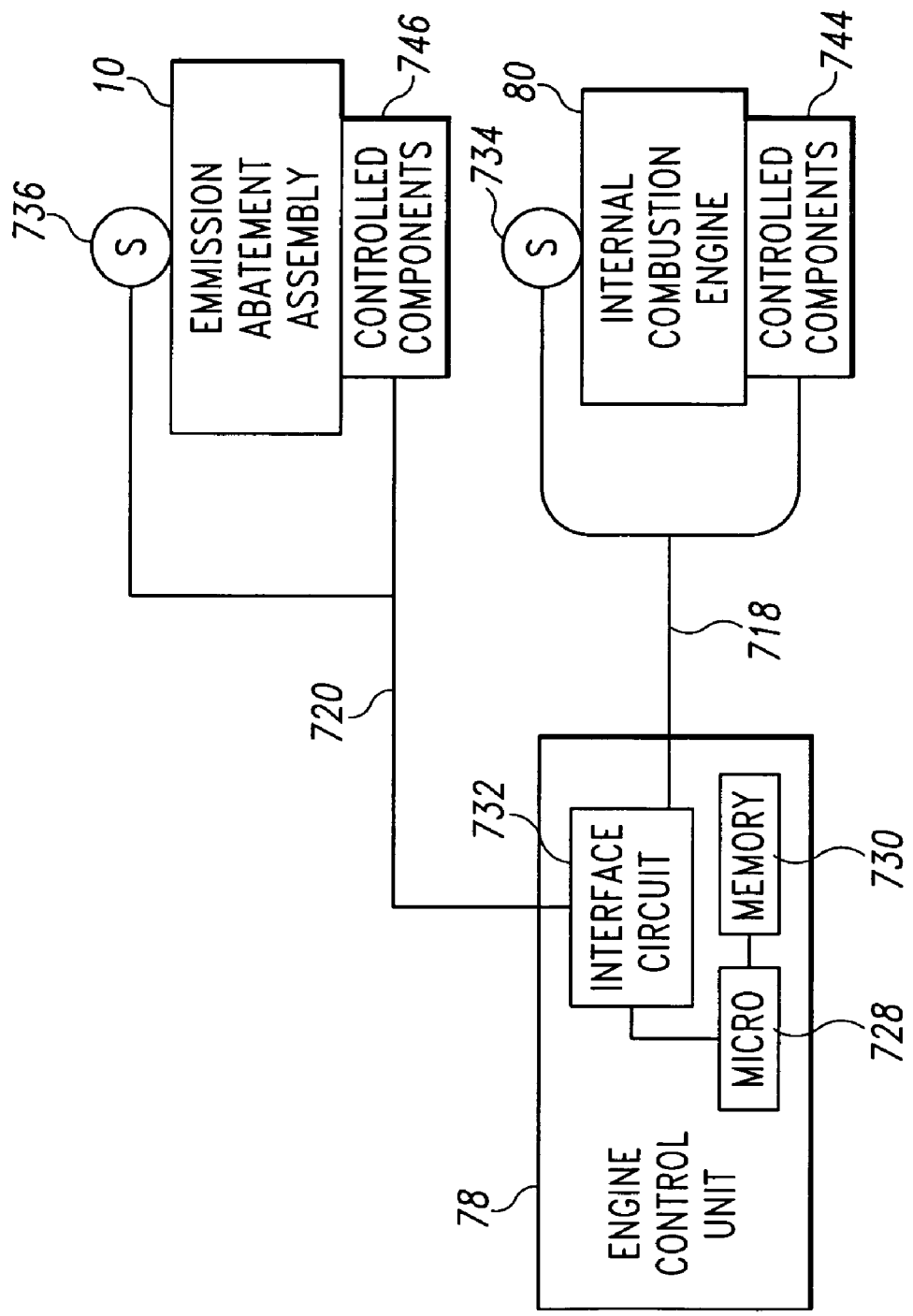
FIG. 29 is a diagrammatic view showing both the engine and the emission abatement assembly under the control of the engine control unit of the engine.

As shown in FIG. 29, the electronic controller 76 of the control unit 18 may be integrated with the engine control unit 78. As such, in addition to controlling operation of the engine 80, the engine control unit 78 also controls operation of the emission abatement assembly 10. In such a way, the engine control unit 78 is also, in essence, the master computer responsible for interpreting electrical signals sent by sensors associated with the emission abatement assembly 10 and for activating electronically-controlled components associated with the emission abatement assembly 10. For example, the engine control unit 78 is operable to, amongst many other things, determine the beginning and end of each filter regeneration cycle, determine the amount and ratio of fuel and air to be introduced into the fuel-fired burners 20, 22, along with the other functions herein described as being performed by the controller 76 of the emission abatement assembly 10.

To do so, the engine control unit 78 includes a number of electronic components commonly associated with electronic units which are utilized in the control of engine systems. For example, the engine control unit 78 may include, amongst other components customarily included in such devices, a processor such as a microprocessor 728 and a memory device 730 such as a programmable read-only memory device ("PROM") including erasable PROM's (EPROM's or EEPROM's).

The memory device 730 is provided to store, amongst other things, instructions in the form of, for example, a software routine (or routines) which, when executed by the processing unit, allows the engine control unit 78 to control operation of both the engine 80 and the emission abatement assembly 10. To do so, as shown in FIG. 29, the engine control unit 78 is electrically coupled to both the engine 80 and the emission abatement assembly 10. In particular, the engine control unit 78 is electrically coupled to the engine 80 via the signal line 718, whereas the engine control unit 78 is electrically coupled to the emission abatement assembly 10 via the signal line 720. Although each is shown schematically as a single line, it should be appreciated that the signal lines 718, 720 may be configured as any type of signal carrying assembly which allows for the transmission of electrical signals in either one or both directions between the engine control unit 78 and the engine 80 or the emission abatement assembly 10, respectively. For example, either one or both of the signal lines 718, 720 may be embodied as a wiring harness having a number of signal lines which transmit electrical signals between the engine control unit 78 and the engine 80 or the emission abatement assembly 10, respectively. In such an arrangement, signals generated by operation of a number of engine sensors 734 or the sensors 736 associated with the emission abatement assembly 10 are transmitted to the engine control unit 78 via the corresponding wiring harness, and signals generated by the engine control unit 78 are transmitted to the engine 80 or the emission abatement assembly 10 by the corresponding wiring harness. It should be appreciated that any number of other wiring configurations may be used. For example, individual signal wires may be used, or a system utilizing a signal multiplexer may be used for the design of either one or both of the signal lines 718, 720. Moreover, the signal lines 718, 720 may be integrated such that a single harness or system is utilized to electrically couple both the engine 80 and the emission abatement assembly 10 to the engine control unit 78.

The engine control unit 78 also includes an analog interface circuit 732. The analog interface circuit 732 converts the output signals from the various analog engine sensors 734 and the emission abatement sensors 736 into a signal which is suitable for presentation to an input of the microprocessor 728. In particular, the analog interface circuit 732, by use of an analog-to-digital (A/D) converter (not shown) or the like, converts the analog signals generated by the sensors 734, 736 into a digital signal for use by the microprocessor 728. It should be appreciated that the A/D converter may be embodied as a discrete device or number of devices, or may be integrated into the microprocessor 728. It should also be appreciated that if any one or more of the sensors 734, 736 generate a digital output signal, the analog interface circuit 732 may be bypassed.

It should be appreciated that the emission abatement sensors 736 communicating with the engine control unit 78 may be any of the sensors herein described in relation to the emission abatement assembly 10. For example, the pressure sensors 264, 266 and the temperature sensors 182, 184, 186 associated with the soot abatement assemblies 14, 16 may be coupled to the engine control unit 78. Moreover, the sensors and detectors 164, 426, 460, 510 of the control unit 18 may be coupled to the engine control unit 78.

The analog interface circuit 732 also converts signals from the microprocessor 728 into an output signal which is suitable for presentation to the electrically-controlled components 744 associated with the engine 80 and the electronically-controlled components 746 associated with the emission abatement assembly 10. In particular, the analog interface circuit 732, by use of a digital-to-analog (D/A) converter (not shown) or the like, converts the digital signals generated by the microprocessor 728 into analog signals for use by the electronically-controlled components 744 associated with the engine such as the fuel injector assembly, ignition assembly, fan assembly, etcetera, along with analog signals for use by electronically-controlled components 746 associated with the emission abatement assembly 10 such as the pump motor 92, the air valve 102, the fuel injectors 132, 134, the valves 140, 154, 156, the igniters 170, 172, etcetera. It should be appreciated that, similar to the A/D converter described above, the D/A converter may be embodied as a discrete device or number of devices, or may be integrated into the microprocessor 728. It should also be appreciated that if any one or more of the electronically-controlled components 744 associated with the engine 80 or electronically-controlled components 746 associated with the emission abatement assembly 10 operate on a digital input signal, the analog interface circuit 732 may be bypassed.

Hence, the engine control unit 78 may be operated to control operation of both the engine 80 and the emission abatement assembly 10. In particular, the engine control unit 78 operates in a closed-loop control scheme in which the engine control unit 78 monitors outputs of the sensors 734, 736 in order to control the inputs to the controlled components 744, 746 thereby managing the operation of both the engine 80 and the emission abatement assembly 10. In particular, the engine control unit 78 communicates with the sensors 734 in order to determine, amongst numerous other things, the engine coolant temperature, manifold air pressure, crankshaft/flywheel position and speed, and the amount of oxygen in the exhaust gas. Armed with this data, the engine control unit 78 performs numerous calculations each second, including looking up values in preprogrammed tables, in order to execute routines to perform such functions as varying spark timing or determining how long the fuel injector is to be left open in a particular cylinder.

Contemporaneous with such control of the engine 80, the engine control unit 78 also executes a routine for controlling operation of the emission abatement assembly 10. In particular, the engine control unit 78 communicates with the sensors 736 in order to determine, amongst numerous other things, the soot accumulation level in the particulate filters, various temperature and pressure readings, etcetera. Armed with this data, the engine control unit 78 performs numerous calculations each second, including looking up values in preprogrammed tables, in order to execute algorithms to perform such functions as supplying fuel and air to the fuel-fired burners 20, 22, energizing the electrodes 48, 50, etcetera.

As such, the engine control unit 78 controls operation of both the engine 80 and the emission abatement assembly 10. In particular, during operation of the engine 80, the engine control unit 78 executes a fuel injector control routine which, amongst other things, generates a number of injection signals in the form of injection pulses which are communicated to the individual injectors of the engine's fuel injector assembly. In response to receipt of the injection pulse, a fuel injector is opened for a predetermined period of time, thereby injecting fuel into the corresponding cylinder of the engine 80. Contemporaneous with execution of the fuel injection routine, the engine control unit 78 executes a burner control routine which, amongst other things, generates a number of control signals which are communicated to the various electronically-controlled components 746 associated with the emission abatement assembly 10, thereby controlling operation of the fuel-fired burners 20, 22. For example, signals are generated and communicated for, amongst other things, varying the amount of fuel being supplied to the fuel-fired burner 20, 22, energizing the electrodes 48, 50, etcetera.

Moreover, the engine control unit 78 also monitors input from the various sensors 736 associated with the emission abatement assembly 10 in order to utilize such input in the closed-loop control of the assembly 10. For example, signals communicated to the engine control unit 78 are utilized to monitor the temperature of certain areas within the soot abatement assembly 14, 16, the pressure drop across the particulate filter 24, 26, along with the numerous other functions herein described.

It should be appreciated that such routines (i.e., the fuel injector control routine and the fuel reformer control routine) may be embodied as separate software routines, or may be combined as a single software routine.

Figure 14:
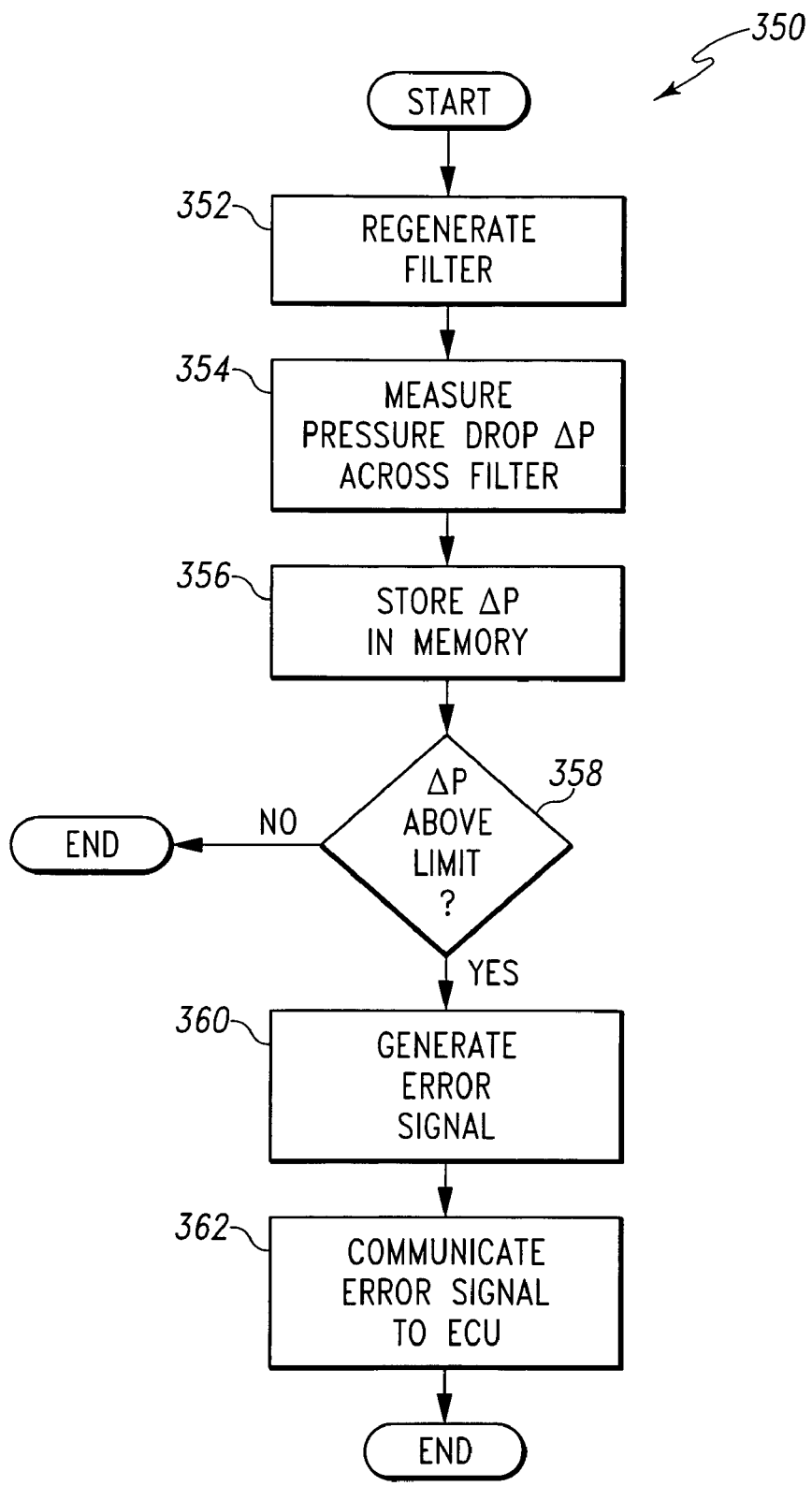
FIG. 14 is a flowchart of a control routine for monitoring ash buildup in the particulate filters of the emission abatement assembly of FIG. 1.

Referring now to FIG. 14, there is shown a control routine 350 for monitoring ash buildup in the particulate filters 24, 26. Over time as multiple filter regenerations occur, ash may accumulate in the particulate filters 24, 26. By monitoring (e.g., measuring and data logging) the pressure drop (ΔP) across the particulate filter 24, 26 subsequent to each filter regeneration process, it can be determined when the filter requires the ash to be cleaned. Specifically, as will herein be described in greater detail, shortly after each filter regeneration cycle, the pressure drop (ΔP) across the particulate filter 24, 26 is obtained and stored in memory. Once the pressure drop (ΔP) across the particulate filter 24, 26 exceeds a predetermined upper limit, an error signal indicative of the need to service the filter by removing the ash from the filter is generated.

The control routine 350 commences with step 352 in which the electronic controller 76 regenerates one of the particulate filters 24, 26. Specifically, as described in greater detail herein, the electronic controller 76 operates the fuel-fired burner 20, 22 to generate heat to regenerate the particulate filter 24, 26. Once the regeneration cycle is complete, the control routine 350 advances to step 354.

In step 354, the electronic controller 76 measures the pressure drop (ΔP) across the recently regenerated particulate filter 24, 26. Specifically, the output from pressure sensors 264, 266 of the recently regenerated filter is read so that the pressure drop (ΔP) may be calculated.

Thereafter, the control routine advances to step 356 where the value of the pressure drop (ΔP) across the recently regenerated particulate filter 24, 26 is stored in a table in a memory device (e.g., RAM or other memory device associated with the electronic controller 82). The control routine 350 then advances to step 358.

In step 358, the electronic controller 76 determines if the pressure drop (ΔP) across the recently regenerated particulate filter 24, 26 is above a predetermined upper limit. If the pressure drop (ΔP) across the recently regenerated particulate filter 24, 26 is below the upper limit, the control routine 350 ends until reinitiated subsequent to completion of the next filter regeneration cycle. However, if the pressure drop (ΔP) across the recently regenerated particulate filter 24, 26 is above the upper control limit, the control routine 350 advances to step 360.

In step 360, the electronic controller 76 generates an error signal. For example, the electronic controller 76 may generate an output signal which causes a visual, audible, or other type of alarm to be generated for presentation to the operator (e.g., the driver of the truck 12). Alternatively, the error signal may simply cause an electronic log or the like to be updated with information associated with the filter analysis of steps 352–358. It should be appreciated that the error signal generated in step 360 may be configured for use with any type of alarming or error tracking arrangement to fit the needs of a given system design.

As indicated in step 362, if the electronic controller 76 is so equipped, the error signal (or a subsequent signal generated in response the error signal) may be communicated to the engine control unit 78 via the CAN interface 314. Armed with this information, the engine control unit 78 may be programmed to perform additional filter analysis, generate an error signal to the truck operator (e.g., an indicator light on the truck's instrument cluster) indicating that the affected filter(s) 24, 26 requires servicing (i.e., ash removal), or store the error message in an error log which can be accessed by a service technician. The control routine 350 then ends.

As described above, the electronic controller 76 may use a number of different control schemes to determine when one of the particulate filters 24, 26 is in need of regeneration. For example, a sensor-based scheme or a timing-based scheme may be utilized. In either case, when the controller 76 determines that one of the filters 24, 26 is in need of regeneration, a regeneration cycle is commenced in which the electronic controller 76 operates the fuel-fired burners 14, 16 to regenerate the filters 24, 26, respectively. To do so, the air pump 90 and the air valve 102 are operated to supply combustion air to the appropriate burner 20, 22. Contemporaneously, fuel is supplied to the appropriate burner 20, 22 via the fuel delivery assembly 120. In particular, to supply fuel to the fuel-fired burner 20, the fuel injector 132 is operated to inject fuel into the mixing chamber 146 where it is atomized in a flow of atomization air being supplied to the mixing chamber 146 by the air valves 154, 156. The resultant air/fuel mixture is conducted to the fuel inlet nozzle 54 of the fuel-fired burner 20 via the fuel line 148. On the other hand, to supply fuel to the fuel-fired burner 22, the fuel injector 134 is operated to inject fuel into the mixing chamber 146 where it is atomized in the flow of atomization air being supplied to the mixing chamber 146 by the air valves 154, 156. The resultant air/fuel mixture is conducted to the fuel inlet nozzle 54 of the fuel-fired burner 22 via the fuel line 150.

The air/fuel mixture entering the burner 20, 22 via the fuel inlet nozzle 54 is ignited by the electrodes 48, 50. In the case of operation of the fuel-fired burner 20, the igniter 170 is actuated to generate a spark across the electrode gap 52 between the electrodes 48, 50 of the burner 20 thereby igniting the air/fuel mixture exiting the fuel inlet 54. In the case of operation of the fuel-fired burner 22, the igniter 172 is actuated to generate a spark across the electrode gap 52 between the electrodes 48, 50 of the burner 22 thereby igniting the air/fuel mixture exiting the fuel inlet 54.

As described above, the electronic controller 76 monitors output from the flame temperature sensor 182 to detect or otherwise determine presence of an ignition flame in the combustion chamber 34 of the fuel-fired burner 20, 22 being activated. Specifically, when the electronic controller 76 initiates ignition of the fuel-fired burner 20, 22, the controller 76 monitors output from the flame temperature sensor 182 to ensure that the air/fuel mixture entering the burner 20, 22 is being ignited by the spark from the electrodes 48, 50. An error signal is generated if the output of the flame temperature sensor does not meet a predetermined criteria.

Once the fuel-fired burner 20, 22 is activated, it begins to produce heat. Such heat is directed downstream (relative to exhaust gas flow) and into contact with the upstream face of the particulate filter 24, 26. The heat ignites and burns soot particles trapped in the filter substrate 60 thereby regenerating the particulate filter 24, 26. Illustratively, heat in the range of 600–650 degrees Celsius may be sufficient to regenerate a non-catalyzed filter, whereas heat in the range of 300–350 degrees Celsius may be sufficient to regenerate a catalyzed filter.

In an illustrative embodiment, regeneration of the particulate filter 24, 26 may take only a few minutes. Moreover, it should be appreciated that regeneration of the particulate filter 24, 26 may be self-sustaining once initiated by heat from the fuel-fired burner 20, 22, respectively. Specifically, once the filter 24, 26 is heated to a temperature at which the soot particles trapped therein begin to ignite, the ignition of an initial portion of soot particles trapped therein can cause the ignition of the remaining soot particles much in the same way a cigar slowly burns from one end to the other. In essence, as the soot particles "burn," an amount of heat is released in the "burn zone." Locally, the soot layer (in the burn zone) is now much hotter than the immediate surroundings. As such, heat is transferred to the as yet un-ignited soot layer downstream of the burn zone. The energy transferred may be sufficient to initiate oxidation reactions that raise the un-ignited soot to a temperature above its ignition temperature. As a result of this, heat from the fuel-fired burners 20, 22 may only be required to commence the regeneration process of the filter 24 (i.e., begin the ignition process of the soot particles trapped therein).

During the regeneration cycle, the fuel-fired burners 20, 22 may be controlled in the manner described herein in regard to FIGS. 9–11. Specifically, the control routines 200 and 250 may be utilized to monitor temperatures within soot abatement assemblies 14, 16 in the manner described herein.

Referring now to FIGS. 30 and 31, there is shown a control routine 750 for starting up the fuel-fired burners 20, 22 during commencement of a regeneration cycle. The routine begins with step 752 in which the routine determines if a request to startup the fuel-fired burner 20, 22 (i.e., a burner startup request) has been executed. It should be appreciated that a burner startup request may take many different forms including, for example, a startup request generated by a software control routine in response to sensed, timed, or otherwise determined indication that one of the particulate filters 24, 26 is in need of regeneration. For example, a sensor-based scheme, map-based scheme, or a timing-based scheme may be utilized to generate a startup request. As such, in step 752, if the control routine 750 detects a burner startup request, a control signal is generated and the routine 750 advances to step 754. If the control routine 750 does not detect a burner startup request, the routine 750 loops back to step 752 to continue monitoring for such a request.

In step 754, the electronic controller 76 supplies a relatively high amount of fuel to the fuel-fired burner 20, 22 to facilitate ignition of a flame in the combustion chamber 34. Specifically, an air/fuel mixture is supplied to the burner 20, 22 where it is to be ignited by the spark between the electrodes 48, 50 in the presence of combustion air supplied by the control unit 18. The supply of this initial fuel level is shown graphically with the arrow 764 of FIG. 31. The control routine 750 then advances to step 756.

In step 756, the controller 76 determines if ignition has occurred. The controller 76 may do so in any number of different manners. For example, the electronic controller 76 may monitor output from the flame temperature sensor 182 to detect or otherwise determine presence of an ignition flame in the combustion chamber 34 of the fuel-fired burner 20, 22. Specifically, when the electronic controller 76 initiates ignition of the fuel-fired burner 20, 22, the controller 76 may monitor output from the flame temperature sensor 182 to ensure that the air/fuel mixture entering the burner 20, 22 is being ignited by the spark from the electrodes 48, 50. Once ignition has been detected, the control routine 750 advances to step 758. Ignition detection is shown graphically at point 766 in FIG. 31.

In step 758, the electronic controller 76 decreases the fuel being supplied to the fuel-fired burner 20, 22. To do so, the electronic controller 76 increases the air-to-fuel ratio of the air/fuel mixture being supplied to the burner 20, 22 by reducing the amount of fuel being injected into the mixing chamber 146 by the fuel injectors 132, 134. For example, to decrease the fuel being supplied to the fuel-fired burner 20, the electronic controller 76 generates a control signal on the signal line 136 that reduces the amount of fuel being injected by the fuel injector 132 into the mixing chamber 146 thereby increasing the air-to-fuel ratio of the air/fuel mixture being supplied to the fuel-fired burner 20 via the fuel line 148. Similarly, to decrease the fuel being supplied to the fuel-fired burner 22, the electronic controller 76 generates a control signal on the signal line 138 that reduces the amount of fuel being injected by the fuel injector 134 into the mixing chamber 146 thereby increasing the air-to-fuel ratio of the air/fuel mixture being supplied to the fuel-fired burner 22 via the fuel line 150.

The electronic controller 76 operates the fuel-fired burner 20, 22 at this reduced fuel level for a period of time to preheat the components of the soot abatement assembly 14, 16. Such a preheating period may be time-based (i.e., continue for a predetermined period of time) or may be sensor-based (i.e., continue until a predetermined temperature is sensed by one or more of the temperature sensors 182, 184, 186). The preheating period is shown graphically with the arrow 768 of FIG. 31. Once this period of time has elapsed (i.e., once the system has been preheated), the control routine 750 advances to step 760.

In step 760, the electronic controller 76 ramps up or otherwise increases the fuel being supplied to the fuel-fired burner 20, 22. To do so, the electronic controller 76 decreases the air-to-fuel ratio of the air/fuel mixture being supplied to the burner 20, 22 by increasing the amount of fuel being injected into the mixing chamber 146 by the fuel injectors 132, 134. For example, to increase the fuel being supplied to the fuel-fired burner 20, the electronic controller 76 generates a control signal on the signal line 136 that increases the amount of fuel being injected by the fuel injector 132 into the mixing chamber 146 thereby decreasing the air-to-fuel ratio of the air/fuel mixture being supplied to the fuel-fired burner 20 via the fuel line 148. Similarly, to increase the fuel being supplied to the fuel-fired burner 22, the electronic controller 76 generates a control signal on the signal line 138 that increases the amount of fuel being injected by the fuel injector 134 into the mixing chamber 146 thereby decreasing the air-to-fuel ratio of the air/fuel mixture being supplied to the fuel-fired burner 22 via the fuel line 150.

In step 760, the fuel supplied to the fuel-fired burner 20, 22 may be increased at a predetermined ramp rate. For example, as shown graphically with arrow 770 in FIG. 31, the fuel level may be gradually increased at a predetermined ramp rate up to a specific, predetermined fuel level, as indicated by point 772 in FIG. 31. Such a predetermined fuel level may correspond with a desired regeneration temperature. Once the fuel level has been ramped up, the control routine 750 advances to step 762.

In step 762, the controller 76 adjusts the fuel level being supplied to the fuel-fired burner 20, 22 to facilitate filter regeneration. Specifically, as described above in regard to FIGS. 9 and 10, during a filter regeneration cycle, fueling of the burner 20, 22 is adjusted by closed-loop control. Such closed-loop control of the fueling of the burner 20, 22 is shown generally in the area indicated by the arrow 418 of FIG. 31. Once under closed-loop control, the startup control routine 750 ends.

Figure 32:
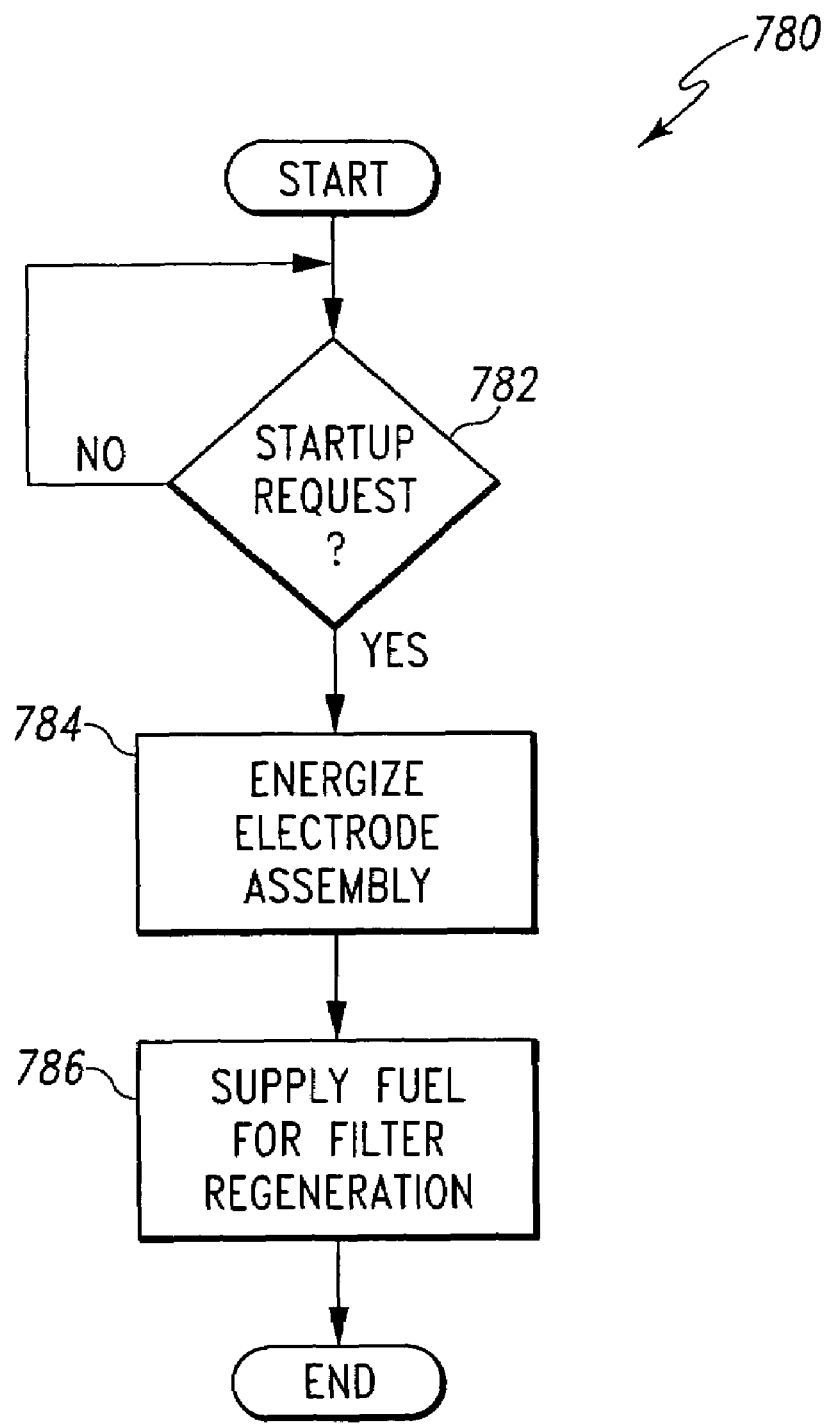
FIG. 32 is a flowchart of a control routine for cleaning the electrodes of the fuel-fired burner.

Referring now to FIG. 32, there is shown another startup control routine 780 for starting up the fuel-fired burners 20, 22 during commencement of a regeneration cycle. The routine begins with step 782 in which the routine 780 determines if a request to startup the fuel-fired burner 20, 22 (i.e., a burner startup request) has been executed. It should be appreciated that a burner startup request may take many different forms including, for example, a startup request generated by a software control routine in response to sensed, timed, or otherwise determined indication that one of the particulate filters 24, 26 is in need of regeneration. For example, a sensor-based scheme, map-based scheme, or a timing-based scheme may be utilized to generate a startup request. As such, in step 782, if the control routine 780 detects a burner startup request, a control signal is generated and the routine 780 advances to step 784. If the control routine 780 does not detect a burner startup request, the routine 780 loops back to step 782 to continue monitoring for such a request.

In step 784, the controller 76 energizes the electrode assembly of the fuel-fired burner 20, 22 that is to be regenerated prior to any fuel being supplied to the burner. Specifically, during startup of the fuel-fired burner 20, prior to fuel being supplied to the burner 20, the controller 76 operates the igniter 170 to commence spark generation between the electrodes 48, 50 of the burner 20. In the case of startup of the fuel-fired burner 22, prior to fuel being supplied to the burner 22, the electronic controller 76 operates the igniter 172 to commence spark generation between the electrodes 48, 50 of the burner 22.

The controller 76 continues to energize the electrode assembly of the fuel-fired burner 20, 22 for a predetermined period of time prior to the introduction of fuel to the burner. The duration of such a period of time may be configured to fit the needs of a given system design. In particular, it has been found that energizing the electrode assembly for such a period of time prior to fuel introduction cleans any fouled surfaces on the electrodes 48, 50 (i.e., removes any soot or other matter accumulated thereon). As such, any matter accumulated on the electrodes 48, 50 (e.g., soot, diesel fuel, water, oil, etcetera) can be removed from the electrodes prior to the introduction of fuel thereby enhancing operation of the fuel-fired burner 20, 22. Once the predetermined period of time has elapsed, the control routine 780 advances to step 786.

In step 786, the electronic controller 76 supplies fuel and air to the fuel-fired burner 20, 22 to regenerate the particulate filter 24, 26 in the manner described above. Specifically, an air/fuel mixture is supplied to the burner 20, 22 where it is ignited by the spark between the electrodes 48, 50 in the presence of combustion air supplied by the control unit 18. Heat generated by the combustion of the fuel regenerates the particulate filter 24, 26.

It should be appreciated that the control routines 750, 780 may be combined, if desired. For example, the electrode assembly may be energized for a period of time (as described in step 784 of the control routine 780) prior to the introduction of the fuel for ignition (as described in step 754 of the control routine 750).

Figure 15:
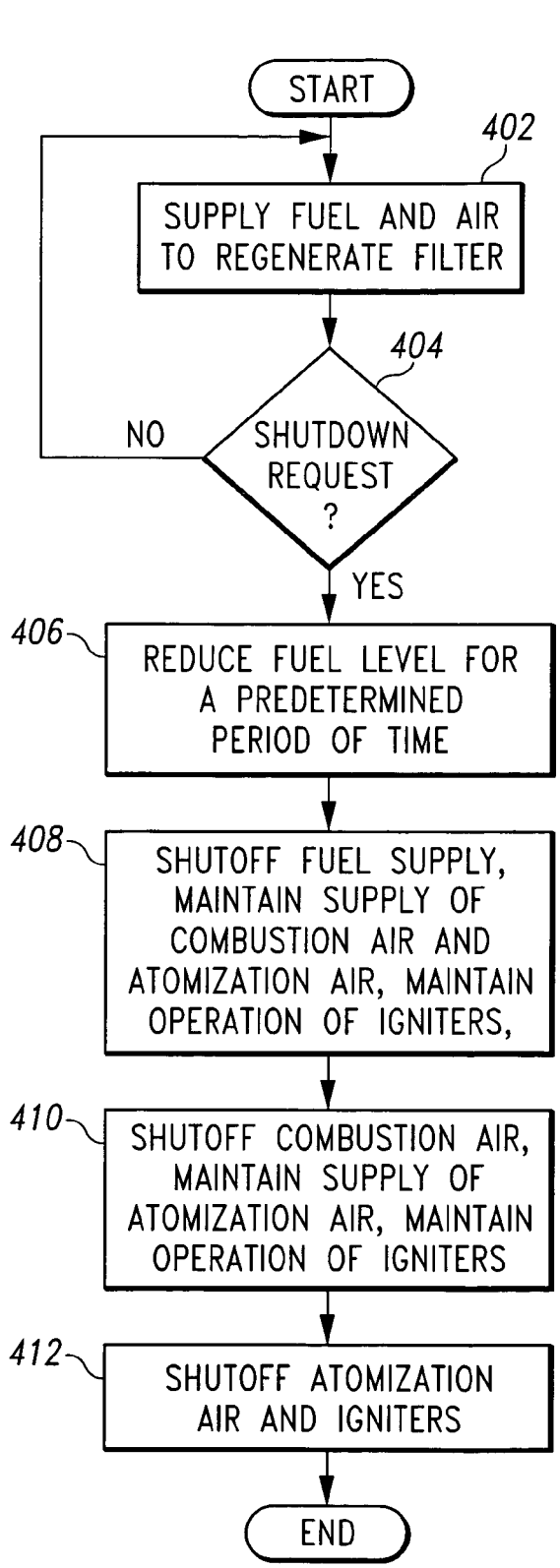
FIG. 15 is a flowchart of a control routine for shutting down the fuel-fired burners of the emission abatement assembly of FIG. 1.
Figure 16:
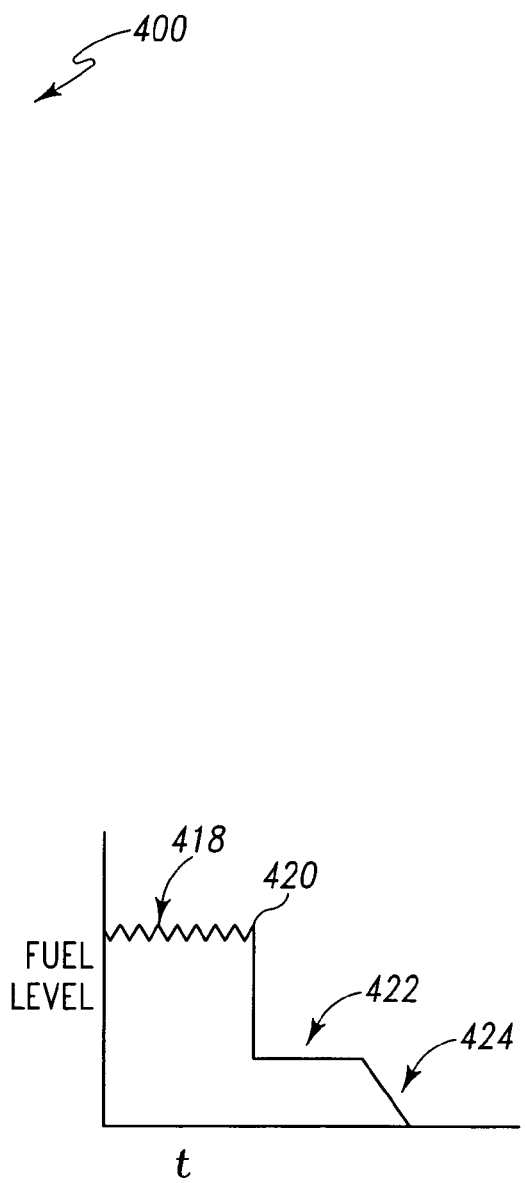
FIG. 16 is an exemplary fuel level versus time graph which demonstrates aspects of the control routine of FIG. 15.

Referring now to FIGS. 15 and 16, there is shown a control routine 400 for shutting down the fuel-fired burners 20, 22 during a regeneration cycle. The control routine begins with step 402 in which electronic controller 76 supplies fuel and air to the fuel-fired burner 20, 22 to regenerate the particulate filter 24, 26 in the manner described above. Specifically, an air/fuel mixture are supplied to the burner 20, 22 where it is ignited by the spark between the electrodes 48, 50 in the presence of combustion air supplied by the control unit 18. As described in regard to FIGS. 9 and 10, during such a filter regeneration cycle, fueling of the burner 20, 22 is adjusted by closed-loop control. Such closed-loop control of the fueling of the burner 20, 22 is shown generally in the area indicated by the arrow 418 of FIG. 16.

During the filter regeneration cycle, the control routine 400, at step 404, determines if a request to shutdown the fuel-fired burner 20, 22 (i.e., a burner shutdown request) has been executed. It should be appreciated that a burner shutdown request may take many different forms including, for example, a shutdown request generated by a software control routine in response to sensed, timed, or otherwise determined indication that the particulate filter 20, 22 has been regenerated or that filter regeneration is self-sustaining (as described above), an automatic shutdown request generated by a software control routine or the like, a timed shutdown request, or any other manual, software, or hardware-driven shutdown request. In certain embodiments, a burner shutdown request may be generated in response to the turning of an ignition key associated with the engine 80 of the truck 12 from an on position to an off position. As such, in step 404, if the control routine 400 detects a burner shutdown request, a control signal is generated and the routine 400 advances to step 406. Detection of a shutdown request is shown graphically at point 420 in FIG. 16. If the control routine 400 does not detect a burner shutdown request, the routine 400 loops back to step 402 to continue the filter regeneration cycle.

In step 406, the electronic controller 76 decreases the fuel being supplied to the fuel-fired burner 20, 22. To do so, the electronic controller 76 increases the air-to-fuel ratio of the air/fuel mixture being supplied to the burner 20, 22 by reducing the amount of fuel being injected into the mixing chamber 146 by the fuel injectors 132, 134. For example, to decrease the fuel being supplied to the fuel-fired burner 20, the electronic controller 76 generates a control signal on the signal line 136 that reduces the amount of fuel being injected by the fuel injector 132 into the mixing chamber 146 thereby increasing the air-to-fuel ratio of the air/fuel mixture being supplied to the fuel-fired burner 20 via the fuel line 148. Similarly, to decrease the fuel being supplied to the fuel-fired burner 22, the electronic controller 76 generates a control signal on the signal line 138 that reduces the amount of fuel being injected by the fuel injector 134 into the mixing chamber 146 thereby increasing the air-to-fuel ratio of the air/fuel mixture being supplied to the fuel-fired burner 22 via the fuel line 150.

The electronic controller 76 operates the fuel-fired burner 20, 22 at this reduced fuel level for a predetermined period of time. Such a period of time is shown graphically with the arrow 422 of FIG. 16. Once this predetermined period of time has elapsed, the control routine advances to step 408.

In step 408, the fuel supply to the burner 20, 22 is shutoff. Specifically, the electronic controller 76 deactuates the fuel delivery assembly 120 thereby ceasing the supply of fuel to the burner 20, 22. To shutoff the fuel being supplied to the fuel-fired burner 20, the electronic controller 76 closes the fuel enable valve 140 and ceases to generate control signals on the signal line 136 thereby causing the fuel injector 132 to cease to inject fuel into the mixing chamber 146. Once the fuel remaining in the fuel line 148 is consumed by the burner 20, no additional fuel enters the fuel inlet nozzle 54 of the burner 20. Similarly, to shutoff the fuel being supplied to the fuel-fired burner 22, the electronic controller 76 closes the fuel enable valve 140 and ceases to generate control signals on the signal line 138 thereby causing the fuel injector 134 to cease to inject fuel into the mixing chamber 146. Once the fuel remaining in the fuel line 150 is consumed by the burner 22, no additional fuel enters the fuel inlet nozzle 54 of the burner 22.

In step 408, the electronic controller 76 maintains the supply of combustion air and atomization air to the burners 20, 22, and also maintains operation of the igniters 170, 172. Specifically, in the case of shutdown of the fuel-fired burner 20, even though fuel is no longer being supplied to the burner 20, the electronic controller 76 continues to supply combustion air to the burner 20 via the air line 58 and continues to supply atomization air via the fuel line 148. The controller 76 continues to operate the igniter 170 to continue spark generation within the combustion chamber 34 of the burner 20. In the case of shutdown of the fuel-fired burner 22, even though fuel is no longer being supplied to the burner 22, the electronic controller 76 continues to supply combustion air to the burner 22 via the air line 58 and continues to supply atomization air via the fuel line 150. The controller 76 continues to operate the igniter 172 to continue spark generation within the combustion chamber 34 of the burner 22. Such continued air supply and spark generation ensures that any remaining fuel in the system is combusted by the burner 20, 22 thereby reducing, if not eliminating, the emission of unburned hydrocarbons.

The electronic controller 76 continues to supply combustion air and atomization air and operate the igniters as described above for a predetermined period of time. Such a period of time is shown graphically with the arrow 424 in FIG. 16. Once this predetermined period of time has elapsed, the control routine advances to step 410.

In step 410, the electronic controller 76 shuts off the flow of combustion air to the fuel-fired burner 20, 22. Specifically, the electronic controller 76 ceases operation of the motor 92 thereby ceasing operation of the air pump 90. Subsequent to shutdown of the air pump 90, the electronic controller 76 continues to supply atomization air and continues to operate the igniters as described above for a predetermined period of time. Once this predetermined period of time has elapsed, the control routine advances to step 412.

In step 412, the electronic controller 76 shuts off the flow of atomization air to the fuel-fired burner 20, 22. Specifically, the electronic controller 76 closes the atomization air valve 156 thereby reducing the flow of air to the mixing chamber 146 and hence the burners 20, 22. Note that the cleaning air valve 154 remains open, and, as a result, a reduced flow of cleaning air continues to be advanced into the mixing chamber 146 and, as a result, supplied to the fuel-fired burners 20, 22. As described above, the flow of cleaning air from the cleaning air valve 154 is generally constantly supplied to the mixing chamber 146 during operation of the engine 80 of the truck 12 to prevent the accumulation of debris (e.g., soot) in the fuel inlet nozzles 54 of the fuel-fired burners 20, 22.

In step 412, the electronic controller 76 ceases spark generation within the combustion chamber 34 of the fuel-fired burner 20, 22. Specifically, the electronic controller 76 ceases operation of the igniter 170 (in the case of the burner 20) or the igniter 172 (in the case of the burner 172) thereby causing the spark to cease to be generated across the electrode gap 52 of the electrodes 48, 50 of the burner 20, 22. The control routine 400 then ends.

As described above, during execution of the shutdown control routine 400 (along with other times as well), there are occasions in which the electronic controller 76 supplies combustion air to one of the fuel-fired burners 20, 22, but does not supply fuel to either burner 20, 22. As also described above, the motor 92 drives both the fuel pump 122 and the air pump 90. Hence, when the motor 92 is driving the air pump 90 to supply combustion air, the fuel pump 122 is also being driven. During the occasions in which combustion air is being supplied a burner 20, 22, but fuel is not being supplied to either burner 20, 22, fuel pumped by the fuel pump 122 is returned to the truck's fuel tank 124 via the fuel return line 142. As shown in FIG. 8, a fuel pressure sensor 426 senses fuel pressure in the fuel return line 142. Output from the fuel pressure sensor 426 is communicated to the electronic controller 76 via a signal line 428. If the fuel return line 142 becomes restricted such that fuel cannot readily flow back to the tank 124, pressure on the seals of the fuel pump 122 may increase thereby potentially necessitating repair or replacement of the pump 122.

Figure 17:
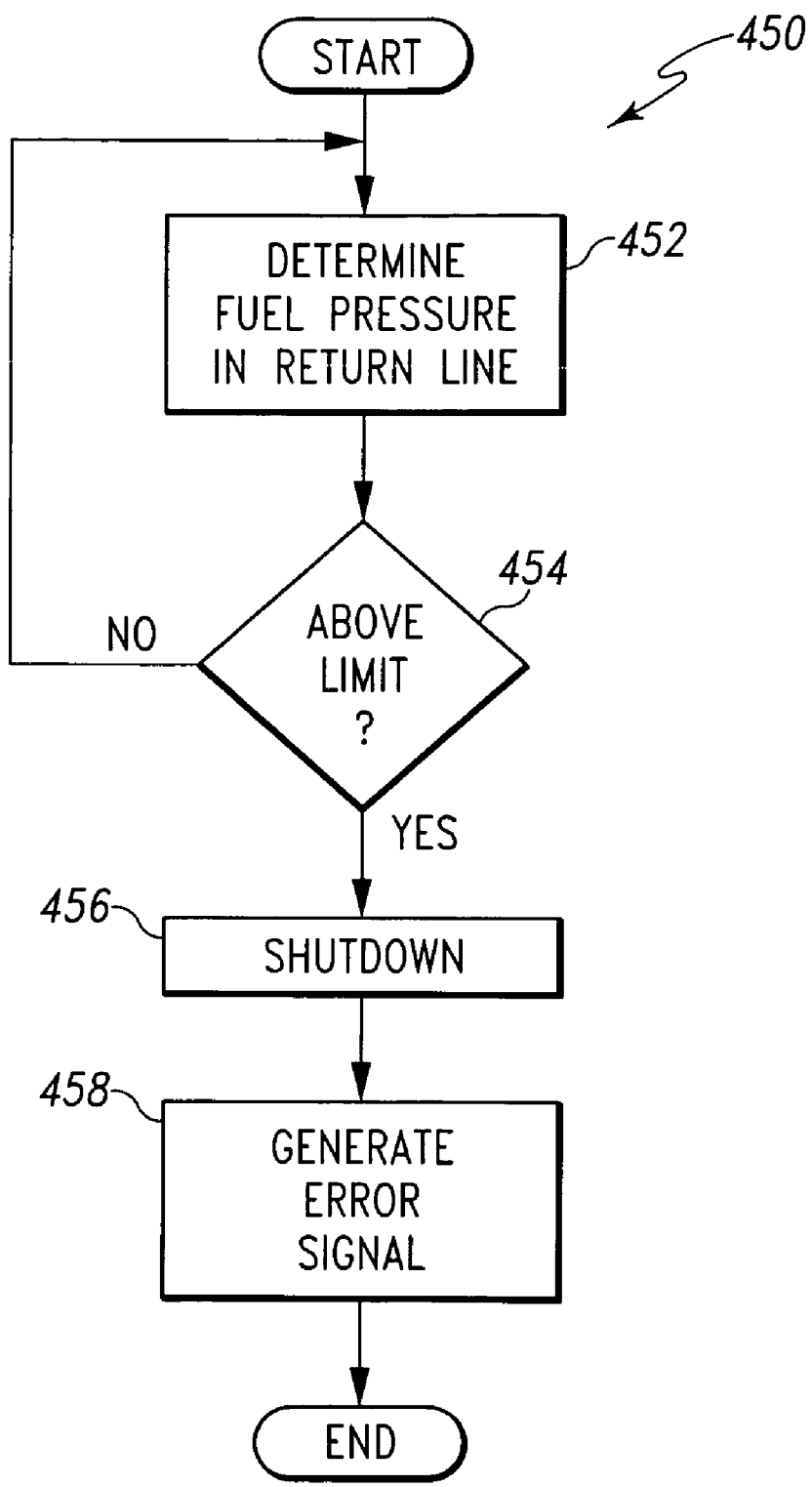
FIG. 17 is a flowchart of a control routine for monitoring fuel pressure in the control unit's fuel return line.

As shown in FIG. 17, the electronic controller 76 executes a control routine 450 to monitor the return fuel line 142. The control routine 450 commences with step 452 in which the electronic controller 76 determines the fuel pressure in the fuel return line 142. Specifically, the electronic controller 76 scans or reads the signal line 428 to obtain the output from the fuel pressure sensor 426. The control routine 450 then advances to step 454.

In step 454, the electronic controller 76 determines if the sensed fuel pressure is above a predetermined upper pressure limit. If the fuel pressure is below the upper pressure limit, the control routine 450 loops back to step 452 to continue monitoring output from the fuel pressure sensor 426. However, if the fuel pressure is above the upper control limit, the control routine 450 advances to step 456.

In step 456, the electronic controller 76 shuts down components associated with the control unit 18. In particular, since the electronic controller 76 concluded in step 454 that fuel pressure in the fuel return line 142 was above the upper control limit, the controller 76, amongst other things, ceases operation of the drive motor 92 thereby ceasing operation of the fuel pump 122. The control routine 450 then advances to step 458.

In step 458, the electronic controller 76 generates an error signal. For example, the electronic controller 76 may generate an output signal which causes a visual, audible, or other type of alarm to be generated for presentation to the operator (e.g., the driver of the truck 12). Alternatively, the error signal may simply cause an electronic log or the like to be updated with information associated with the fuel pressure analysis of steps 452–456. It should be appreciated that the error signal generated in step 458 may be configured for use with any type of alarming or error tracking arrangement to fit the needs of a given system design. Moreover, if the electronic controller 76 is so equipped, the error signal (or a subsequent signal generated in response the error signal) may be communicated to the engine control unit 78 via the CAN interface 314. Armed with this information, the engine control unit 78 may be programmed to perform additional analysis, generate an error signal to the truck operator (e.g., an indicator light on the truck's instrument cluster) indicating that the control unit 18 has shutdown, or store the error message in an error log which can be accessed by a service technician. The control routine 450 then ends.

Referring back to FIG. 8, the control unit 18 may be equipped with a one or more sensors for detecting the presence of predetermined environmental conditions within the interior chamber 112 of the control housing 72. For example, the control unit 18 may be configured to include a smoke detector 460. Output from the smoke detector 460 is communicated to the electronic controller 76 via a signal line 462. As will herein be described in greater detail, the smoke detector 460 may be used to detect the presence of fuel particles or smoke in the interior chamber 112 of the control housing 72. If the presence of fuel particles or smoke is detected, the system may be shutdown and an error signal generated. The smoke detector 460 may be embodied as any type of smoke detector. In the exemplary embodiment of the control unit 18 described herein, the smoke detector 460 is embodied as a non-ionizing smoke detector such as a commercially available IR-detector.

Figure 18:
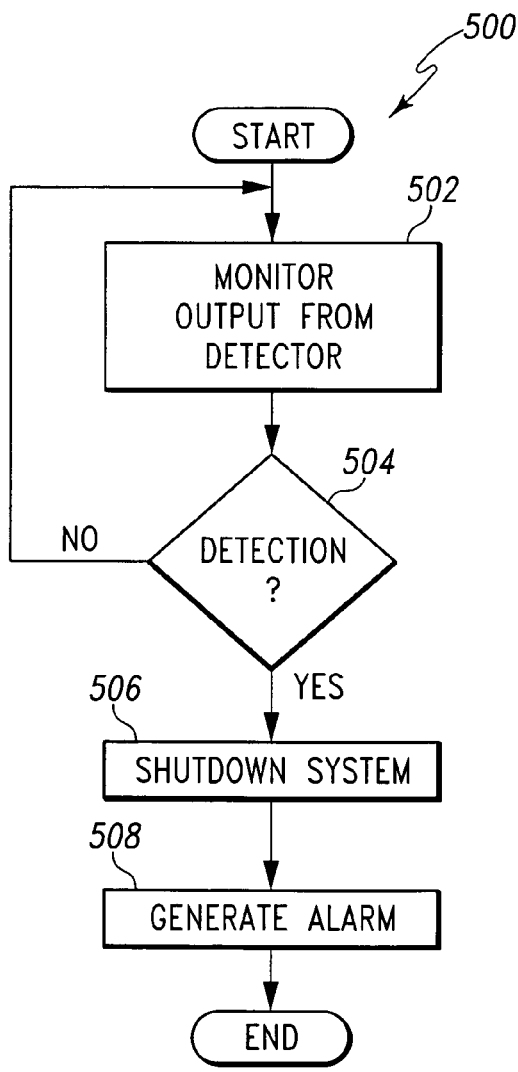
FIG. 18 is a flowchart of a control routine for monitoring the output from the control unit's smoke detector.

As shown in FIG. 18, the electronic controller 76 executes a control routine 500 to monitor for the presence of fuel particles or smoke in the interior chamber 112 of the control housing 72. The control routine 500 commences with step 502 in which the electronic controller 76 scans or reads the signal line 462 to obtain the output from the smoke detector 460. Once the controller 76 has obtained the output from the smoke detector 460, the control routine 500 then advances to step 504.

In step 504, the electronic controller 76 determines if the output from the smoke detector 460 is indicative of the presence of fuel particles or smoke in the interior chamber 112 of the control housing 72. If the output from the smoke detector 460 is not indicative of the presence of fuel particles or smoke in the interior chamber 112 of the control housing 72, the control routine 500 loops back to step 502 to continue monitoring output from the detector 460. However, if the output from the smoke detector 460 is indicative of the presence of fuel particles or smoke in the interior chamber 112 of the control housing 72, a control signal is generated, and the control routine 500 advances to step 506.

In step 506, the electronic controller 76 shuts down components associated with the control unit 18. In particular, since the electronic controller 76 concluded in step 454 that the output of the smoke detector is indicative of the presence of fuel particles or smoke in the interior chamber 112 of the control housing 72, the controller 76, amongst other things, ceases operation of the drive motor 92 thereby ceasing operation of the fuel pump 122 and the air pump 90. The control routine 500 then advances to step 508.

In step 508, the electronic controller 76 generates an error signal. For example, the electronic controller 76 may generate an output signal which causes a visual, audible, or other type of alarm to be generated for presentation to the operator (e.g., the driver of the truck 12). Alternatively, the error signal may simply cause an electronic log or the like to be updated with information associated with the analysis of steps 502 and 504. It should be appreciated that the error signal generated in step 508 may be configured for use with any type of alarming or error tracking arrangement to fit the needs of a given system design. Moreover, if the electronic controller 76 is so equipped, the error signal (or a subsequent signal generated in response the error signal) may be communicated to the engine control unit 78 via the CAN interface 314. Armed with this information, the engine control unit 78 may be programmed to perform additional analysis, generate an error signal to the truck operator (e.g., an indicator light on the truck's instrument cluster) indicating that the control unit 18 has shutdown, or store the error message in an error log which can be accessed by a service technician. The control routine 500 then ends.

As shown in FIG. 8, the control unit 18 may be configured with other types of sensors for detecting the presence of predetermined environmental conditions within the interior chamber 112 of the control housing 72. For example, the control unit 18 may be configured to include a temperature sensor 510. Output from the temperature sensor 510 is communicated to the electronic controller 76 via a signal line 512. As will herein be described in greater detail, the temperature sensor 510 may be used to monitor the temperature within the interior chamber 112 of the control housing 72. If the temperature within the interior chamber 112 of the control housing 72 exceeds a predetermined upper temperature limit (e.g., 125° C.), the system may be shutdown and an error signal generated. The temperature sensor 510 may be embodied as any type of electronic temperature sensor. In the exemplary embodiment of the control unit 18 described herein, the temperature sensor 510 is embodied as a commercially available thermocouple.

Figure 19:
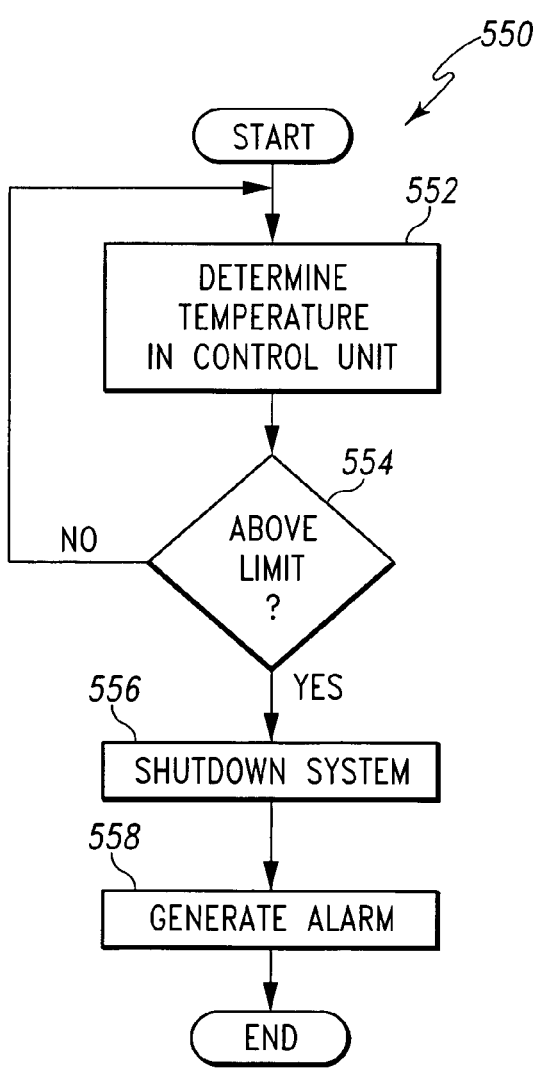
FIG. 19 is a flowchart of a control routine for monitoring the output from the control unit's temperature sensor.

As shown in FIG. 19, the electronic controller 76 executes a control routine 550 to monitor the temperature within the interior chamber 112 of the control housing 72. The control routine 550 commences with step 552 in which the electronic controller 76 scans or reads the signal line 512 to obtain the output from the temperature sensor 510. Once the controller 76 has obtained the output from the temperature sensor 510, the control routine 550 then advances to step 554.

In step 554, the electronic controller 76 determines if the sensed temperature within the interior chamber 112 of the control housing 72 is above a predetermined upper temperature limit (e.g., 125° C.). If the temperature within the interior chamber 112 of the control housing 72 is below the upper temperature limit, the control routine 550 loops back to step 552 to continue monitoring output from the temperature sensor 510. However, if the temperature within the interior chamber 112 of the control housing 72 is above the upper control limit, a control signal is generated, and the control routine 550 advances to step 556.

In step 556, the electronic controller 76 shuts down components associated with the control unit 18. In particular, since the electronic controller 76 concluded in step 554 that the temperature within the interior chamber 112 of the control housing 72 is above the upper control limit, the controller 76, amongst other things, ceases operation of the drive motor 92 thereby ceasing operation of the fuel pump 122 and the air pump 90. The control routine 550 then advances to step 558.

In step 558, the electronic controller 76 generates an error signal. For example, the electronic controller 76 may generate an output signal which causes a visual, audible, or other type of alarm to be generated for presentation to the operator (e.g., the driver of the truck 12). Alternatively, the error signal may simply cause an electronic log or the like to be updated with information associated with the temperature analysis of steps 552 and 554. It should be appreciated that the error signal generated in step 558 may be configured for use with any type of alarming or error tracking arrangement to fit the needs of a given system design. Moreover, if the electronic controller 76 is so equipped, the error signal (or a subsequent signal generated in response the error signal) may be communicated to the engine control unit 78 via the CAN interface 314. Armed with this information, the engine control unit 78 may be programmed to perform additional analysis, generate an error signal to the truck operator (e.g., an indicator light on the truck's instrument cluster) indicating that the control unit 18 has shutdown, or store the error message in an error log which can be accessed by a service technician. The control routine 550 then ends.

Figure 20:
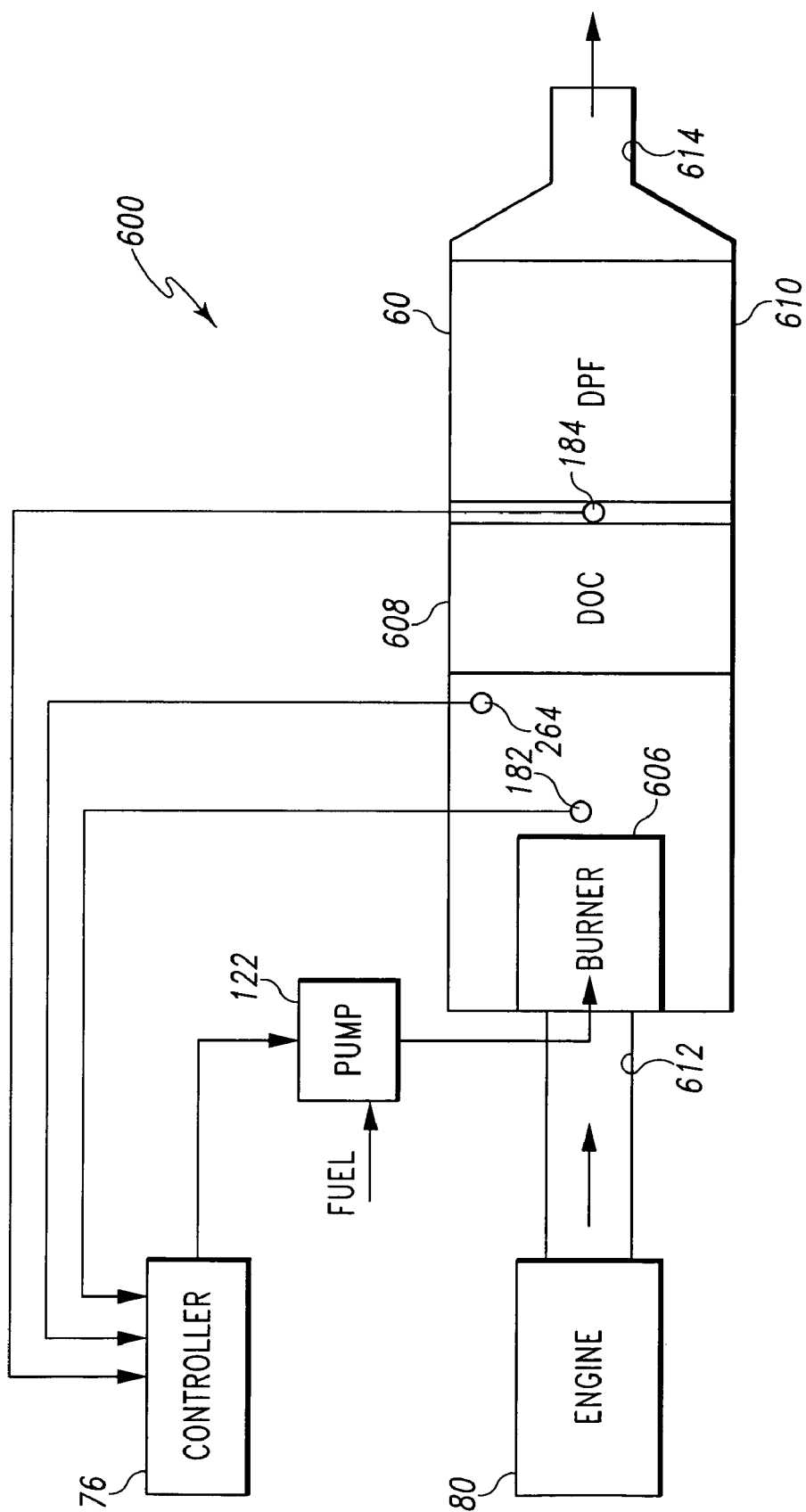
FIG. 20 is a diagrammatic view of another emission abatement assembly.

Referring now to FIG. 20, there is shown an emission abatement assembly 600. The emission abatement assembly 600 includes a number of common components with the emission abatement assembly 10. Common reference numerals are utilized to designate common components between the two assemblies.

Figure 21:
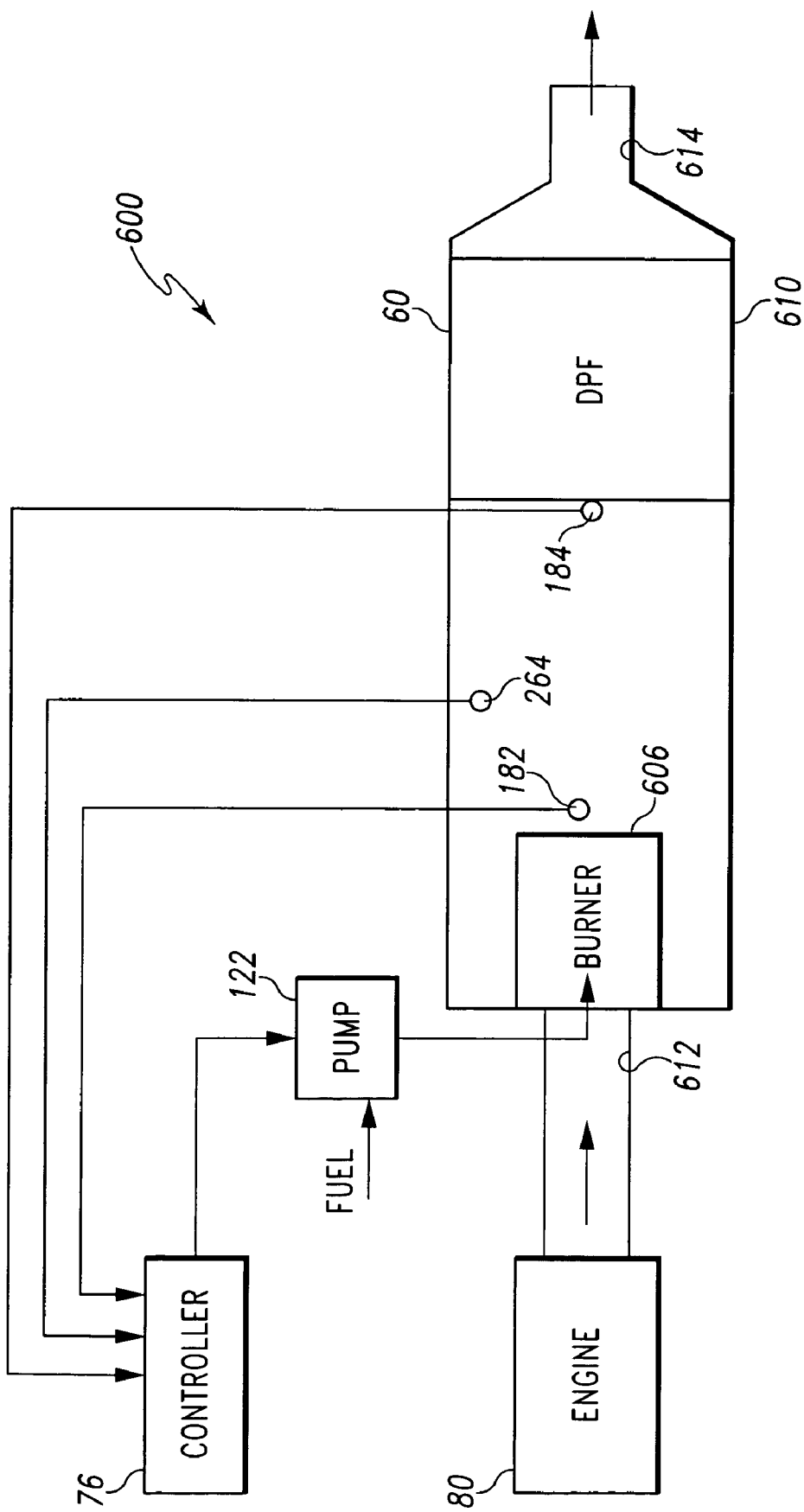
FIG. 21 is view similar to FIG. 20, but showing the emission abatement assembly configured with a diesel oxidation catalyst positioned upstream of the filter substrate.

The emission abatement assembly 600 includes a controller 76, a fuel supply unit such as a fuel pump 122 under the control of the controller 76, and a fuel-fired burner 606. The assembly 600 may be installed in the truck 12 either horizontally, vertically, or upside-down vertically. A diesel oxidation catalyst 608 may optionally be positioned upstream of the filter substrate 60, as shown in FIG. 20. The diesel oxidation catalyst 608 (or any other type of oxidation catalyst) may be used to oxidize any unburned hydrocarbons and carbon monoxide (CO) thereby generating additional heat which is transferred downstream to the filter substrate 60. Alternatively, as shown in FIG. 21, the emission abatement assembly 600 may be configured without the diesel oxidation catalyst 608.

As described above, the filter substrate 60 may be impregnated with a catalytic material such as, for example, a precious metal catalytic material. The catalytic material may be, for example, embodied as platinum, rhodium, palladium, including combinations thereof, along with any other similar catalytic materials. Use of a catalytic material lowers the temperature needed to ignite trapped soot particles.

Unlike the assembly 10, in the exemplary embodiment described herein, the emission abatement assembly 600 does not utilize supplemental air pumped from an air pump such as the air pump 90. As such, the combustion process is supported by oxygen in the exhaust gas.

Figure 22:
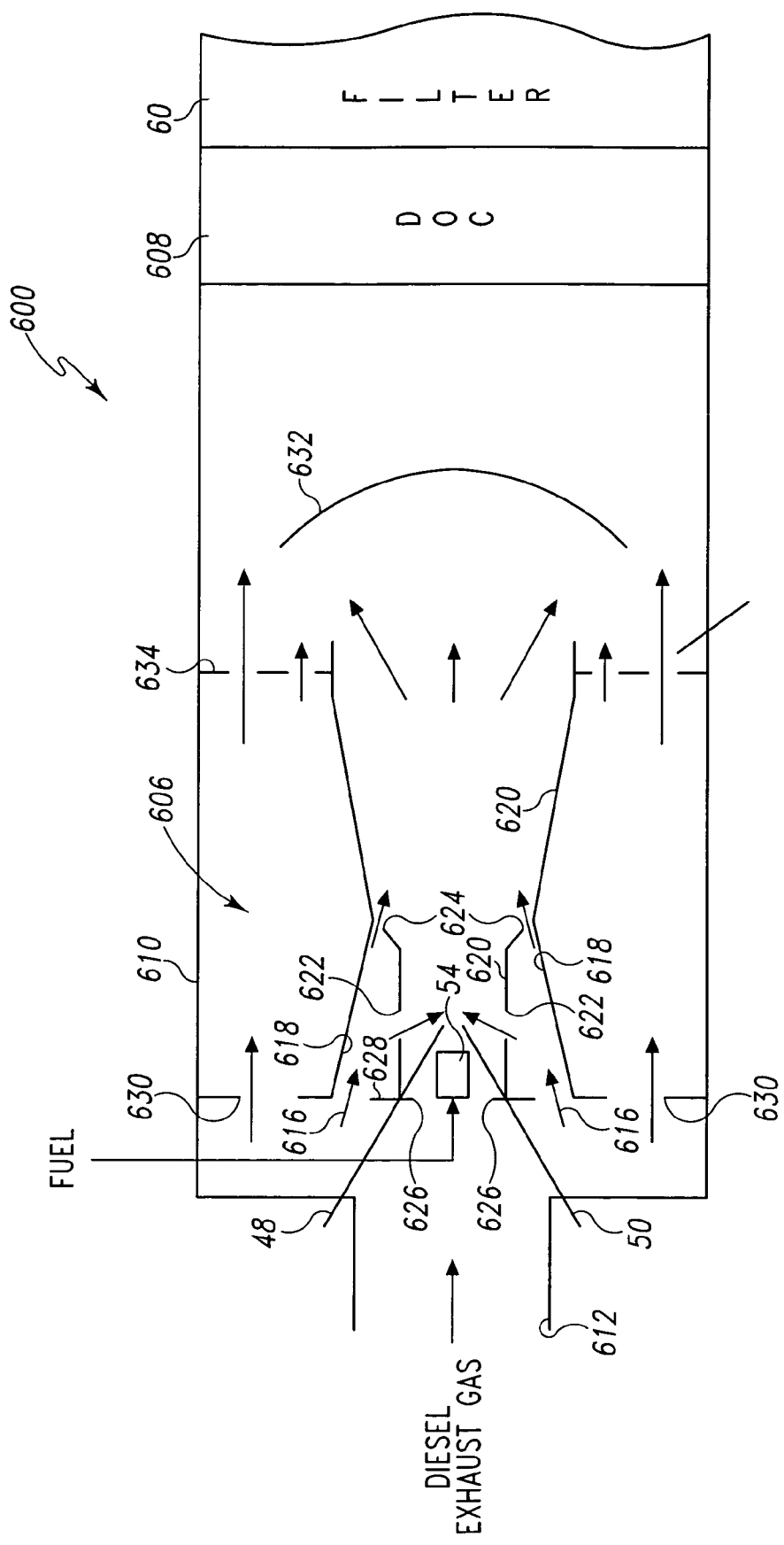
FIGS. 22 and 23 are diagrammatic views showing the fuel-fired burner of the assemblies of FIGS. 20 and 21 in greater detail.
Figure 23:
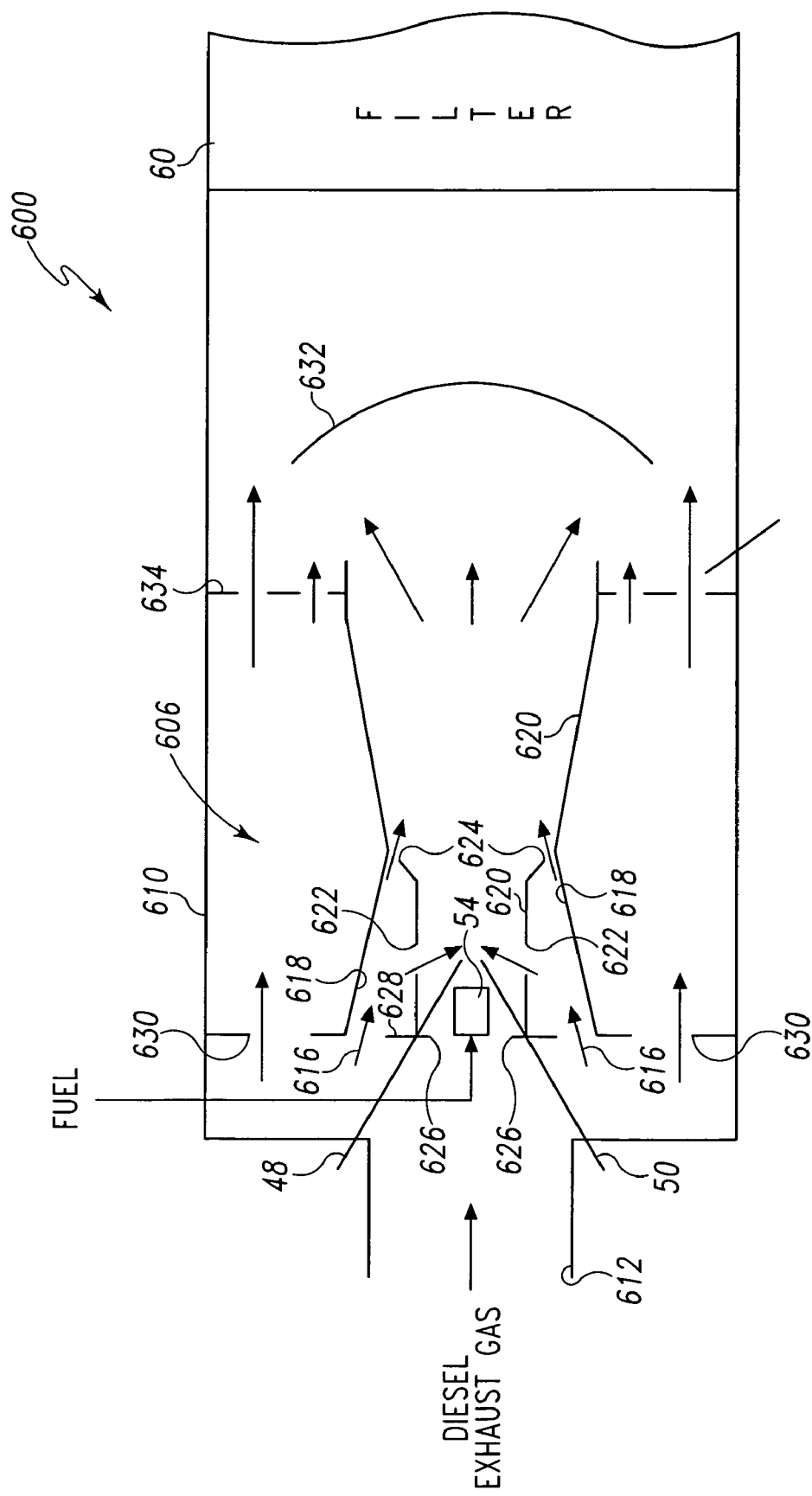

The fuel-fired burner 606 is shown in greater detail in FIGS. 22 and 23. Hot exhaust gas enters the housing 610 through an exhaust gas inlet 612. Note that unlike the assembly 10 in which the exhaust gas enters through an inlet 36 which is perpendicular to the flow direction through the housing of the assembly, the exhaust gas inlet 612 is substantially co-axial with the flow direction of the housing 610. As such, the gas inlet 612 and a gas outlet 614 of the housing 610 are arranged along the same general axis (see FIGS. 20 and 21).

Figure 24:
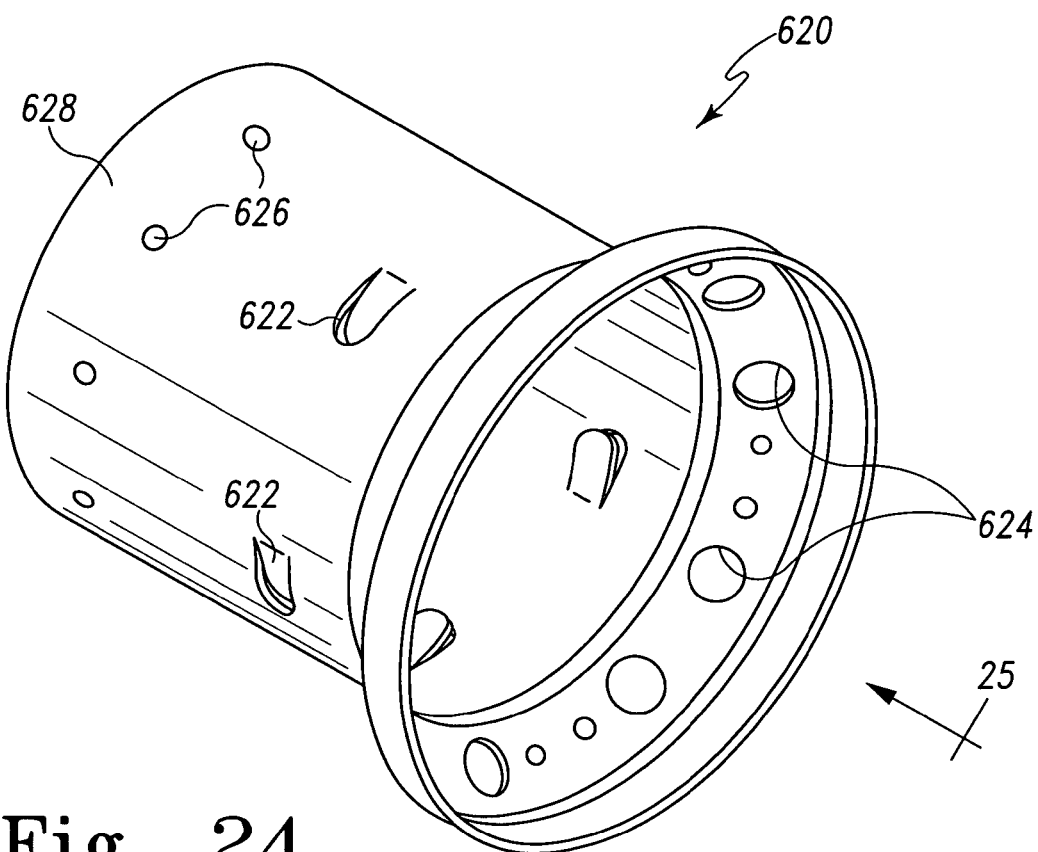
FIG. 24 is a perspective view showing a portion of the combustion chamber of the assemblies of FIGS. 20 and 21 in greater detail.
Figure 25:
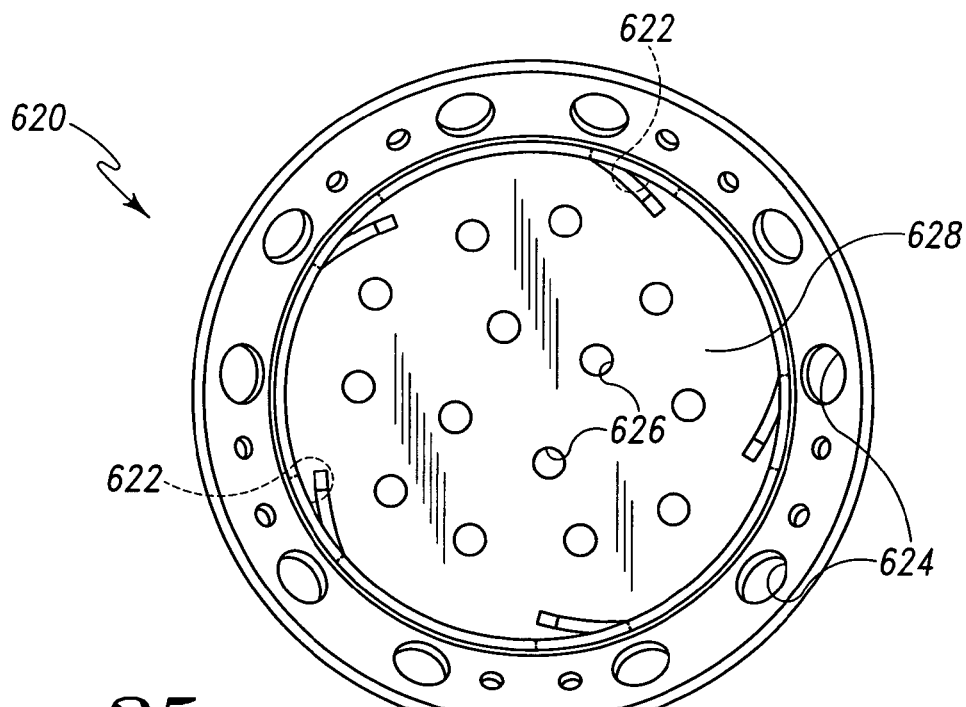
FIG. 25 is an elevation view of the portion of the combustion chamber of FIG. 24 as viewed in the direction of arrow 25—25 of FIG. 24.

Exhaust gas entering the housing 610 is split into two streams. The inner stream 616 enters a chamber 618, and then flows into a combustion chamber 620 through a number of holes 622, 624. The hole pattern of the holes 622, 624 is shown in FIGS. 24 and 25. The hole pattern is configured such that exhaust gas flowing through the holes 622 swirls inside the combustion chamber 620, thus facilitating the mixing of the injected fuel, the exhaust gas, and combustion gases. One or more rows of the holes 622 may be utilized to generate a desired flow/swirl. As shown in FIGS. 24 and 25, an upstream wall 628 of the combustion chamber 620 may also have a number of holes 626 defined therein to allow a portion of the exhaust gas flow to enter the chamber 620 without being first advanced through the chamber 618.

The ends of the electrodes 48, 50 are placed downstream of the nozzle 54 to ignite the fuel in the presence of exhaust gas. The exhaust gas contains between 4%–20% oxygen which facilitates combustion of the fuel. The exhaust gas passing through holes 624 mixes with the hot combustion gas that may contain unburned fuel, hydrocarbons, CO, and other combustible gas. In the presence of the oxygen in the exhaust gas, these gases further combust. A flow of exhaust gas flows through a number of holes 630 thereby bypassing the fuel-fired burner 606. This bypass flow of exhaust gas supplies additional oxygen for the combustion of the combustion gas exiting the combustion chamber 620.

Figure 26:
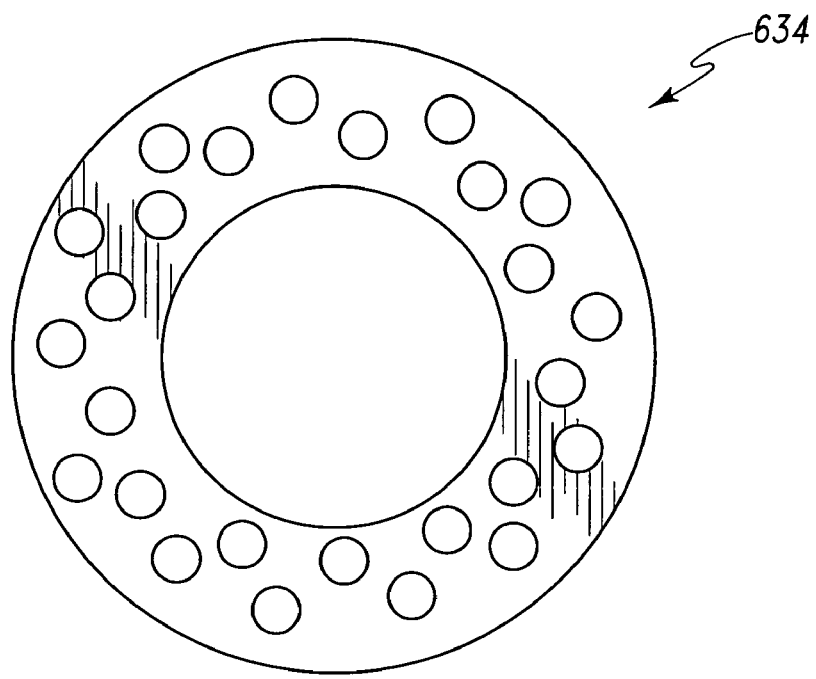
FIG. 26 is an elevation view of a gas distributor.
Figure 28:
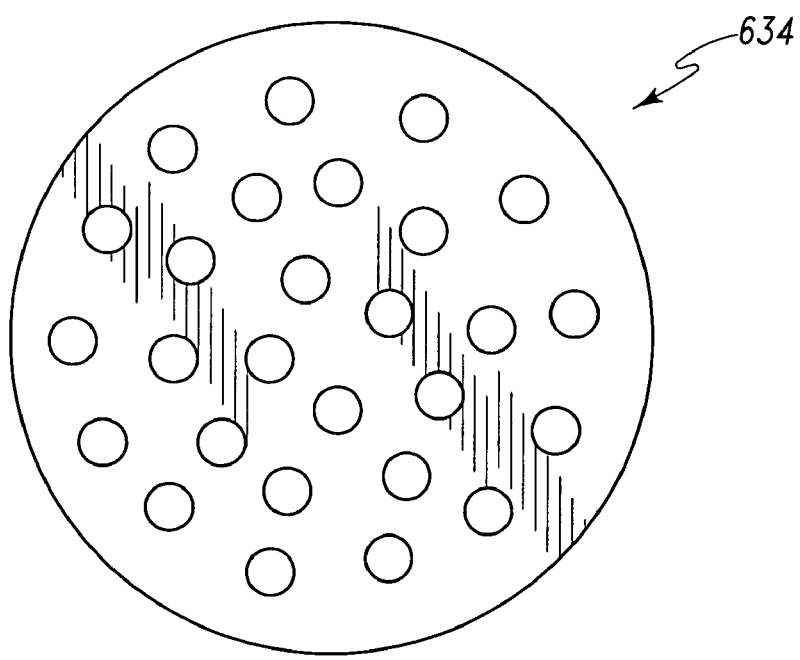
FIG. 28 is an elevation view of a gas distributor.
Figure 27:
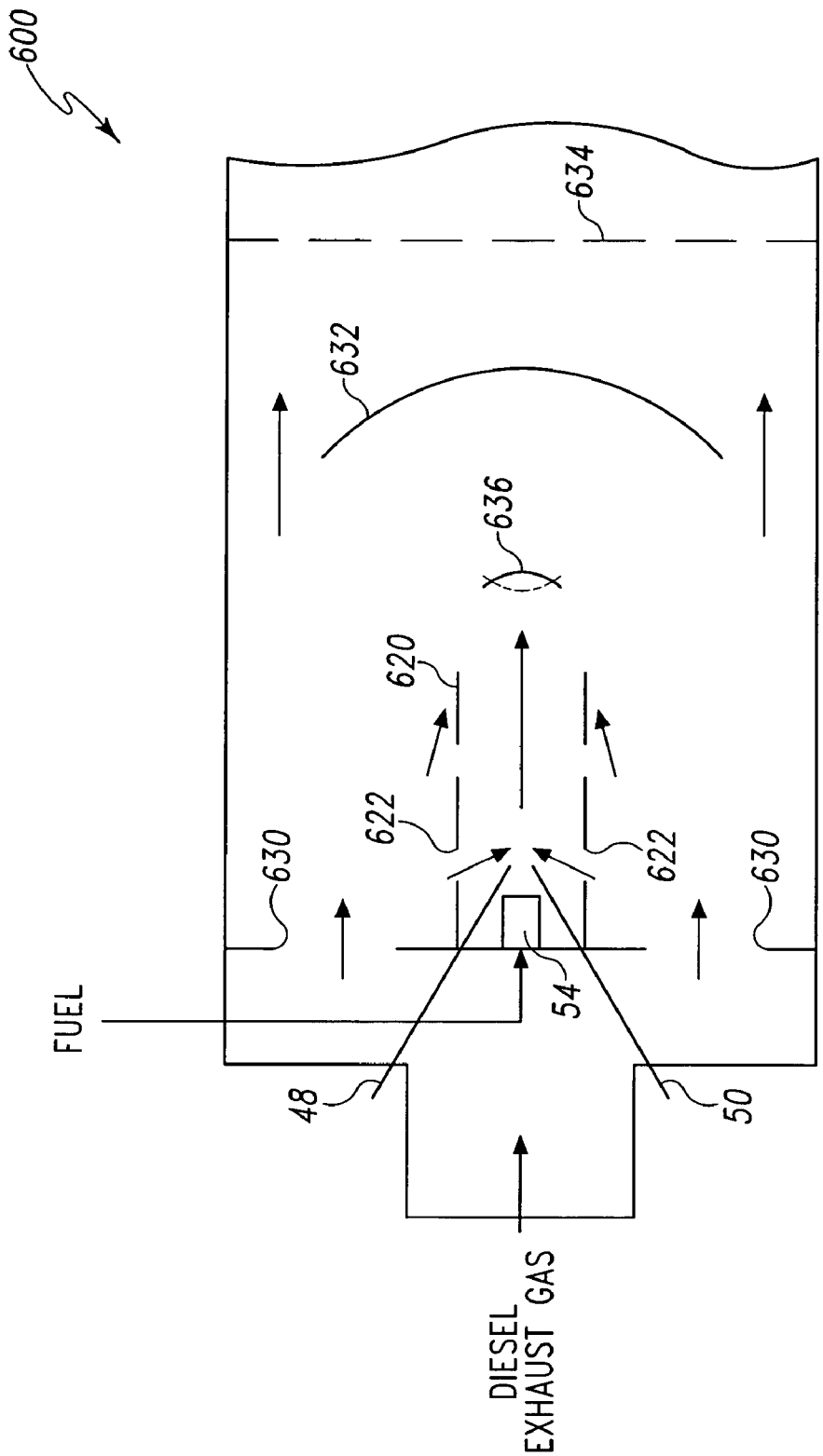
FIG. 27 is a view similar to FIGS. 22 and 23, but showing a different embodiment of the combustion chamber.

A flame holder 632 is placed downstream of the combustion zone to prevent the flame from reaching the diesel oxidation catalyst 608 (or the filter substrate 60 in configurations without a diesel oxidation catalyst such as shown in FIG. 21). A gas distributor 634 may be positioned downstream of the combustion zone to facilitate the mixing of the hot combustion gas and the exhaust gas bypassing the fuel-fired burner 606, thus enhancing the temperature distribution across the inlet of diesel oxidation catalyst 608 and/or filter substrate 60. The distributor 634 may be positioned around a portion of the walls of the combustion chamber 620 as shown in FIG. 22. An exemplary design of a gas distributor 634 that may be positioned in such a manner is shown in FIG. 26. Alternatively, as shown in FIG. 27, the gas distributor 634 may be positioned downstream of the outlet of the combustion chamber 620. An exemplary design of a gas distributor 634 that may be positioned in such a manner is shown in FIG. 28.

Referring now to FIG. 27, another exemplary design of the fuel-fired burner is shown in greater detail. In this embodiment, some exhaust gas flows through the holes 622 whose hole pattern is similar to the hole pattern shown in FIG. 24, thereby creating gas swirl inside the combustion chamber. The hot flame which contains unburned fuel, hydrocarbons, CO, and other combustible gas burns further downstream in the assembly of FIG. 27 relative to the assembly of FIG. 22.

As shown in FIG. 27, an additional flame holder 636 may be positioned between the flame holder 632 and the fuel-fired burner 606. As shown in solid lines, the flame holder 636 may be designed in a concave configuration or, as shown in phantom lines, a convex configuration.

Other variations of the exemplary designs of the emission abatement assemblies described herein are also contemplated. For example, as described above, the air pump 90 may be embodied as any type of air pump including a relatively high flow/high efficiency air pump. A variable air flow pump that increases output at high engine load conditions may also be used. Alternatively, a variable air flow pump that only operates at high engine load conditions may be used. The pump 90 may be embodied as a centrifugal compressor or a roots blower.

The size of the combustion chamber 34, 620 may also be varied to fit the needs of a given system design. For example, a relatively large (16" diameter) combustion chamber 34, 620 may be used to slow exhaust gas velocity thereby enhancing combustion efficiency of the fuel-fired burners. Relatively smooth/efficient air flow configurations, such as the "axial" configurations shown in FIGS. 20 and 21, may also be used to enhance the flow characteristics of a given design.

The manner in which fuel is injected into the fuel-fired burners 20, 22, 606 may also be varied, if desired. For example, a staged fuel injection arrangement may be used in which a first amount of fuel is injected into the burner to create an initial flame. The initial flame is then used to ignite a second amount of injected fuel.

A modulated fuel flow arrangement could also be utilized to increase the surface area of the fuel spray. For example, a dithering fuel average may be used in which the amount of injected fuel is dithered around a desired average fuel amount. For instance, the injected fuel rate may be dithered between 25% and 75% to produce an average fuel rate of 50%.

Operation of the engine 80, and its associated components, may also be controlled to facilitate operation of the emission abatement assemblies described herein. For example, in the case of operation of an emission abatement assembly that does not utilize supplemental air (e.g., the assemblies of FIGS. 20 and 21), the position of the EGR valve of the engine 80 may be coordinated with regeneration of the particulate filter. For instance, to increase both the temperature and the oxygen content in the exhaust gas, the engine's EGR valve may be momentarily closed. It is estimated that filter regeneration may require about ten minutes of time. During such a brief period of time, the EGR valve may be closed. In such a case, filter regeneration may be coordinated with engine idle conditions.

In other embodiments, the engine 80 may be controlled such the EGR level is actually increased during filter regeneration. In such a case, a fuel or fuel additive such as hydrogen gas may be utilized to stabilize the flame of the fuel-fired burner. Hydrogen gas may be supplied by either a storage tank or an onboard fuel reformer.

Along a similar line, operation of the engine 80, and its associated components, may be monitored to facilitate operation of the emission abatement assemblies described herein. For example, in the case of operation of an emission abatement assembly that does not utilize supplemental air (i.e., an airless burner such as the assemblies of FIGS. 20 and 21), operation of the engine may be monitored so that, for example, filter regeneration occurs at desired, predetermined engine operating conditions. For example, in the case of an emission abatement assembly that does not utilize supplemental air (e.g., the assemblies of FIGS. 20 and 21), it is desirable to perform filter regeneration in the presence of exhaust gas which contains a relatively high oxygen concentration. Such is generally the case when the engine 80 is under relatively low load conditions such as when the engine 80 is operating at idle or near idle conditions (e.g., 600–1,000 RPM depending on the engine).

As will herein be described in more detail below, there are a number of ways to determine when desirable, predetermined engine conditions exist for filter regeneration of an emission abatement assembly that does not utilize supplemental air. For example, a predetermined engine speed range may be utilized in which case filter regeneration is only performed if the engine is operating within a predetermined range of engine speed. In such a case, the controller 76 may monitor output from an engine speed sensor 890 (see FIG. 8) or the like to determine engine speed. It should be appreciated that the controller may communicate with the engine speed sensor 890 directly, or may obtain the output from the sensor 890 from the engine control unit 78 via the CAN interface 314.

Moreover, a predetermined engine load range may be utilized to determine when desirable, predetermined engine conditions exist for filter regeneration of an emission abatement assembly that does not utilize supplemental air. In such a case, filter regeneration is only performed if the engine is operating within the predetermined range of engine load. To do so, the controller 76 may first sense or otherwise determine certain engine parameters (e.g., RPM, turbo boost, etcetera) and then query or otherwise access a preprogrammed engine load map to determine the load on the engine. It should be appreciated that the controller 76 may be preprogrammed with such an engine load map, or may obtain the engine load from an engine load map programmed in the engine control unit 78 via the CAN interface 314.

In addition, exhaust mass flow from the engine 80 may be used to determine when desirable, predetermined engine conditions exist for filter regeneration of an emission abatement assembly that does not utilize supplemental air. For example, a predetermined exhaust mass flow range may be utilized in which case filter regeneration is only performed if the engine is operating within a predetermined range of exhaust mass flow. In such a case, the controller 76 may monitor output from a mass flow sensor 892 (see FIG. 8), such as a hot wire mass flow sensor, to determine exhaust mass flow. It should be appreciated that the controller 76 may communicate with the mass flow sensor 892 directly, or may obtain the output from the sensor 892 from the engine control unit 78 via the CAN interface 314. Alternatively, exhaust mass flow may be calculated by the controller 76 in a conventional manner by use of engine operation parameters such as engine RPM, turbo boost pressure, and intake manifold temperature (along with other known parameters such as engine displacement). It should be appreciated that the controller 76 itself may calculate the mass flow, or it may obtain the calculated mass flow from the engine control unit 78 via the CAN interface 314.

Figure 33:
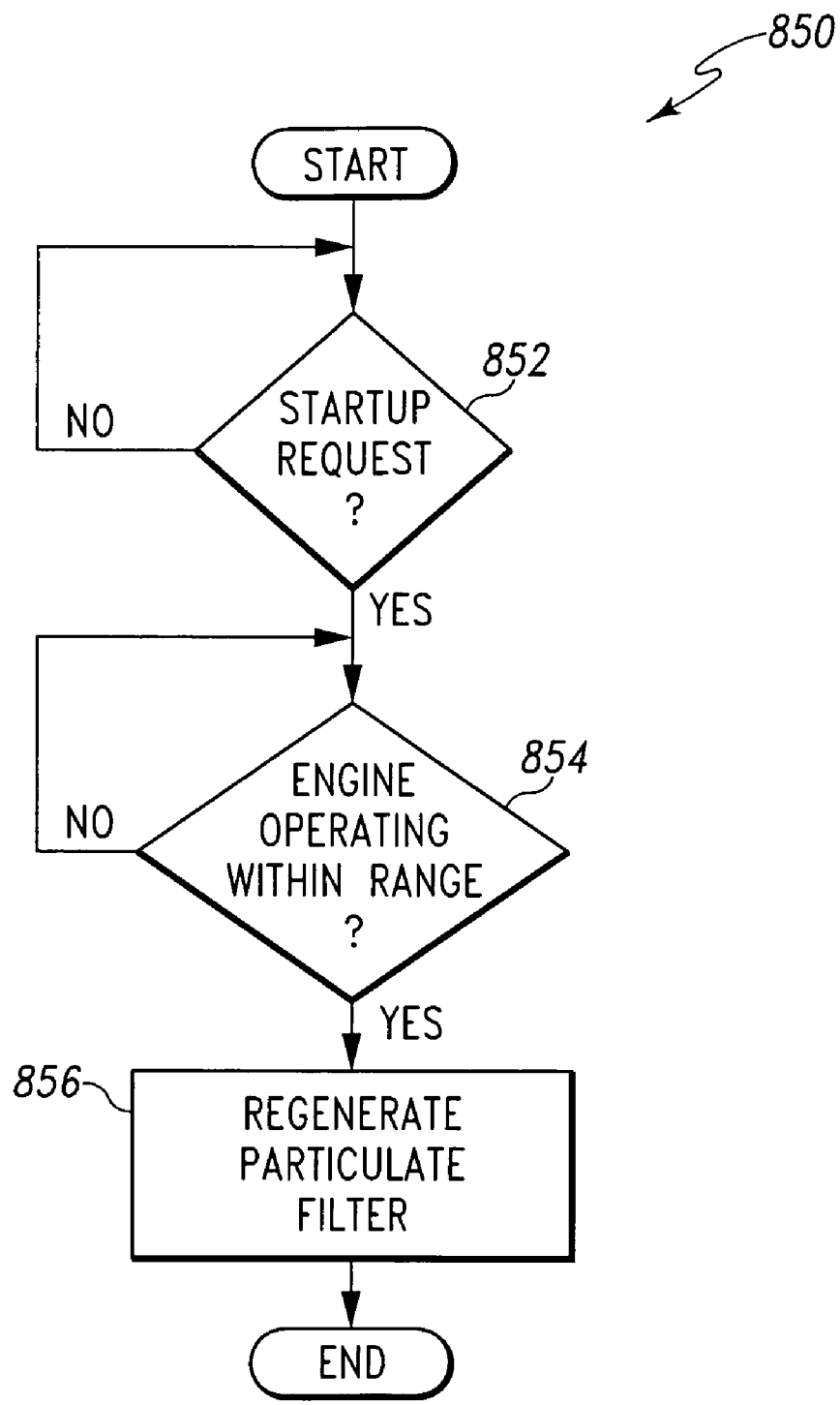
FIG. 33 is a flowchart of a control routine for regenerating an airless fuel-fired burner.

Referring now to FIG. 33, there is shown a control routine 850 for controlling regeneration an emission abatement assembly that does not utilize supplemental air (i.e., an airless emission abatement assembly). The routine 850 begins with step 852 in which the routine determines if a request to startup the airless fuel-fired burner 20, 22 (i.e., a burner startup request) has been executed. It should be appreciated that a burner startup request may take many different forms including, for example, a startup request generated by a software control routine in response to sensed, timed, or otherwise determined indication that one of the particulate filters 24, 26 is in need of regeneration. For example, a sensor-based scheme, map-based scheme, or a timing-based scheme may be utilized to generate a startup request. As such, in step 852, if the control routine 850 detects a burner startup request, a control signal is generated and the routine 850 advances to step 854. If the control routine 850 does not detect a burner startup request, the routine 850 loops back to step 852 to continue monitoring for such a request.

In step 854, the controller 76 determines if the engine 80 is operating within predetermined engine conditions. For example, if a predetermined engine speed range is being utilized, in which case filter regeneration is only performed if the engine is operating within a predetermined range of engine speed, the controller 76 monitors output from the engine speed sensor 890 or otherwise determines engine speed. Thereafter, the controller 76 determines if the speed of the engine is within the predetermined speed range. Alternatively, if a predetermined engine load range is being utilized, in which case filter regeneration is only performed if the engine is operating within the predetermined range of engine load, the controller 76 senses or otherwise determines certain engine parameters (e.g., RPM, turbo boost, etcetera) and thereafter queries or otherwise accesses a preprogrammed engine load map to determine the load on the engine. Thereafter, the controller 76 determines if the load of the engine is within the predetermined range of engine load. Moreover, if a predetermined exhaust mass flow range is being utilized, in which case filter regeneration is only performed if the engine is operating within a predetermined range of exhaust mass flow, the controller 76 senses, calculates, or otherwise determines exhaust mass flow from the engine. Thereafter, the controller 76 determines if the exhaust mass flow of the engine is within the predetermined range of exhaust mass flow. Hence, in step 854, if the controller 76 determines that the engine 80 is operating within predetermined engine conditions, the control routine 850 advances to step 856. However, if the engine is not operating within predetermined engine conditions, the control routine 850 loops back to step 854 to continue monitoring the engine to determine when it is operating within such conditions.

In step 856, the controller 76 commences filter regeneration. Specifically, the electronic controller 76 operates the fuel-fired burner 20, 22 to regenerate the particulate filter 24, 26 in any of the numerous manners described herein. However, it should be appreciated that the fuel-fired burner 20, 22 is operated without the assistance of combustion air (i.e., without the use of supplemental air supply such as from the air pump 90). As such, oxygen present in the engine exhaust gas sustains combustion of the fuel delivered to the fuel-fired burner 20, 22. Heat generated by the combustion of the fuel regenerates the particulate filter 24, 26. Once filter regeneration is complete, the control routine 850 ends.

It should be appreciated that the control routine 850 may also be used to regenerate filters with the assistance supplemental air, if desired. It should also be appreciated that the control routine 850 may be modified in a manner in which filter regeneration occurs even in the absence of a startup request. For example, the controller 76 may be configured to regenerate one or both of the particulate filters 24, 26 when the engine 80 is operating within predetermined engine conditions irrespective of whether the filters 24, 26 are loaded to a predetermined limit. In such a way, the controller 76 can take advantage of any time oxygen rich conditions are present in the exhaust gas.

Figure 35:
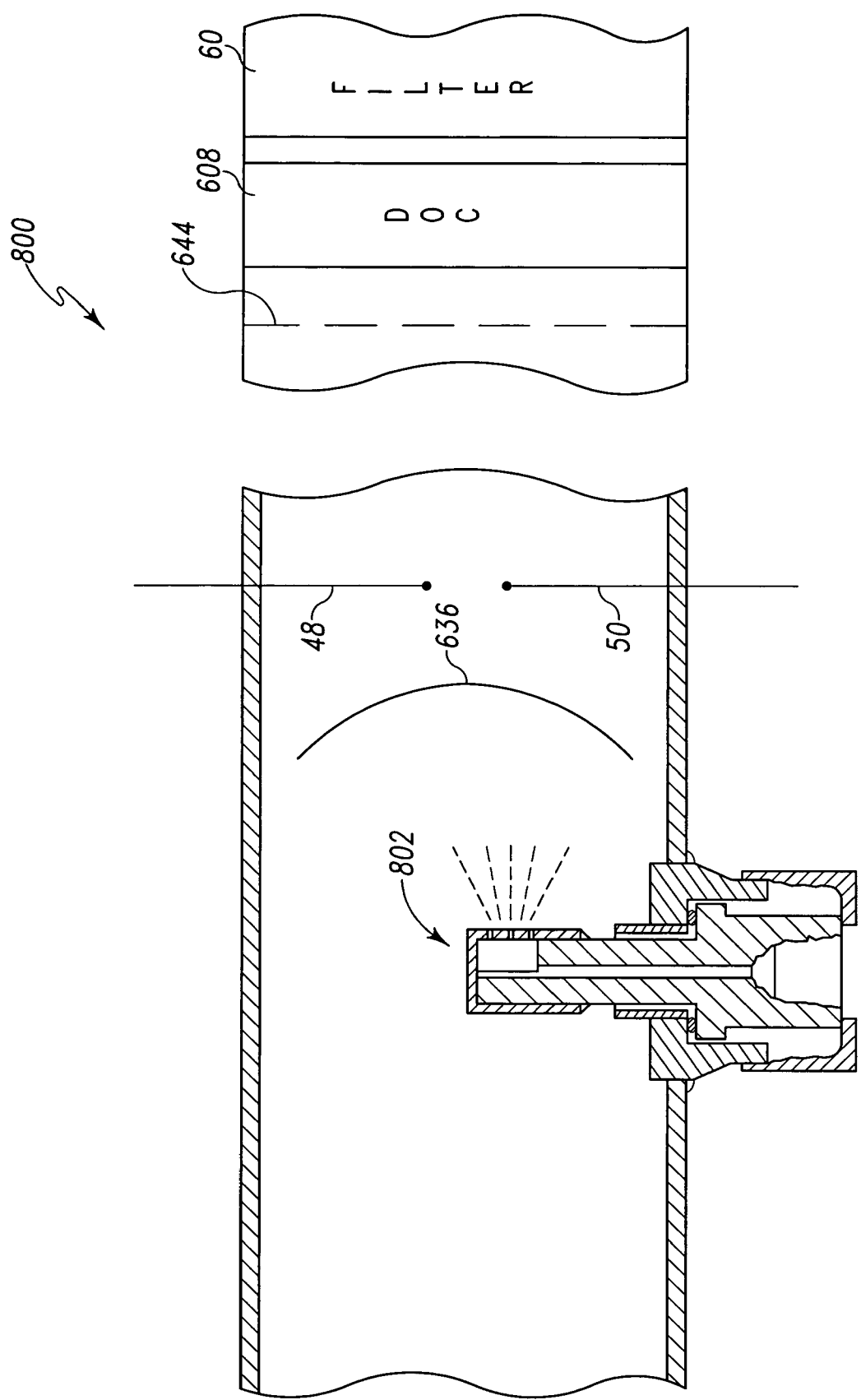
FIG. 35 is a diagrammatic view of another emission abatement assembly.

Referring now to FIG. 35, another exemplary embodiments of an emission abatement assembly 800 is shown. The assembly 800 includes a nozzle 802 which extends into an exhaust conduit to inject fuel into a flow of exhaust gas. The electrodes 48, 50 are positioned in a substantially vertical arrangement (as viewed in the orientation of the drawings).

A flame holder 636 may be positioned in a number of different positions relative to the electrodes 48, 50. For example, as shown in FIG. 35, the flame holder 636 may be positioned downstream of the nozzle 802, but upstream of the electrodes 48, 50. Alternatively, the flame holder 636 may be positioned downstream of both the nozzle 802 and the electrodes 48, 50. Moreover, the flame holder 632 may be designed in a concave configuration (as shown in FIG. 35), or a convex configuration (not shown).

A flow diffuser 644 may be positioned upstream of the diesel oxidation catalyst 608 and/or the filter substrate 60 to facilitate the mixing of the hot combustion gas from combustion zone proximate to the nozzle 802 and the remaining exhaust gas, thus enhancing the temperature distribution across the inlet of diesel oxidation catalyst 608 and/or filter substrate 60. The flow diffuser 644 may be embodied as any type of flow diffuser. In an exemplary embodiment, the flow diffuser 644 may be embodied as the any of the flow distributors 634 described above.

Figure 36:
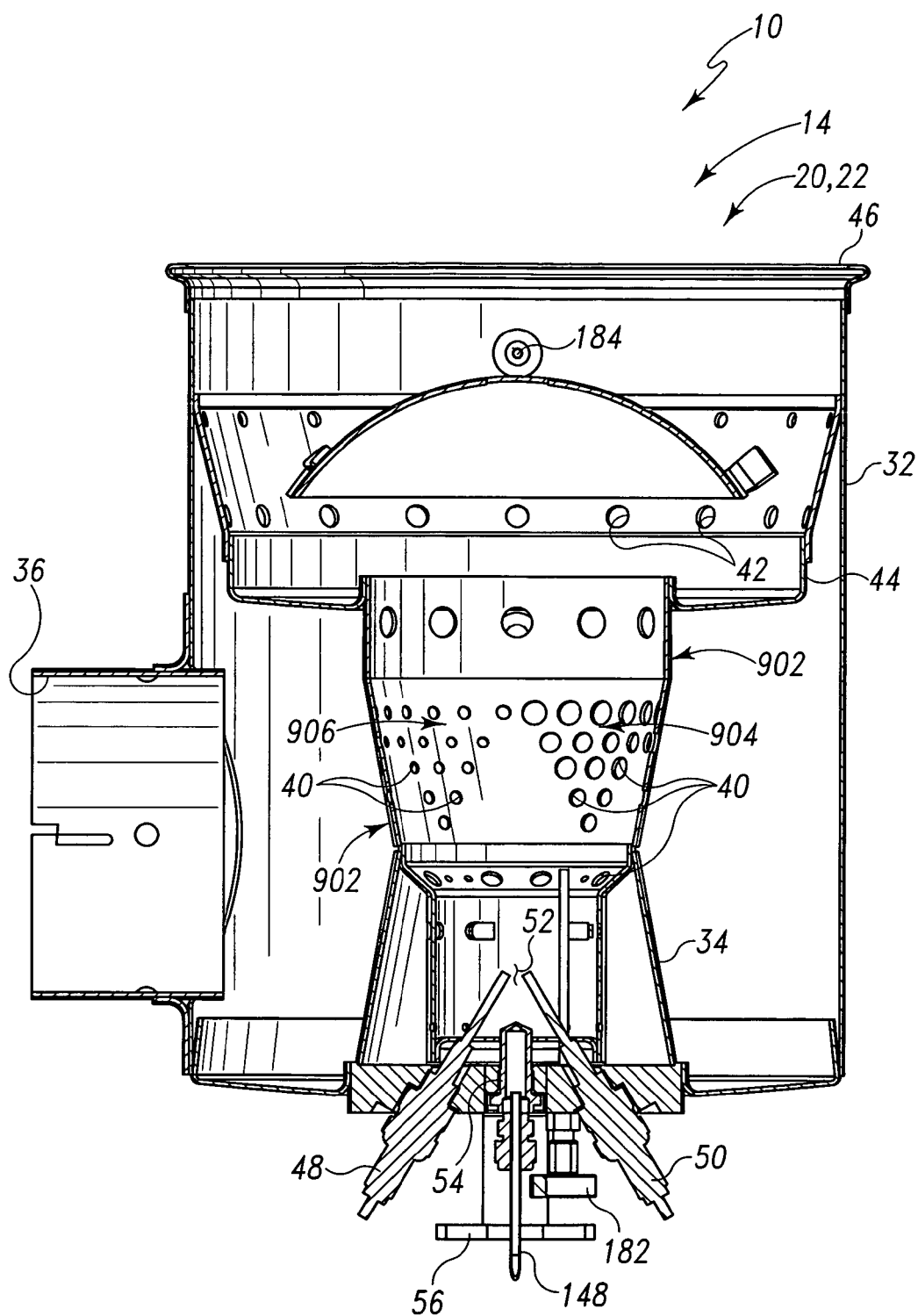
FIGS. 36–43 are views similar to FIG. 5, but showing the fuel-fired burner with modification thereto.

Referring now to FIG. 36, there is shown another exemplary embodiment of the fuel-fired burner 20, 22. The embodiment shown in FIG. 36 is similar to the embodiments previously described, with the same reference numerals being used to designate similar components. The fuel-fired burner 20, 22 has been modified to reduce the exhaust gas flow through the combustion chamber 34. It has been found that such a modification reduces (perhaps significantly) hydrocarbon and CO slip, while also reducing other emissions.

In essence, the flow of exhaust gas entering through the exhaust gas inlet port 36 is separated into two flows, one of which is advanced through the combustion chamber 34 (i.e., a combustion flow), the other of which bypasses the combustion chamber 34 (i.e., a bypass flow). As such, exhaust gas flow through the combustion chamber 34 of the fuel-fired burner 20, 22 of FIG. 36 is reduced relative to the burner of, for example, FIG. 5. As a result, the percentage of the exhaust gas flow bypassing the combustion chamber 34 (i.e., advancing through the openings 42 of the shroud 44) is increased relative to the design of FIG. 5.

As will herein be described in greater detail, the design of the combustion chamber 34 may be altered to provide control of the exhaust gas flowing therethrough (i.e., control the velocity and direction of exhaust gas flow through the combustion chamber). Moreover, components such as diverter plates may also be used to control the exhaust gas flow in such a manner.

One exemplary manner of controlling the exhaust gas flow through the fuel-fired burner 20, 22 in such a manner is shown in FIG. 36. In this case, the combustion chamber 34 includes a generally annular shaped outer wall 902 having two wall halves 904, 906. The first wall half 904 faces away from the exhaust gas inlet port 36, whereas the second wall half 906 faces toward the exhaust gas inlet port 36. As shown in FIG. 36, the first wall half 904 has a number of the gas inlet openings 40 defined therein. The collective surface areas of the gas inlet openings 40 of the first wall half 904 define a first void area, whereas the collective surface areas of the gas inlet openings of the second wall half 906 define a second void area. The second void area of the second wall half 904 is less than the first void area of the first wall half. As such, a reduced portion of the exhaust gas entering the fuel-fired burner 20, 22 through the exhaust gas inlet 36 flows into the combustion chamber 34 relative to, for example, the design of the fuel-fired burner of FIG. 5. As a result, the magnitude of the combustion flow (i.e., the flow of exhaust gas entering the combustion chamber 34) is reduced relative to the design of FIG. 5. It should be appreciated that such a configuration not only reduces the magnitude of the exhaust gas entering the combustion chamber 34, but also reduces the velocity of the exhaust gas entering the combustion chamber 34 (relative to, for example, the design of FIG. 5). Moreover, such a configuration also reduces the flow of exhaust gas entering the fuel-fired burner 20, 22 through the exhaust gas inlet 36 that flows directly into the combustion chamber 34 (i.e., through the wall half 906), and, as a result, is impinged upon the flame generated therein.

Figure 37:
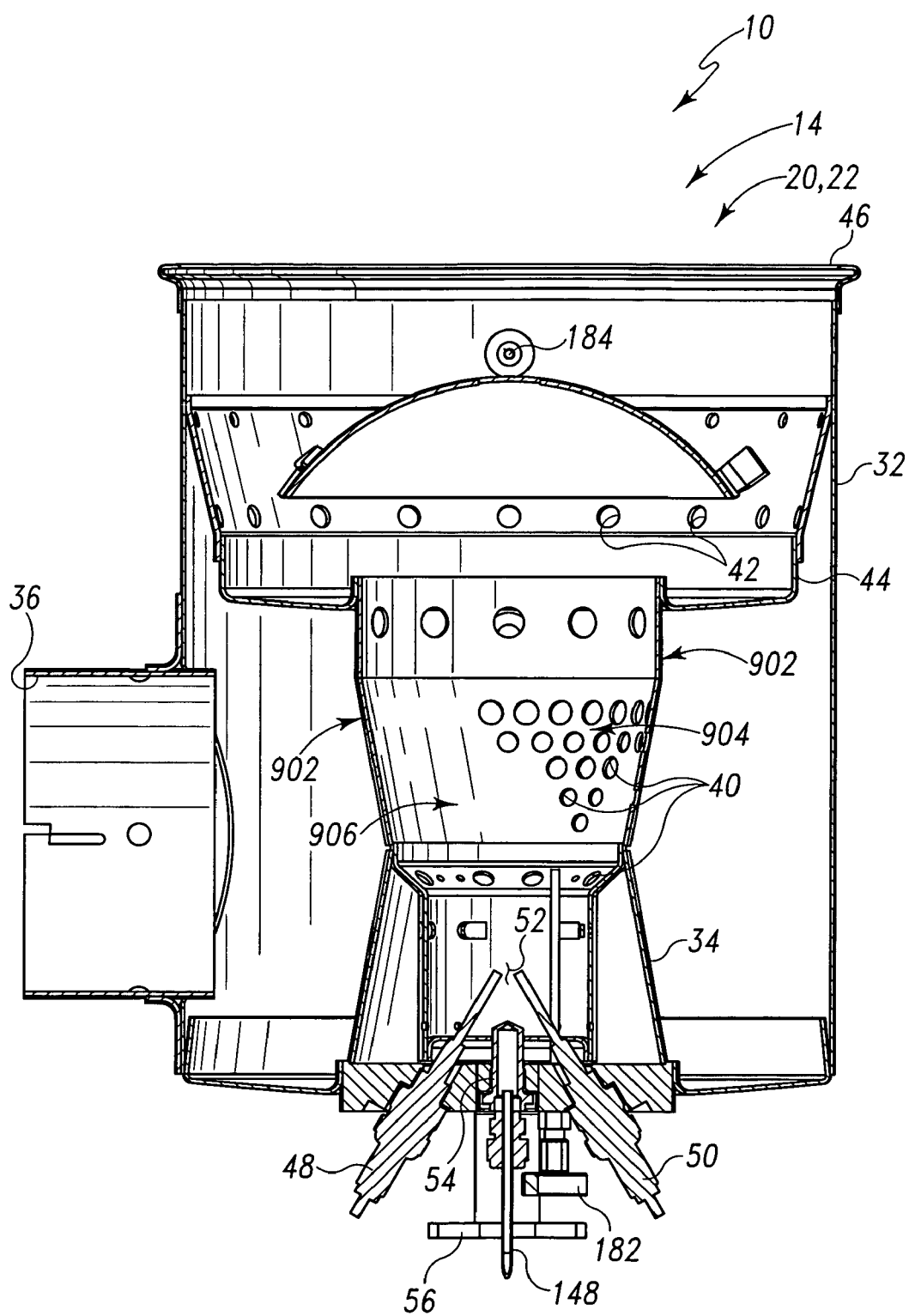
Figure 38:
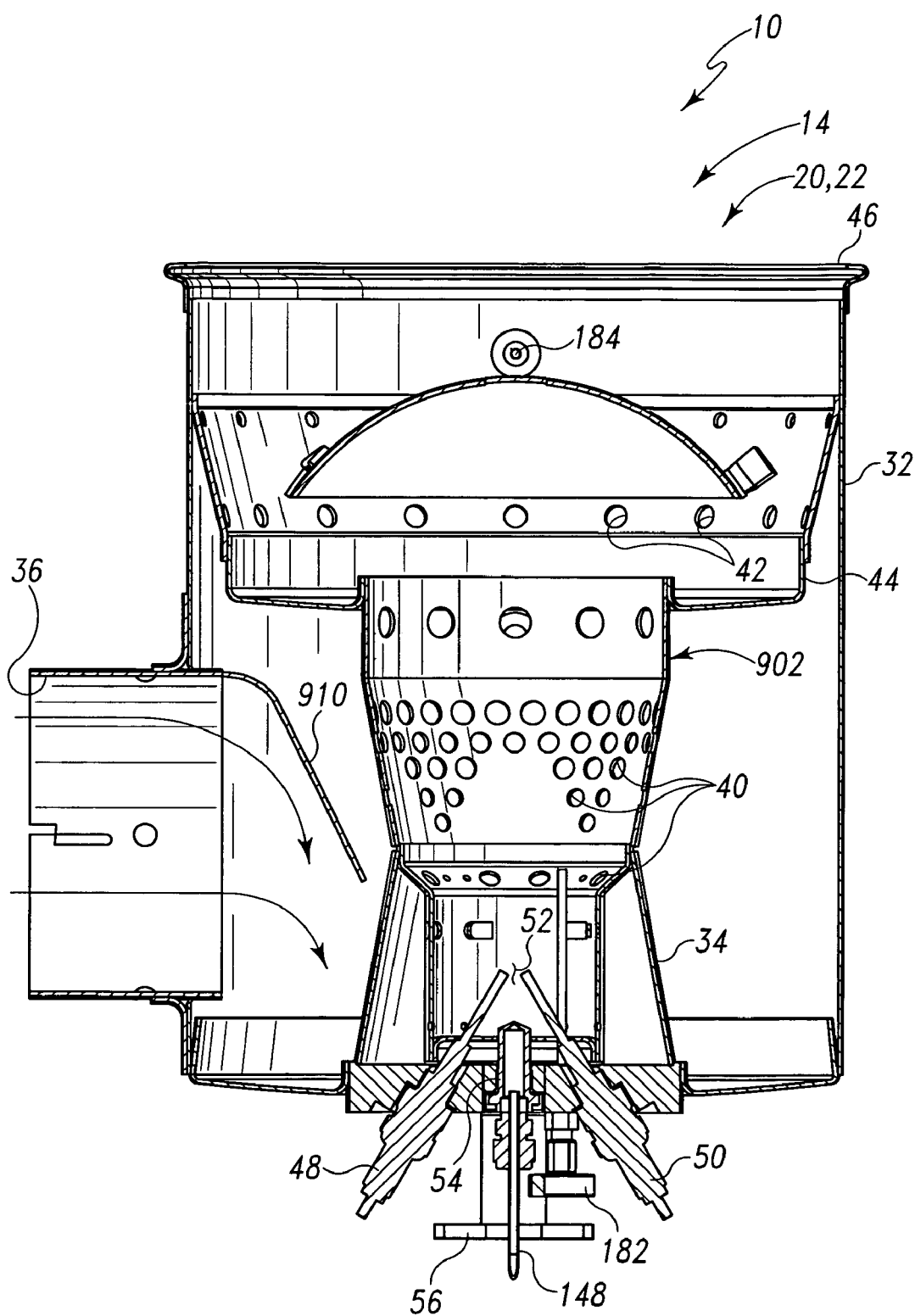
Figure 39:
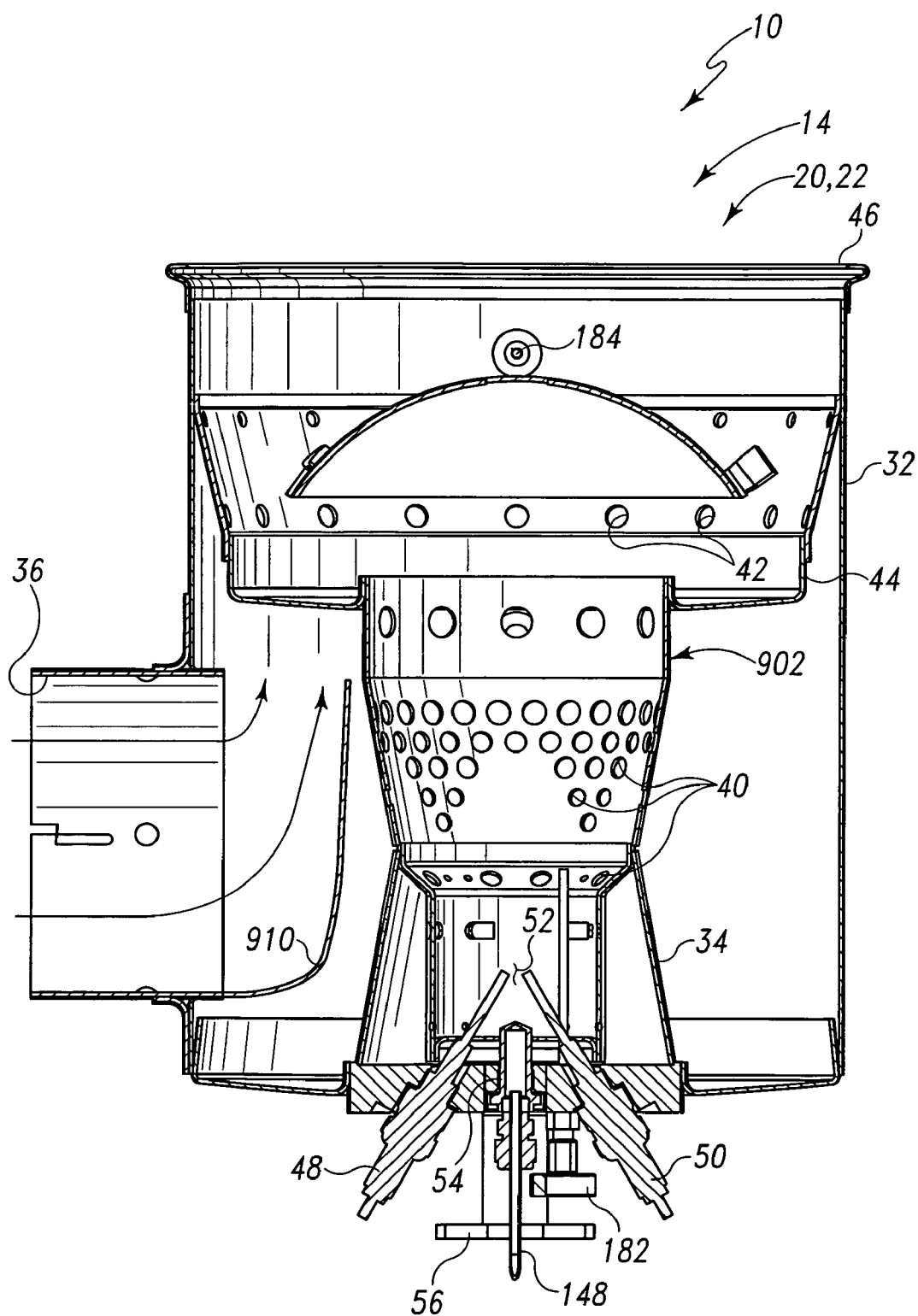
Figure 40:
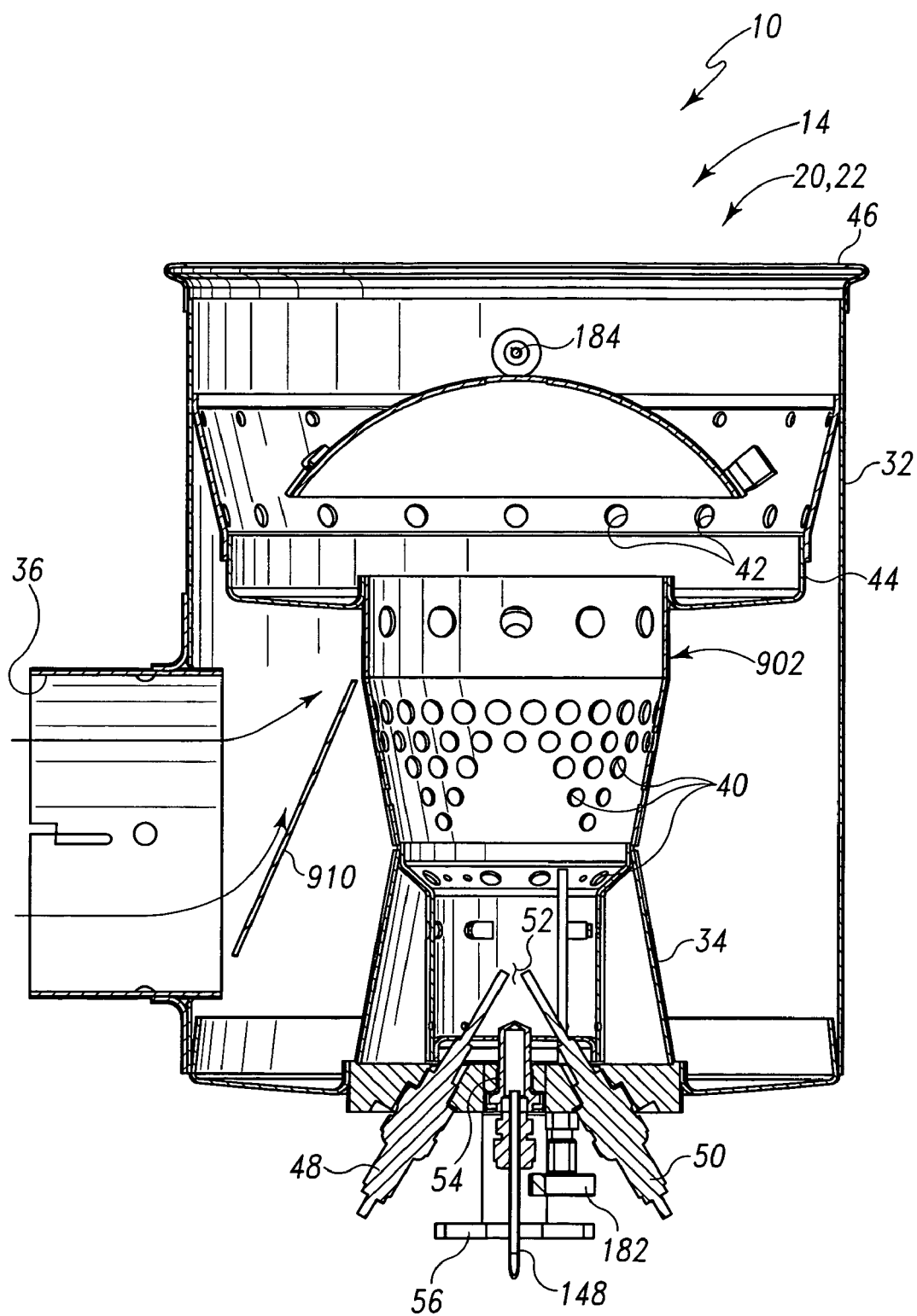
Figure 41:
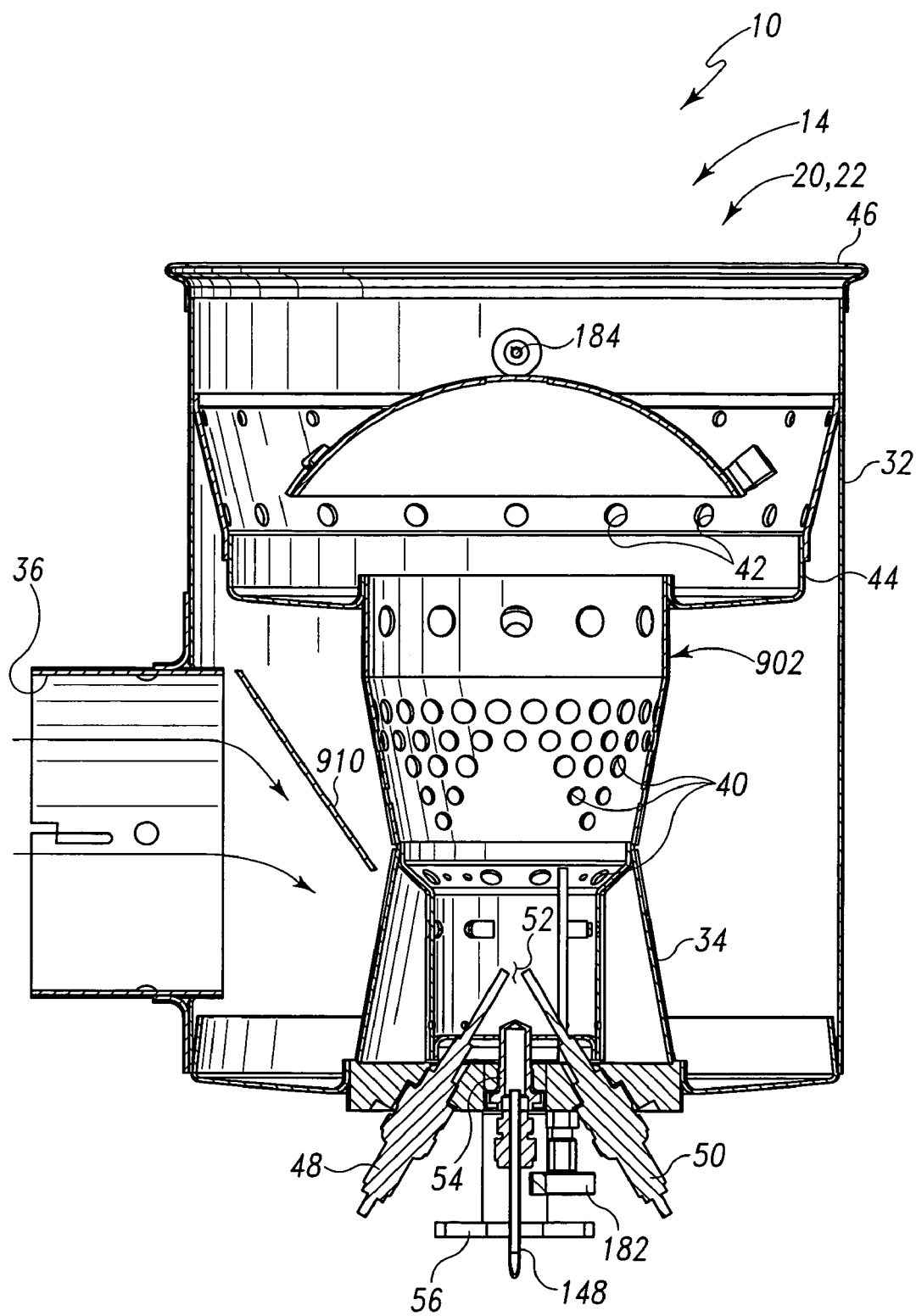
Figure 42:
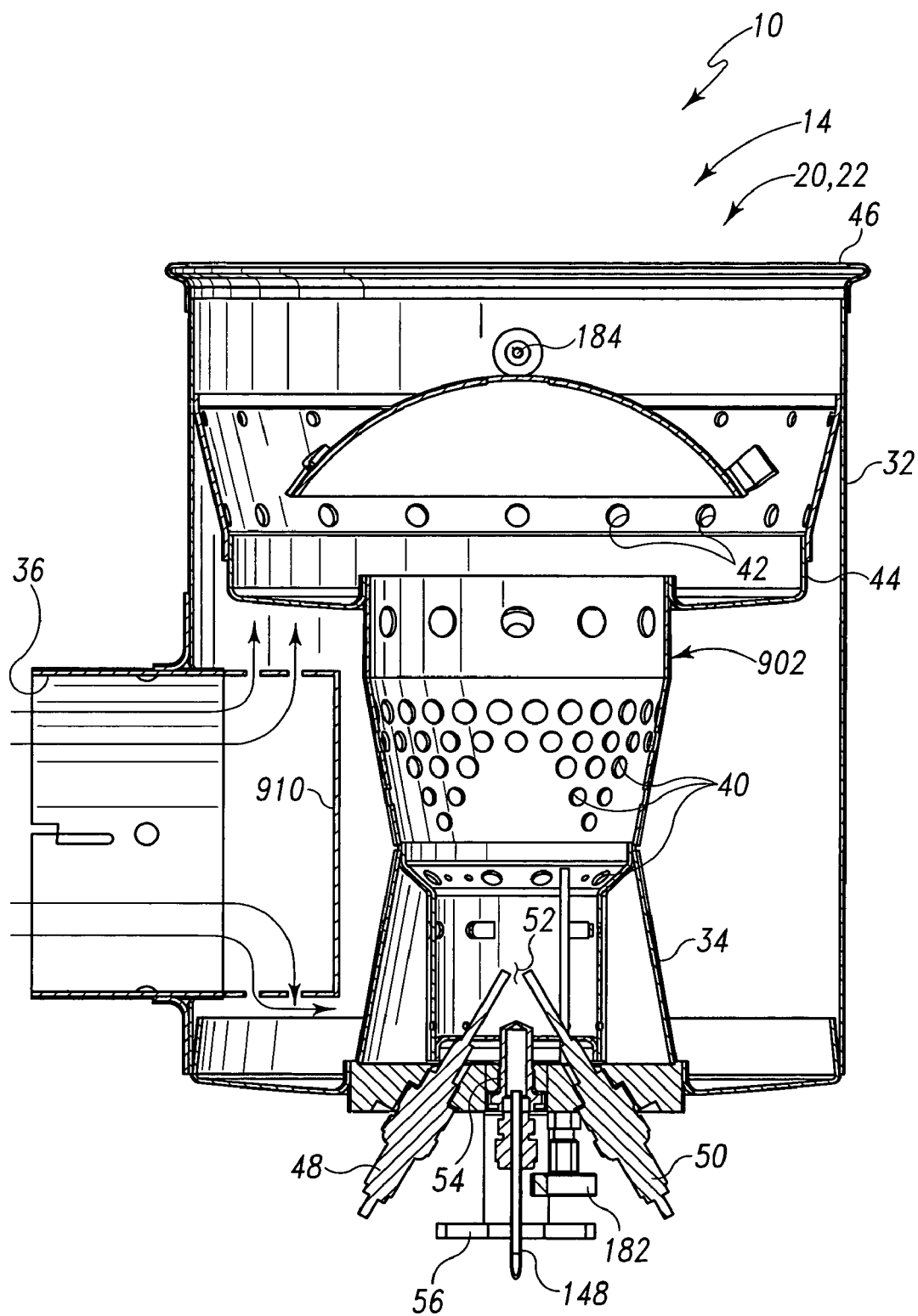
Figure 43:
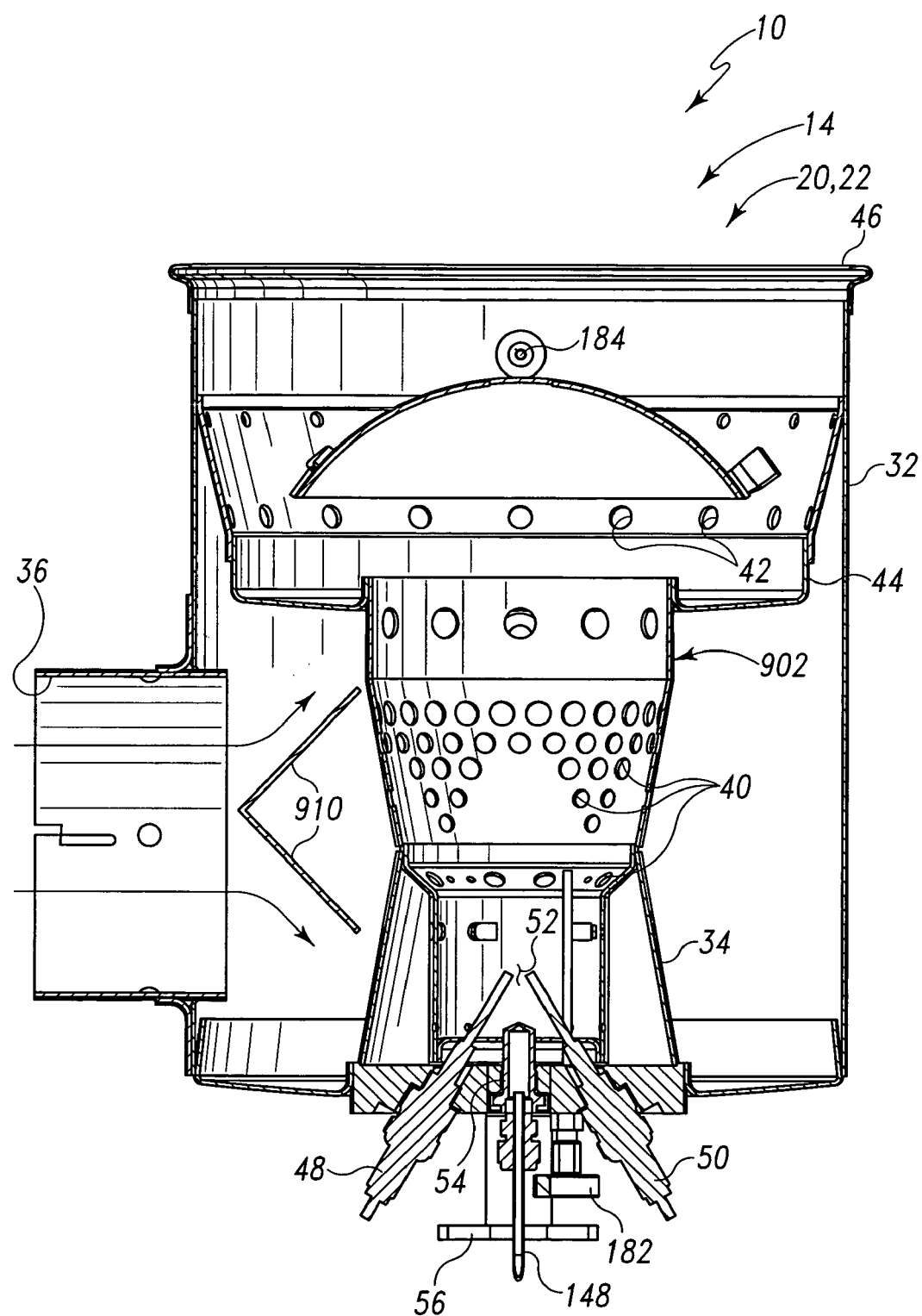

Referring now to FIG. 37, there is shown another embodiment of the fuel-fired burner 20, 22 in which the second wall half 906 of the combustion chamber 34 is substantially devoid of the gas inlet openings 40. For example, the collective surface areas of the gas inlet openings of the second wall half 906 define a void area of zero. As a result, exhaust gas entering the fuel-fired burner 20, 22 through the exhaust gas inlet port 36 does not flow directly into the combustion chamber 34, and, as a result, is not impinged upon the flame generated therein. Rather, the combustion flow of exhaust gas enters the combustion chamber 34 through the gas inlet openings 40 formed in the first wall half 904 of the combustion chamber 34 (i.e., the surfaces that do not face the exhaust gas inlet 36). The balance of the flow of exhaust gas entering the exhaust gas inlet port 36 bypasses the combustion chamber 34.

It should be appreciated that the size and location of the gas inlet openings 40 on either wall half 904, 906 may be configured to generate any desired flow characteristics within the combustion chamber 34 (e.g., velocity and direction).

Figure 44:
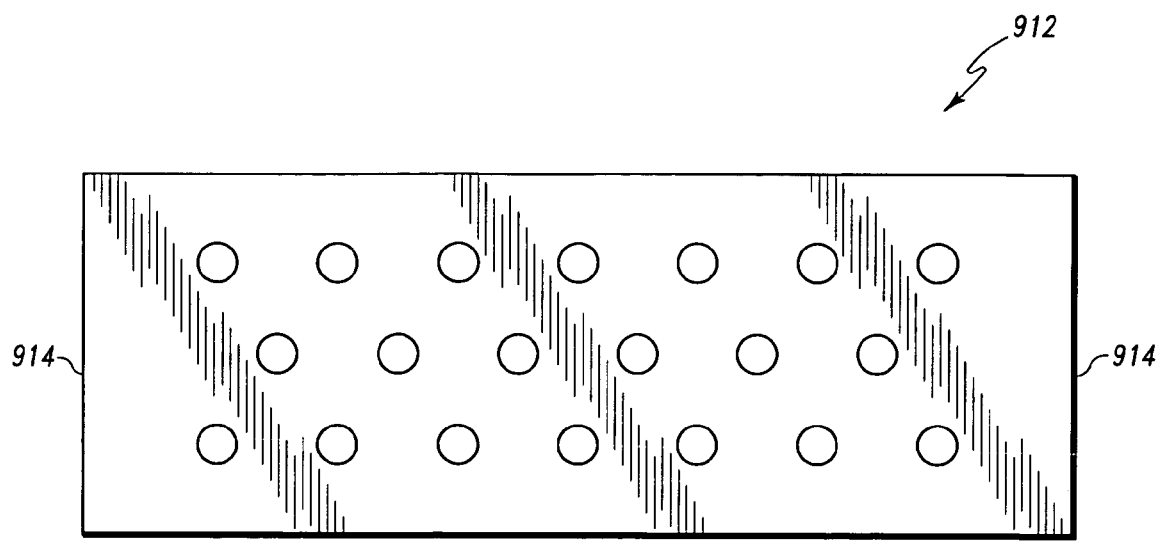
FIG. 44 is a development view of a plate which may be positioned around the combustion chamber.
Figure 45:
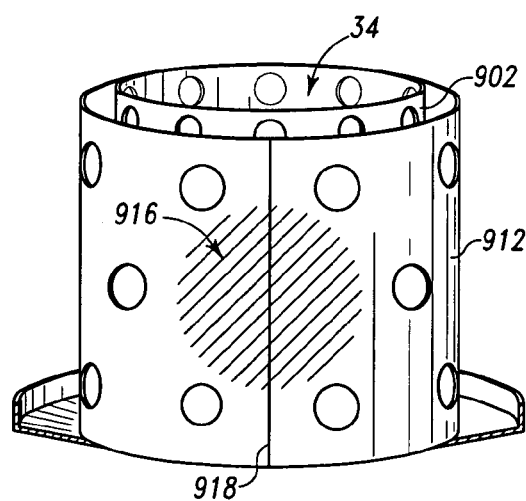
FIG. 45 is a fragmentary perspective view showing the plate of FIG. 44 positioned around the combustion chamber.

Although the proportions of the separated flows (i.e., the combustion flow and the bypass flow) are described as being a function of the gas inlet openings 40 formed in the outer wall 902 of the combustion chamber 34, the exhaust gas flow entering the exhaust gas inlet port 36 may be separated in other ways. For example, a plate or "patch" may be secured to the combustion chamber 34 to block any number of gas inlet openings 40 that may already exist in the chamber 34. An example of such a plate 912 is shown in FIG. 44. The plate 912 may be positioned around the outer wall 902 of the combustion chamber 34 of the burner design shown in, for example, FIG. 5. The seam 918 created when the two ends 914 of the plate 912 are secured together faces the exhaust gas inlet port 36. As shown in FIG. 45, when the plate 912 is installed in such a manner, the exhaust gas flow entering the exhaust gas inlet port 36 is impinged upon an area of the plate 912 (shown generally as the shaded area 916) which is devoid of holes thereby preventing the exhaust gas flow from being impinged directly on the flame within the combustion chamber 34.

By controlling the flow of exhaust gas through the combustion chamber 34 stability of the flame generated by the fuel-fired burner 20, 22 may be enhanced. Indeed, it has been found that when the velocity of the flame is greater than the velocity of the exhaust gas moving through the chamber 34, a stable flame may be more readily maintained. To the contrary, when the velocity of the exhaust gas moving through the chamber 34 is greater than the flame velocity, instability of the flame may occur.

As alluded to above, the size, number, and location of the gas inlet openings 40 may be predetermined to produce a desired flow through the combustion chamber. In an exemplary embodiment, the fuel-fired burner 20, 22 is configured such that about 70% of the exhaust gas entering through the inlet 36 is advanced through the combustion chamber 34 (with the balance of the exhaust gas bypassing the chamber 34). In another exemplary embodiment, the fuel-fired burner 20, 22 is configured such that about 50%–70% of the exhaust gas entering through the inlet 36 is advanced through the combustion chamber 34 (with the balance of the exhaust gas bypassing the chamber 34). In yet another exemplary embodiment, the fuel-fired burner 20, 22 is configured such that less than 50% of the exhaust gas entering through the inlet 36 is advanced through the combustion chamber 34 (with the balance of the exhaust gas bypassing the chamber 34). Flows other than these exemplary flow arrangements are contemplated.

As alluded to above, in lieu of, or in addition to, removal of the gas inlet openings 40 from the outer wall 902 of the combustion chamber 34, the exhaust gas flow entering the gas inlet port 36 may be separated into a desired combustion flow and bypass flow in numerous different ways. For example, a number of diverter plates may be used to direct a desired amount of exhaust gas flow through the combustion chamber 34 while directing the balance of the flow to bypass the chamber. Examples of such plates 910 are shown in FIGS. 38–43, although other configurations are contemplated. It should be appreciated that such plates 910 may be configured to direct the desired portion of the flow through the combustion chamber 34 while also preventing an increase in backpressure within the exhaust system.

The size, shape, and/or location of the openings 42 defined in the bypass shroud 44 may also be altered to generate desired flow characteristics. For example, the size, shape, and/or location of the openings 42 may be configured to accommodate for "hot spots" or "cool spots" on the upstream face of the filter substrate 60. Indeed, thermal analysis may be performed on the filter substrate 60 to determine where such hot spots or cool spots exist. The size, shape, and/or location of the openings 42 defined in the bypass shroud 44 may then be altered based on such an analysis.

For example, the size of the openings 42 upstream (relative to exhaust gas flow) of a cool spot may be reduced. This increases the temperature on the cool spot during filter regeneration by reducing the amount of exhaust gas flowing through the cool spot.

Conversely, the size of the openings 42 upstream (relative to exhaust gas flow) of a hot spot may be increased. This decreases the temperature on the hot spot during filter regeneration by increasing the amount of exhaust gas flowing through the hot spot.

As a result, it is contemplated to construct a bypass shroud 44 that includes a number of different sized openings 42 to accommodate varying surface temperatures on the upstream surface of the filter substrate 60.

While the disclosure is susceptible to various modifications and alternative forms, specific exemplary embodiments thereof have been shown by way of example in the drawings and has herein be described in detail. It should be understood, however, that there is no intent to limit the disclosure to the particular forms disclosed, but on the contrary, the intention is to cover all modifications, equivalents, and alternatives falling within the spirit and scope of the disclosure.

There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of apparatus, systems, and methods that incorporate one or more of the features of the present disclosure and fall within the spirit and scope of the present disclosure.

For example, it should be appreciated that the order of many of the steps of the control routines described herein may be altered. Moreover, many steps of the control routines may be performed in parallel with one another.

The invention claimed is:

1. A method of operating a fuel-fired burner of an emission abatement assembly, the method comprising the steps of:
   supplying a first flow rate of fuel to the fuel-fired burner during regeneration of a particulate filter,
   detecting a burner shutdown request,
   supplying a second flow rate of fuel to the fuel-fired burner for a predetermined period of time in response to detection of the shutdown request, the second flow rate of fuel being less than the first flow rate of fuel, and
   ceasing to supply fuel to the fuel-fired burner after the predetermined period of time has elapsed.

2. The method of claim 1, further comprising the step of supplying combustion air to the fuel-fired burner for a predetermined period of time subsequent to the ceasing step.

3. The method of claim 2, further comprising the step of generating an ignition spark for the predetermined time subsequent to the ceasing step.

4. The method of claim 2, further comprising the step of ceasing to supply combustion air to the fuel-fired burner after the predetermined period of time subsequent to ceasing to supply fuel to the fuel-fired burner has elapsed.

5. The method of claim 1, further comprising the steps of:
   supplying combustion air to the fuel-fired burner for a predetermined period of time subsequent to ceasing to supply fuel to the fuel-fired burner, generating an ignition spark for the predetermined period of time subsequent to ceasing to supply fuel to the fuel-fired burner, ceasing to supply combustion air to the fuel-fired burner after the predetermined period of time subsequent to ceasing to supply fuel to the fuel-fired burner has elapsed, and ceasing to generate the ignition spark after the predetermined period of time subsequent to ceasing to supply fuel to the fuel-fired burner has elapsed.

6. The method of claim 1, wherein:

the step of supplying the first flow rate of fuel comprises injecting a first amount of fuel into a flow of atomization air, and the step of supplying the second flow rate of fuel comprises injecting a second amount of fuel into the flow of atomization air, the second amount of fuel being less than the first amount of fuel.

7. The method of claim 6, wherein the ceasing step comprises ceasing to inject fuel into the flow of atomization air.

8. The method of claim 7, further comprising the step of supplying atomization air to the fuel-fired burner for a predetermined period of time subsequent to the ceasing step.

9. A method of operating a fuel-fired burner of an emission abatement assembly, the method comprising the steps of:

advancing a flow of atomization air to the fuel-fired burner, injecting a first amount of fuel into the flow of atomization air during regeneration of a particulate filter, detecting a burner shutdown request, injecting a second amount of fuel into the flow of atomization air for a predetermined period of time in response to detection of the shutdown request, the second amount of fuel being less than the first amount of fuel, and ceasing to inject fuel into the flow of atomization air after the predetermined period of time has elapsed.

10. The method of claim 9, further comprising the step of supplying combustion air to the fuel-fired burner for a predetermined period of time subsequent to the ceasing step.

11. The method of claim 10, further comprising the step of generating an ignition spark for the predetermined time subsequent to the ceasing step.

12. The method of claim 10, further comprising the step of ceasing to supply combustion air to the fuel-fired burner after the predetermined period of time subsequent to ceasing to inject fuel into the flow of atomization air has elapsed.

13. The method of claim 9, further comprising the steps of:

supplying combustion air to the fuel-fired burner for a predetermined period of time subsequent to ceasing to inject fuel into the flow of atomization air, generating an ignition spark for the predetermined period of time subsequent to ceasing to inject fuel into the flow of atomization air, ceasing to supply combustion air to the fuel-fired burner after the predetermined period of time subsequent to ceasing to inject fuel into the flow of atomization air has elapsed, and ceasing to generate the ignition spark after the predetermined period of time subsequent to ceasing to inject fuel into the flow of atomization air has elapsed.

14. An emission abatement assembly, comprising:

a particulate filter, a fuel-fired burner positioned upstream of the particulate filter, an electronically-controlled fuel delivery assembly operable to deliver fuel to the fuel fired burner, and a controller electrically coupled to the fuel delivery assembly, the controller comprising (i) a processor, and (ii) a memory device electrically coupled to the processor, the memory device having stored therein a plurality of instructions which, when executed by the processor, cause the processor to:

operate the fuel delivery assembly to supply a first flow rate of fuel to the fuel-fired burner during regeneration of the particulate filter, detect a burner shutdown request, operate the fuel delivery assembly to supply a second flow rate of fuel to the fuel-fired burner for a predetermined period of time in response to detection of the shutdown request, the second flow rate of fuel being less than the first flow rate of fuel, and operate the fuel delivery assembly to cease to supply fuel to the fuel-fired burner after the predetermined period of time has elapsed.

15. The emission abatement assembly of claim 14, further comprising an electronically-controlled air pump, wherein the plurality of instructions, when executed by the processor, further cause the processor to operate the air pump to supply combustion air to the fuel-fired burner for a predetermined period of time subsequent to when the fuel delivery system ceases to supply fuel to the fuel-fired burner.

16. The emission abatement assembly of claim 15, further comprising a spark igniter, wherein the spark igniter is electrically coupled to the controller, and the plurality of instructions, when executed by the processor, further cause the processor to operate the spark igniter to generate an ignition spark for the predetermined time subsequent to when the fuel delivery system ceases to supply fuel to the fuel-fired burner.

17. The emission abatement assembly of claim 15, wherein the plurality of instructions, when executed by the processor, further cause the processor to operate the air pump to cease to supply combustion air to the fuel-fired burner after the predetermined period of time subsequent to ceasing to supply fuel to the fuel-fired burner has elapsed.

18. The emission abatement assembly of claim 14, wherein:

the fuel delivery system comprises a fuel injector electrically coupled to the controller, and the plurality of instructions, when executed by the processor, further cause the processor to operate the fuel injector to (i) inject a first amount of fuel into a flow of atomization air during regeneration of the particulate filter, and (ii) inject a second amount of fuel into the flow of atomization air for the predetermined period of time, the second amount of fuel being less than the first amount of fuel.

19. The emission abatement assembly of claim 18, wherein the plurality of instructions, when executed by the processor, further cause the processor to operate the fuel injector to cease to inject fuel into the flow of atomization air after the predetermined period of time has elapsed.

* * * * *